(12) United States Patent
Valin

(10) Patent No.: US 11,500,346 B2
(45) Date of Patent: Nov. 15, 2022

(54) ENERGY GENERATION, SOLAR PANEL RACKING SWITCHING PUMPING APPARATUS MECHANISM AND SYSTEM

(71) Applicant: David Valin, Winnemucca, NV (US)

(72) Inventor: David Valin, Winnemucca, NV (US)

(*) Notice: Subject to any disclaimer, the term of this patent is extended or adjusted under 35 U.S.C. 154(b) by 198 days.

(21) Appl. No.: 16/395,175

(22) Filed: Apr. 25, 2019

(65) Prior Publication Data
US 2020/0341439 A1    Oct. 29, 2020

(51) Int. Cl.
| | |
|---|---|
| G05B 19/042 | (2006.01) |
| H02S 10/10 | (2014.01) |
| H02S 40/22 | (2014.01) |
| G06Q 50/06 | (2012.01) |
| G06Q 20/38 | (2012.01) |
| H01G 11/36 | (2013.01) |
| H02S 10/20 | (2014.01) |
| G06Q 20/10 | (2012.01) |
| H02K 7/18 | (2006.01) |
| H01L 35/30 | (2006.01) |

(52) U.S. Cl.
CPC ........... *G05B 19/042* (2013.01); *G06Q 20/10* (2013.01); *G06Q 50/06* (2013.01); *H01G 11/36* (2013.01); *H01L 35/30* (2013.01); *H02K 7/1823* (2013.01); *H02S 10/10* (2014.12); *H02S 10/20* (2014.12); *H02S 40/22* (2014.12); *G05B 2219/2639* (2013.01); *G06Q 20/389* (2013.01)

(58) Field of Classification Search
CPC .......... G05B 19/042; G05B 2219/2639; H01G 11/36; H01G 11/10; H02S 10/10; H02S 10/20; H02S 40/22; H02K 7/1823; H02K 11/27; H02K 11/25; H02K 11/26; G06Q 20/10; G06Q 50/06; G06Q 20/389; H01L 35/30; Y02E 70/30; Y02E 10/52
See application file for complete search history.

(56) References Cited

U.S. PATENT DOCUMENTS

| | | | | |
|---|---|---|---|---|
| 8,595,094 B1 * | 11/2013 | Forbes, Jr. | ........ | H02J 13/00028 705/34 |
| 10,310,534 B2 * | 6/2019 | Forbes, Jr. | ............. | G06Q 50/06 |

(Continued)

*Primary Examiner* — Michael C Zarroli

(57) ABSTRACT

An Apparatus System comprising the following: A Sustainable Hydro Electric Structured Water low-energy pumping mechanism to move water uphills. An Alternative Energy Booster Apparatus, providing additional electricity to batteries, increasing electricity from Solar Panels. Programmable Computer Controller's with integrated processes for distribution of Virtual Currency, from Crypto Mining for Distribution of Assets. An apparatus for generating electricity from a plurality of solar panels in rack mounting structure utilizing mirror tracking apparatus. An Apparatus for Multiple Cell Electricity Generation with Battery Storage and Electricity Generation Switching and Pumping Apparatus System combined. An Apparatus and Mechanism for Hugelkultur Farming, combined with Solar Panel racking. A Hybrid Apparatus for air heating, cooling and additional electricity generation, with structured water conditioning components including temperature controlled heating and cooling created from solar photo voltaic modules. With programmable computer controllers utilizing sensing devices for managing performance of the apparatus and the complete system.

20 Claims, 61 Drawing Sheets

(56) References Cited

U.S. PATENT DOCUMENTS

| | | | |
|---|---|---|---|
| 10,523,050 B2* | 12/2019 | Forbes, Jr. | G05F 1/66 |
| 10,861,112 B2* | 12/2020 | Forbes, Jr | H04L 69/325 |
| 2014/0279711 A1* | 9/2014 | Angelis | G06Q 10/06 |
| | | | 705/412 |

* cited by examiner

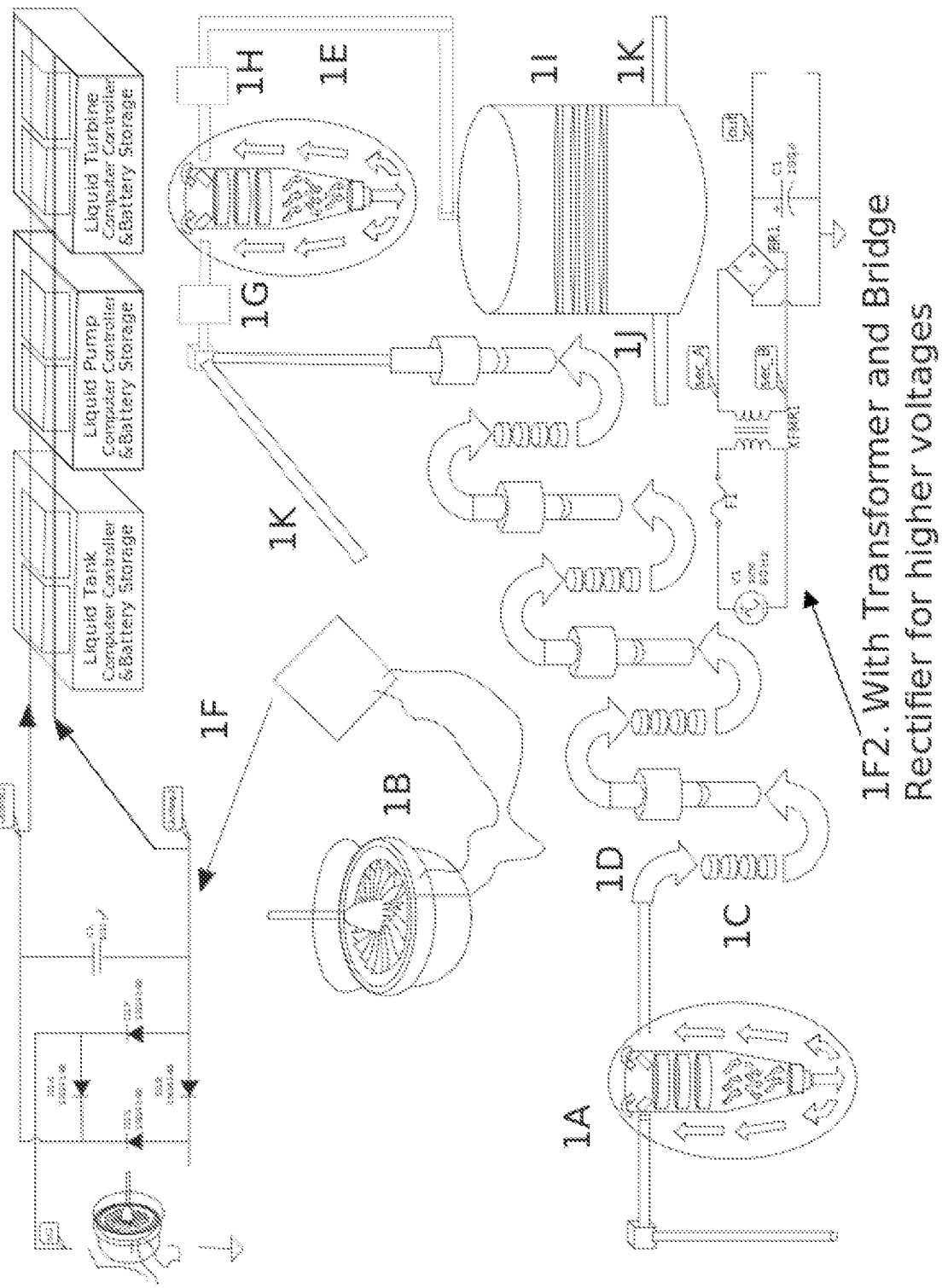

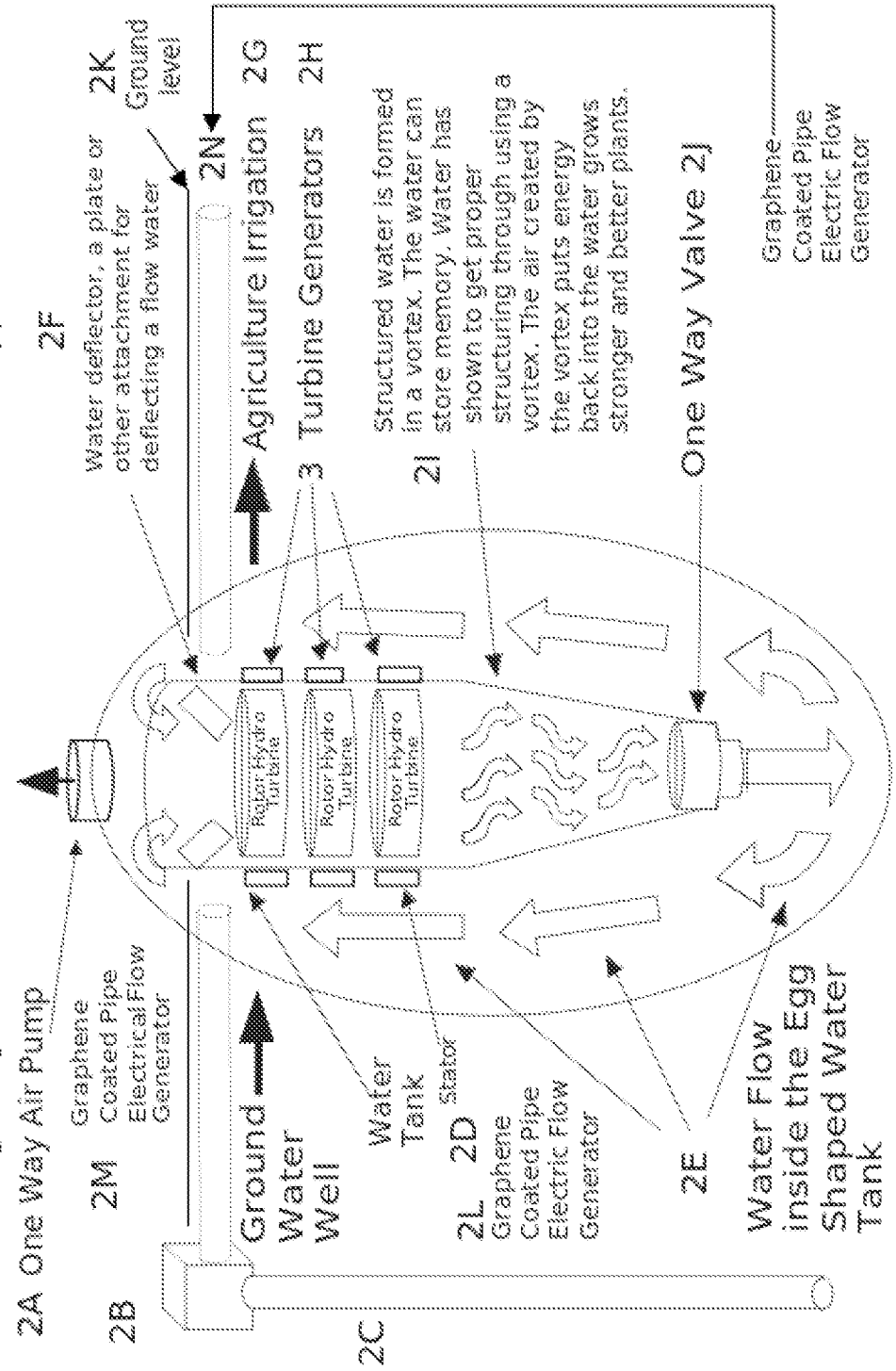

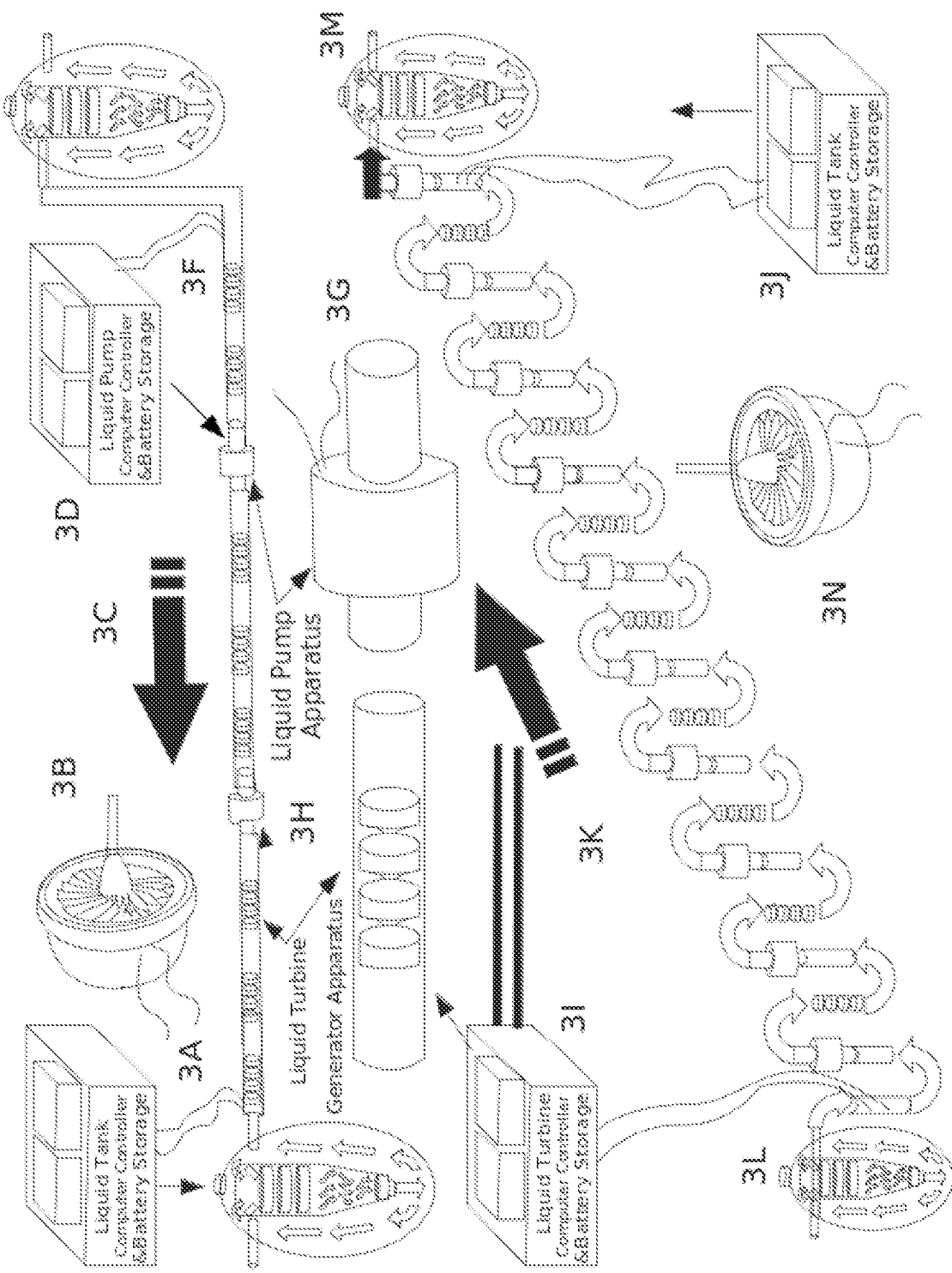

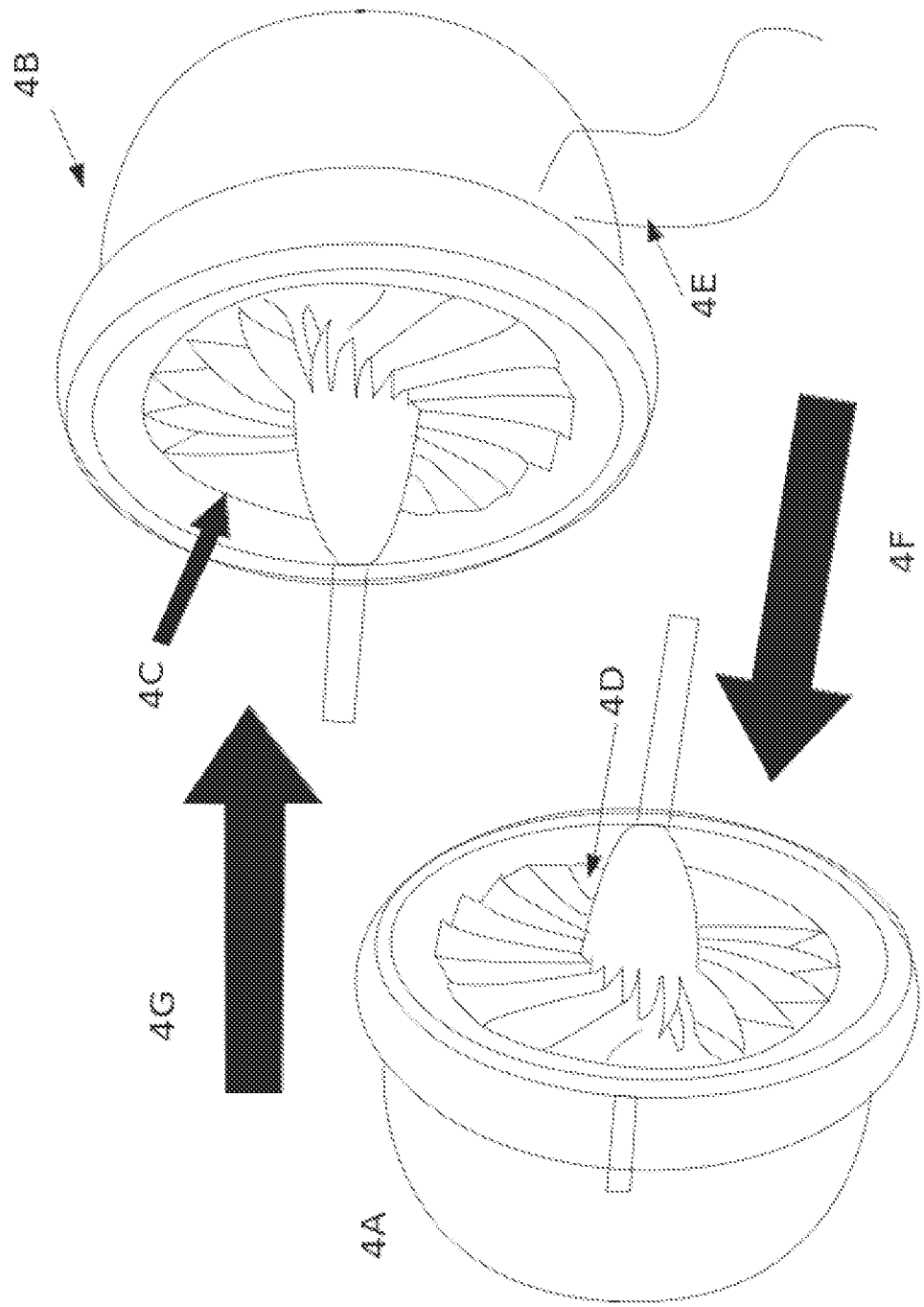
Fig. 4  Pump Generator Energy Storage Hydro turbine Apparatus

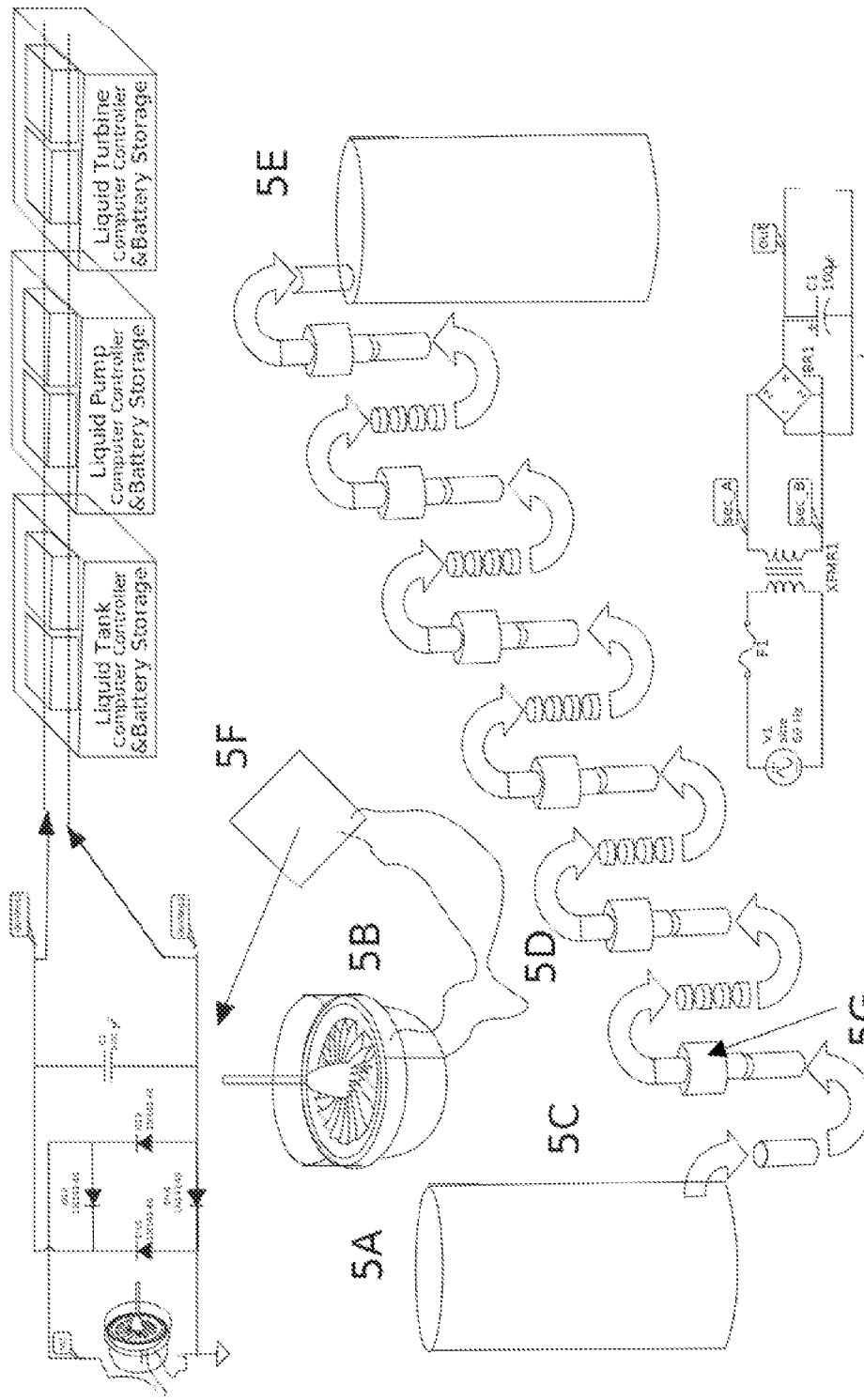

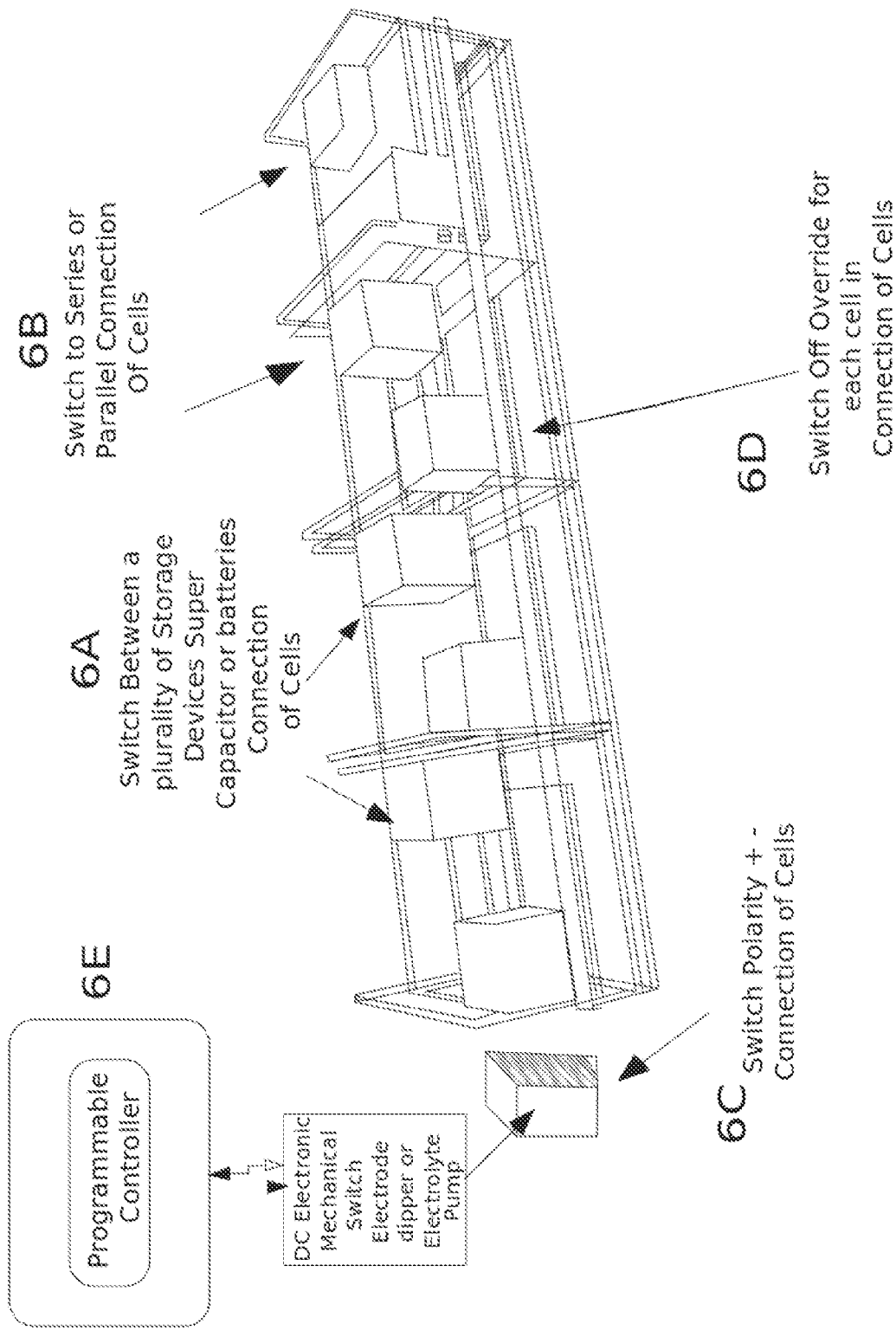
Fig 6 Switching System for Shutoff of Cells, Modifying Polarity and Changing Circuit from Parallel to Series Connection

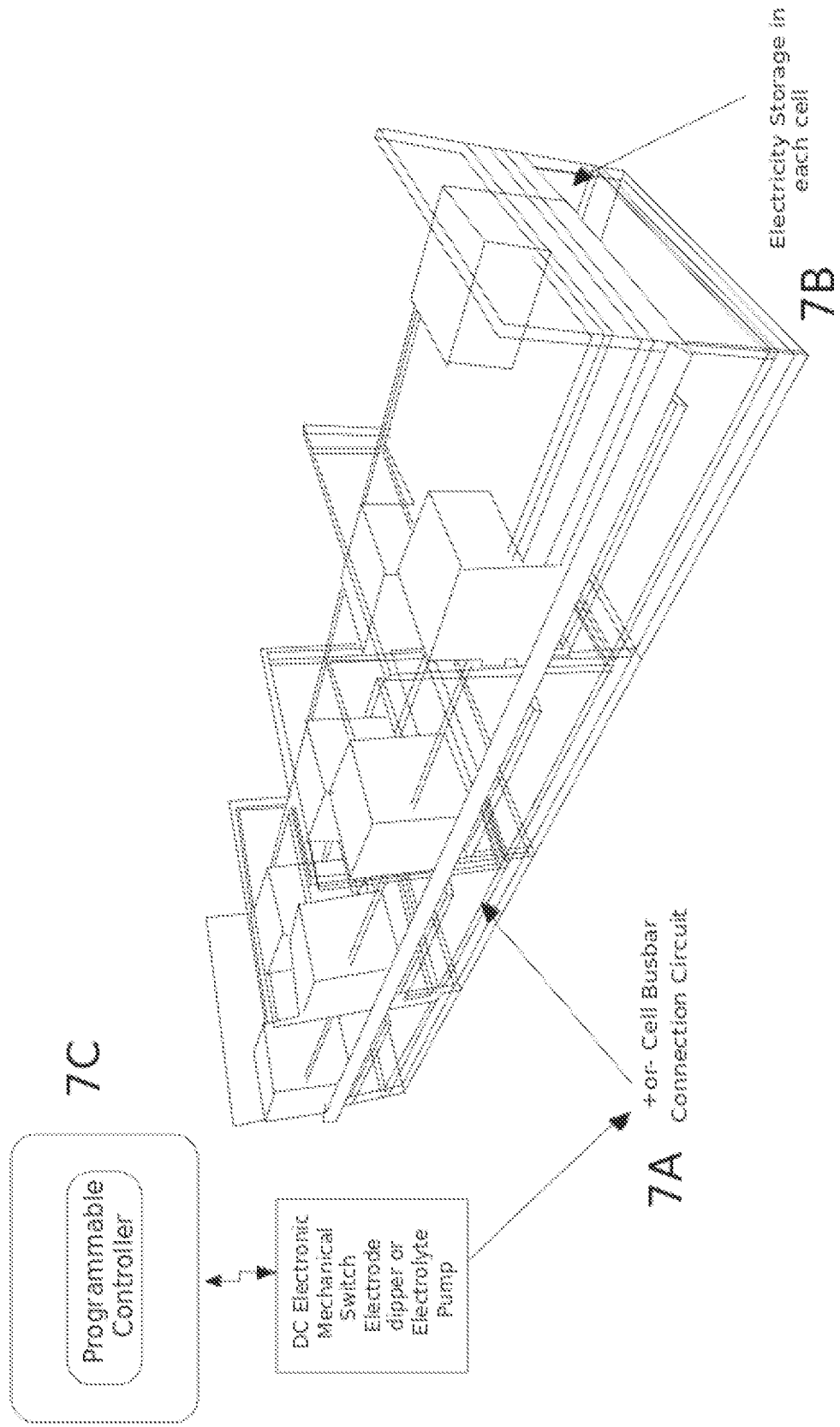
Fig. 7 Electricity Generation and Energy Storage Capacitor Area

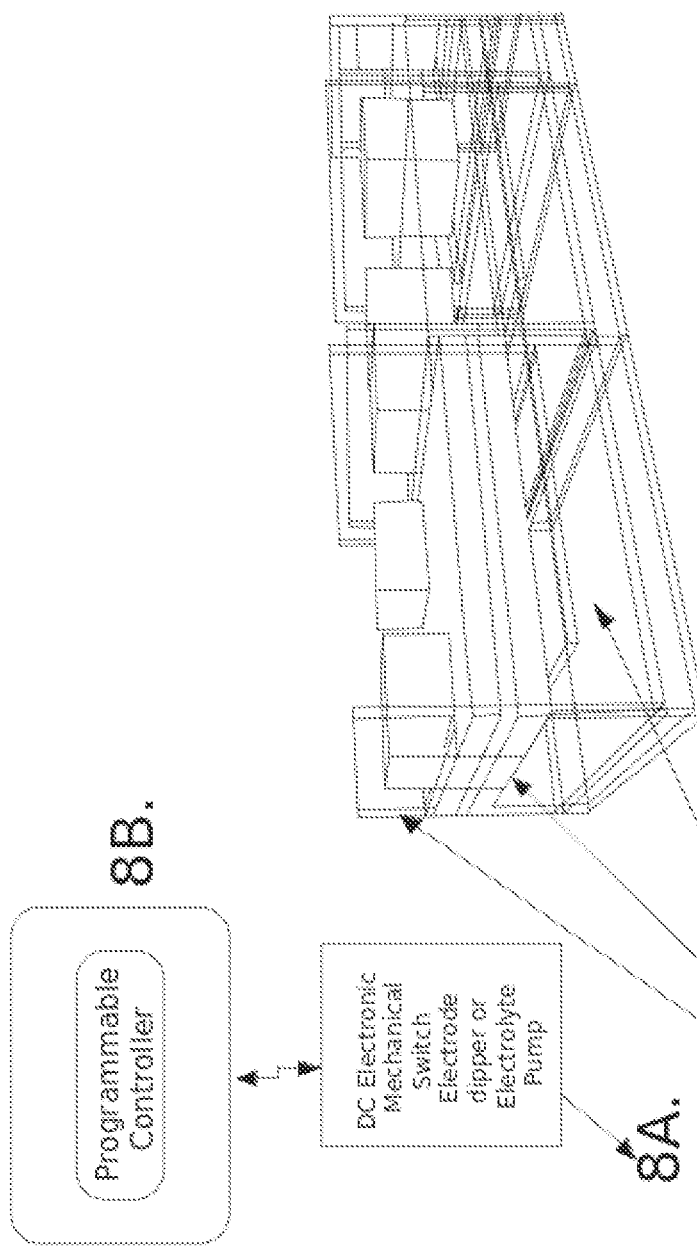
Fig. 8 Switching System for Shutoff of Cells and Modifying Polarity

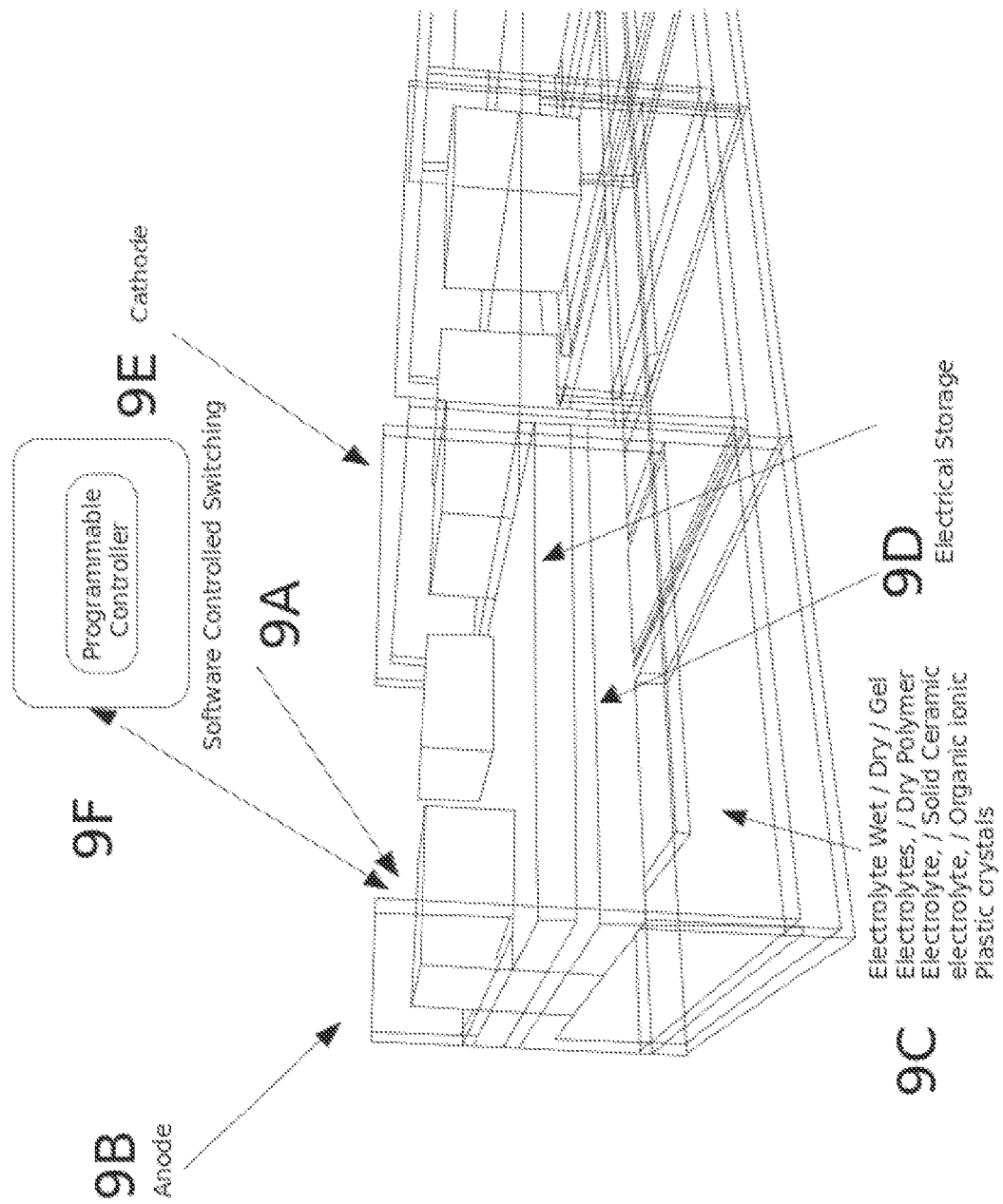
Fig. 9 Switching System for Shutoff of Cells and Modifying Polarity

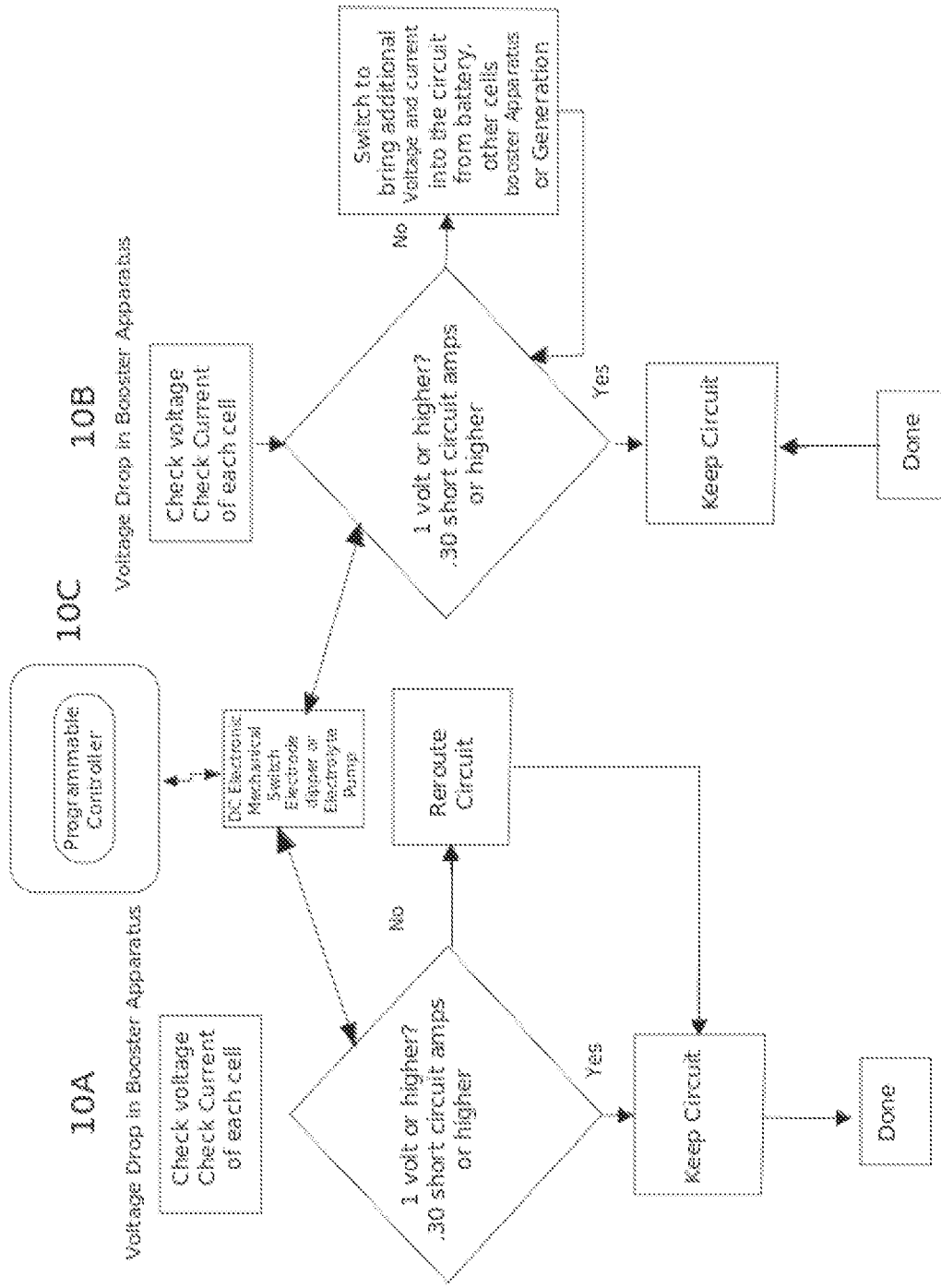

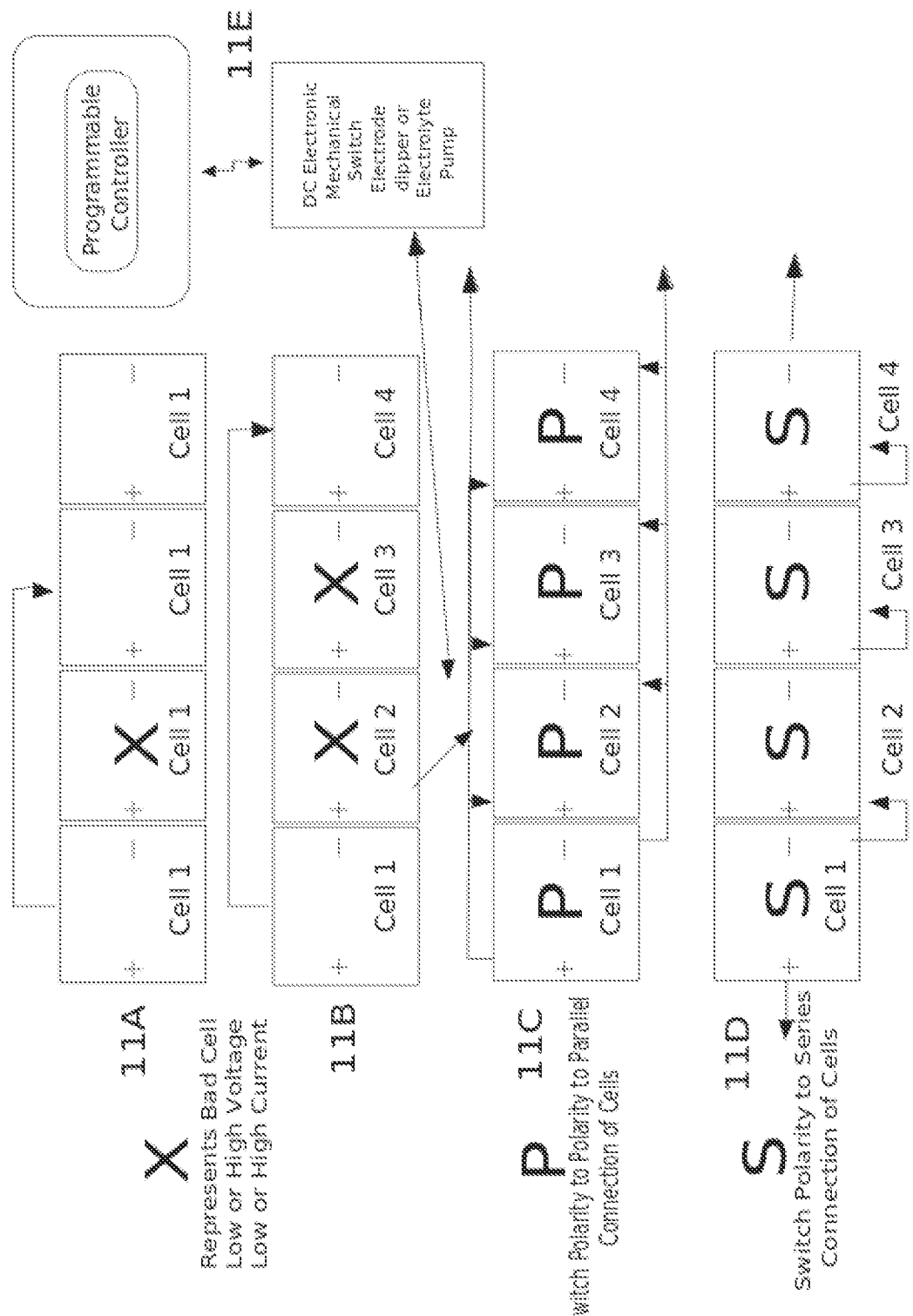

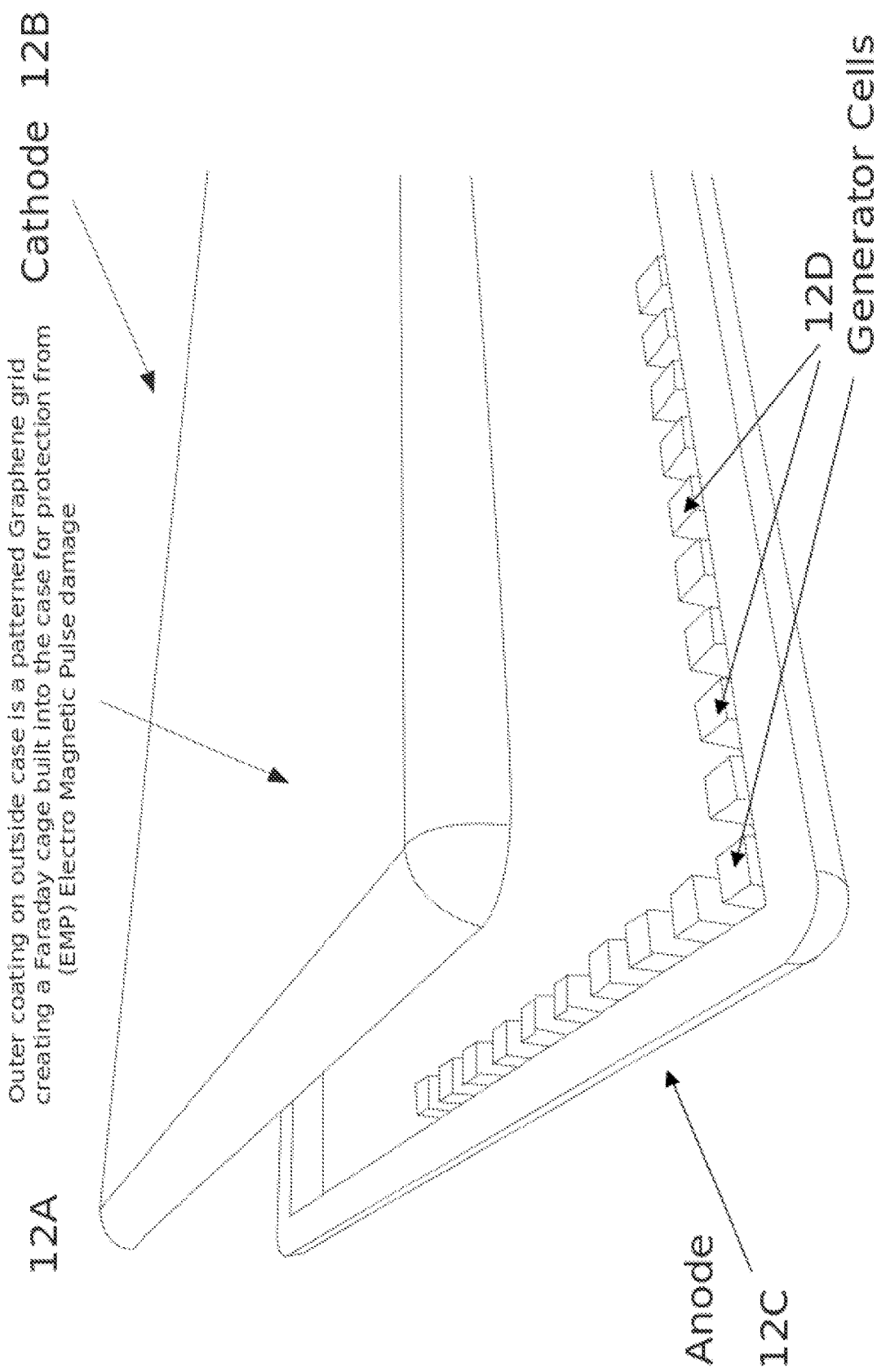

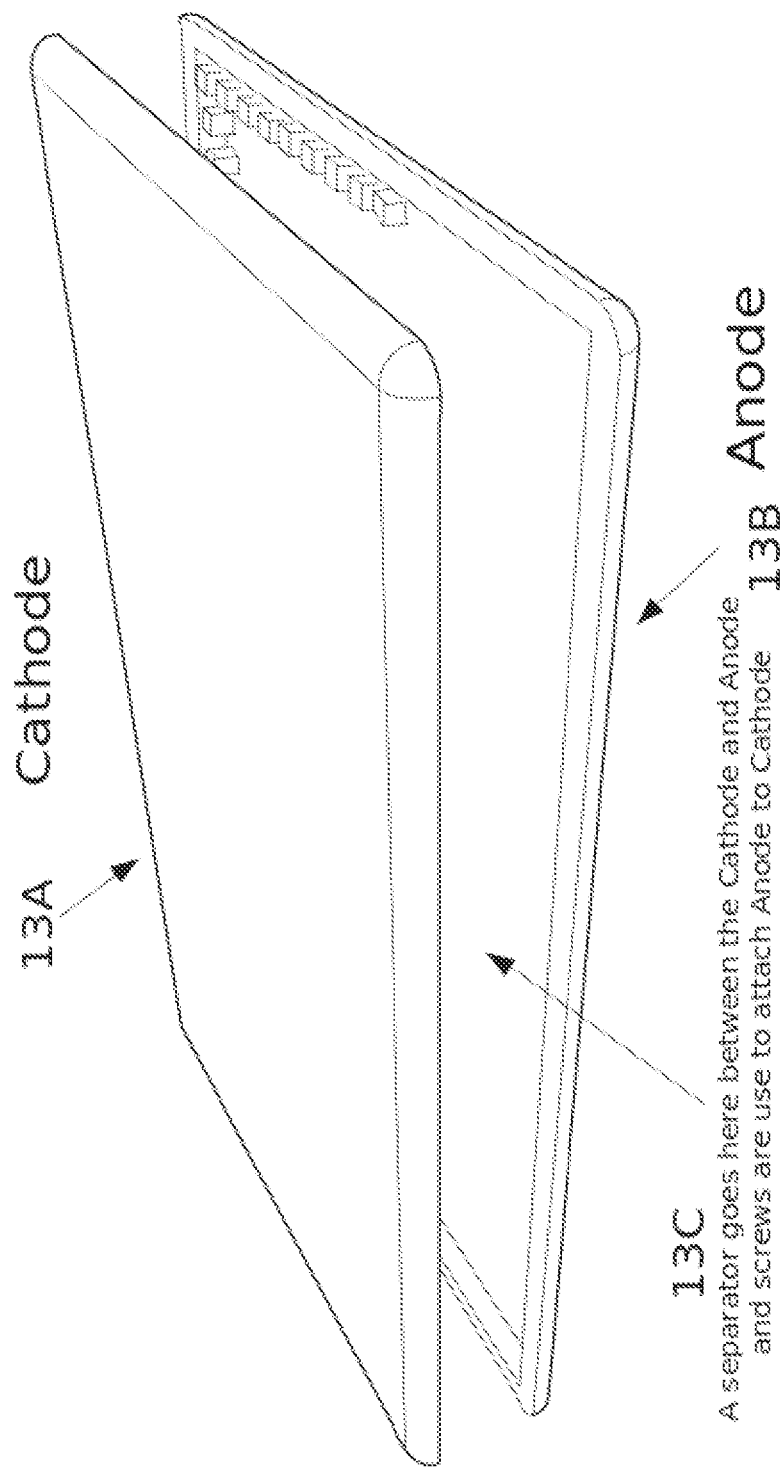

Fig.13 3D Printed Case with Layers of Materials to Create Anode and Cathode of Booster Apparatus The surfaces are created utilizing additive 3D printing processes, to create conductive surfaces. The purpose of manufacturing in this way, with this method reduces the assembly, and cost of manufacturing the Booster Apparatus 13A Cathode 13B Anode 13C A separator goes here between the Cathode and Anode and screws are use to attach Anode to Cathode

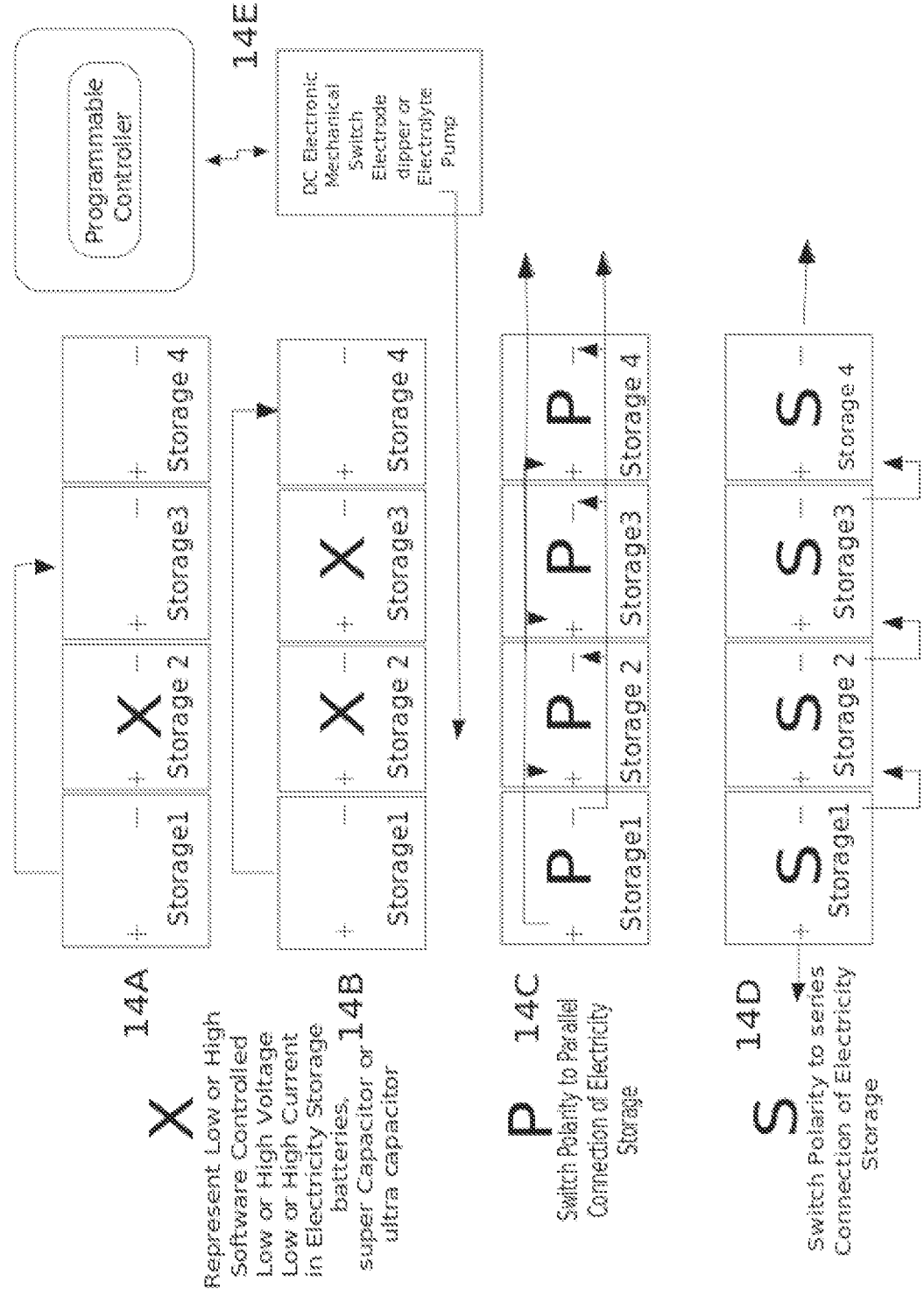
Fig. 14 Switching System for Shutoff and Programmable Software Controlled Management of Electricity Storage Apparatus and Modifying Polarity

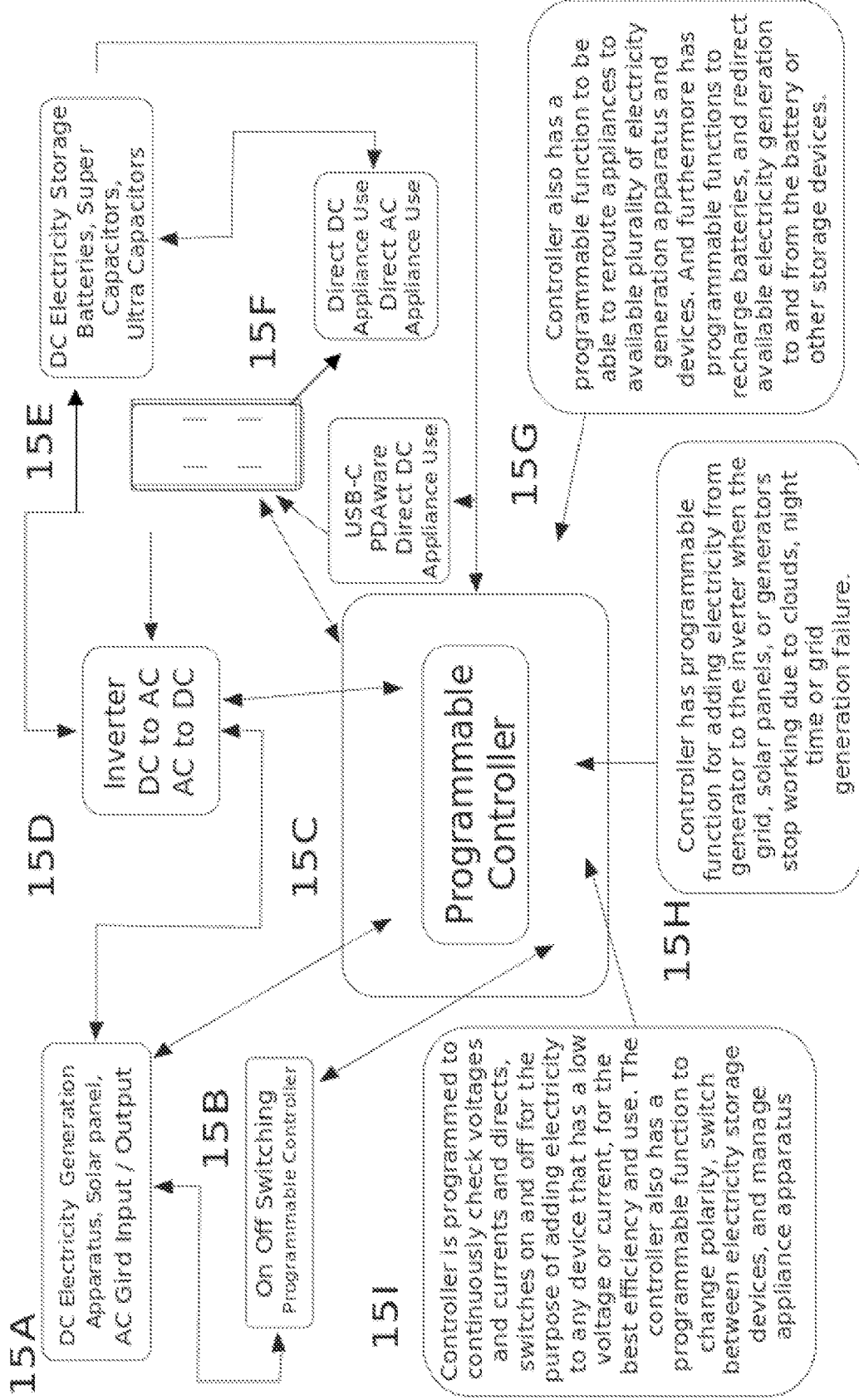
Fig. 15 Switching System for Shutoff and Programmable Software Controlled Management of Electricity Generation, Use and Storage Apparatus

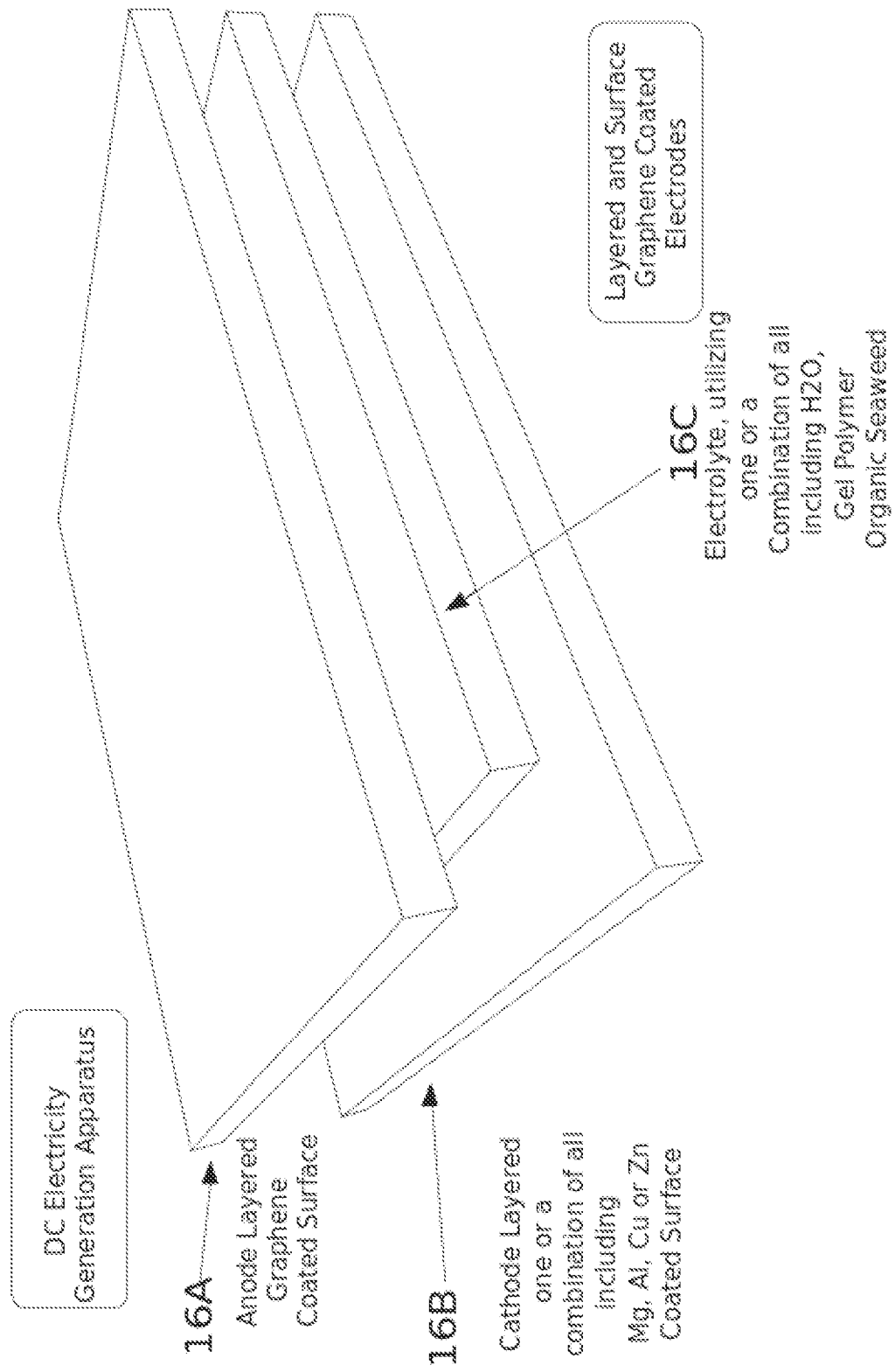
Fig. 16 DC Electricity Generation Apparatus Booster Cell

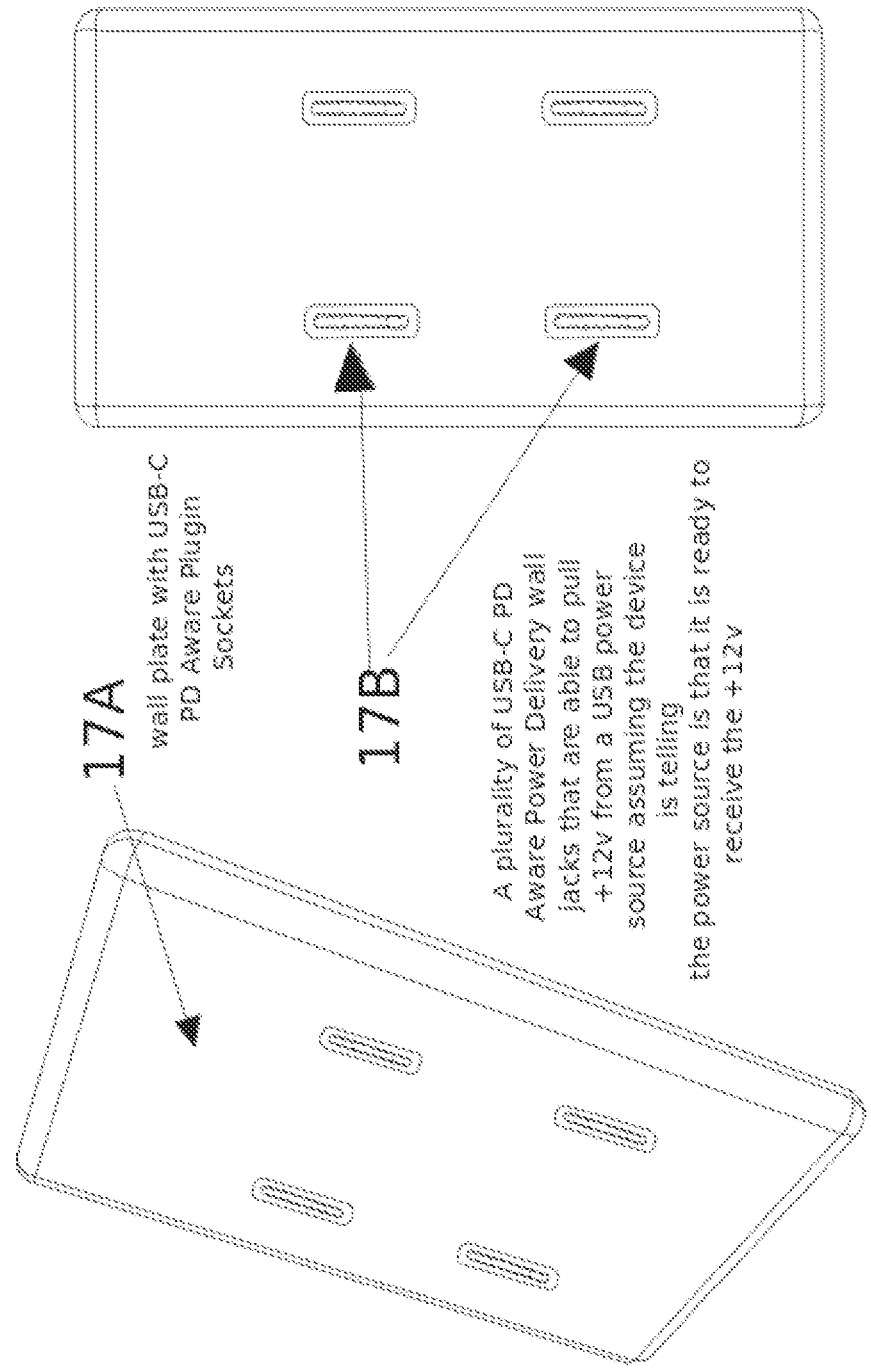
Fig. 17 Alternative Energy Booster Apparatus
DC Electricity USB-C PDAware Wall Adaptor Apparatus

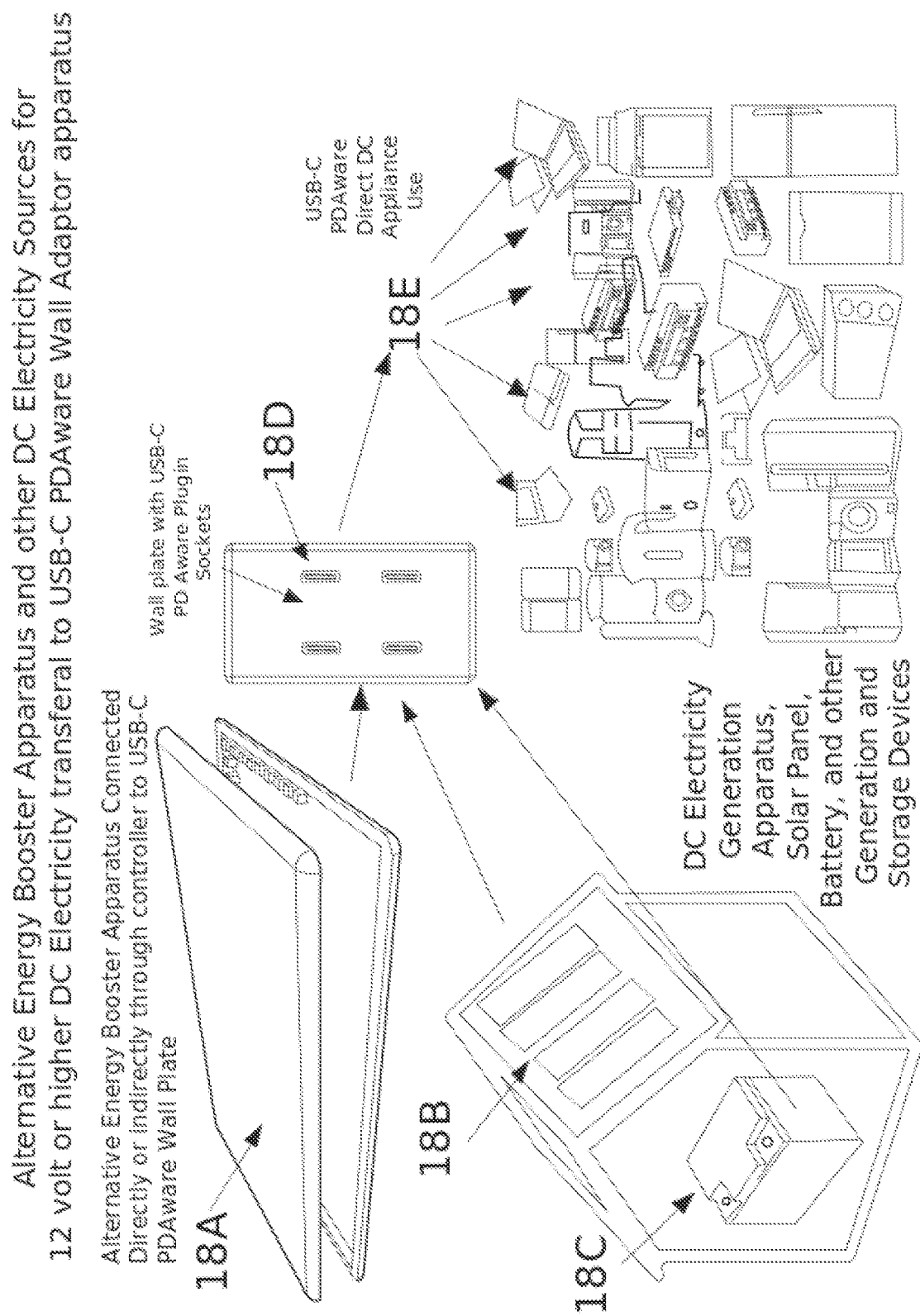
Fig. 18 Alternative Energy Booster Apparatus and other DC Electricity Sources for 12 volt or higher DC Electricity transferal to USB-C PDAware Wall Adaptor apparatus

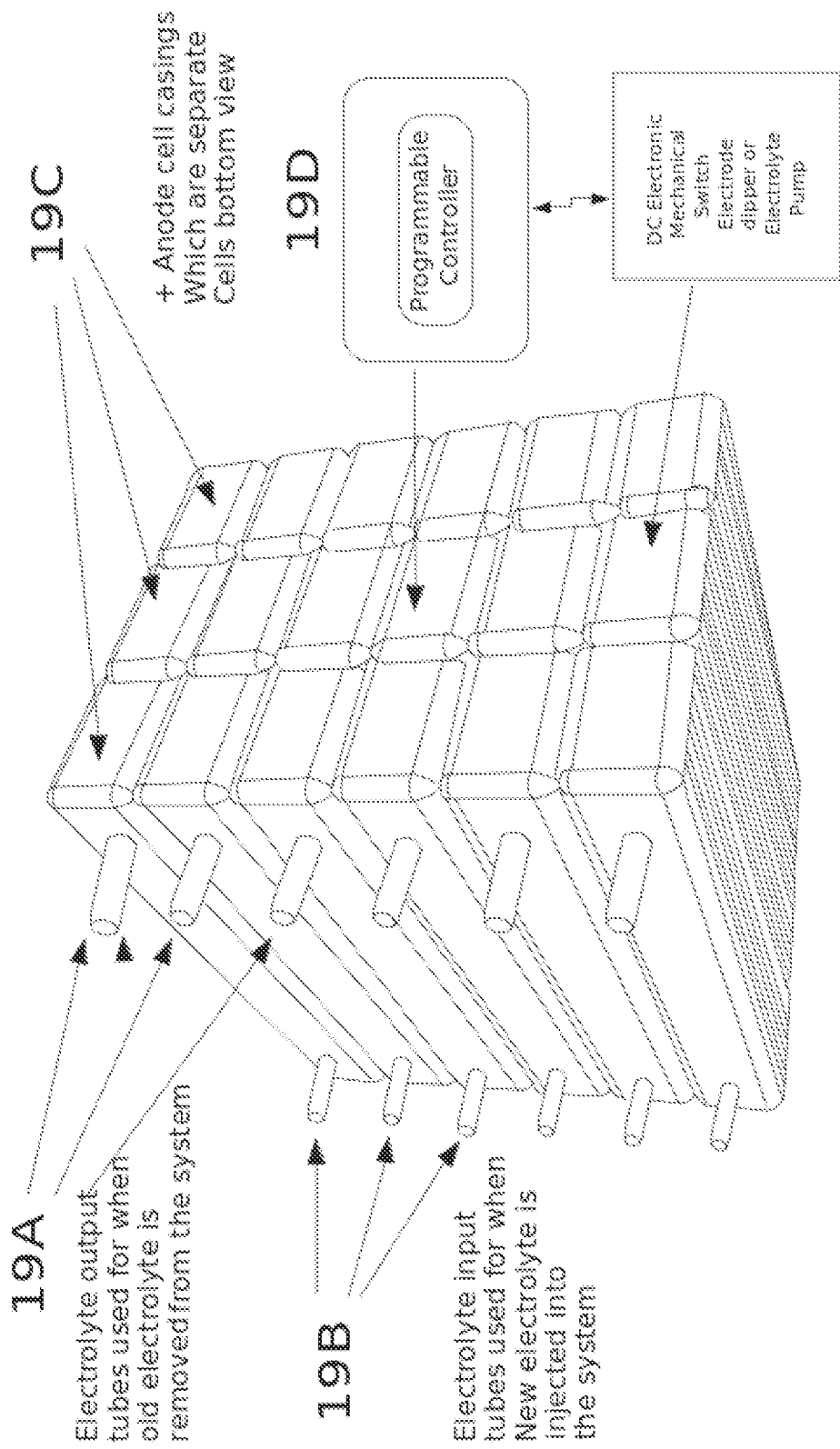
Fig. 19 Electrolyte Pumping Apparatus for Plurality of Cells with Electrode Cell Casings, and programmable Controller for Electrolyte delivery

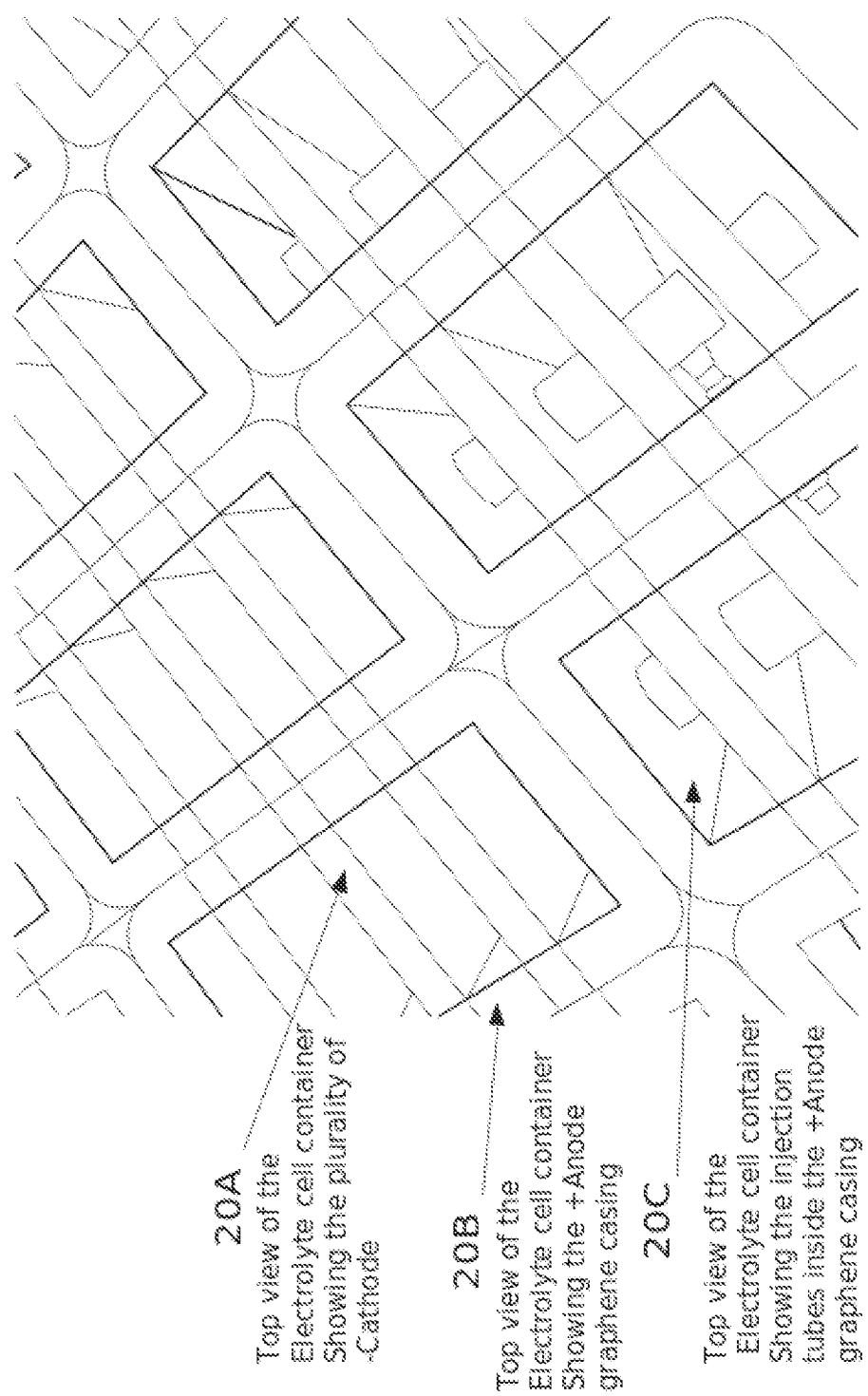

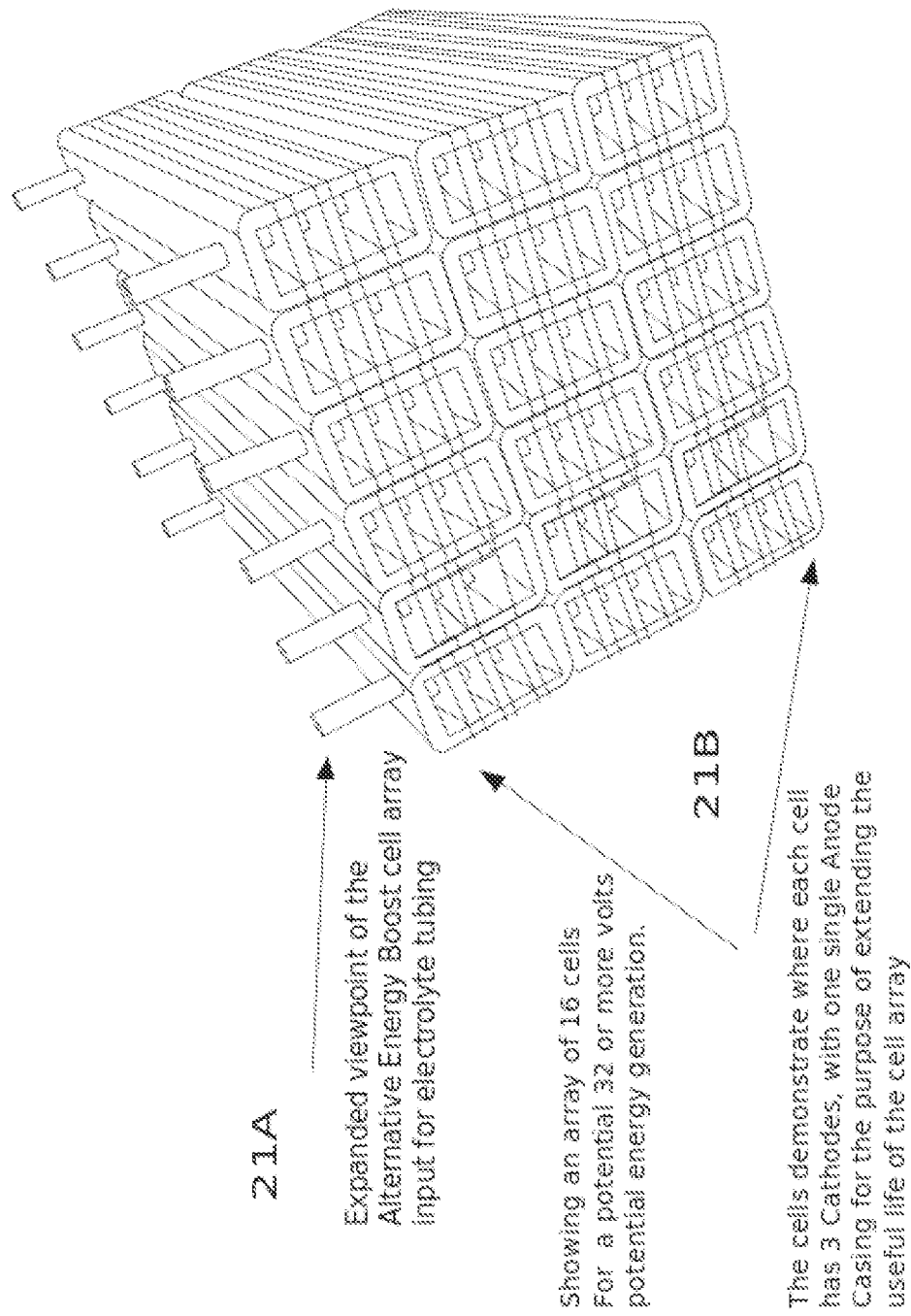

Fig. 21   Expanded view of Cell Array of the Apparatus and Functions

21A

Expanded viewpoint of the
Alternative Energy Boost cell array
input for electrolyte tubing Showing an array of 16 cells
For a potential 32 or more volts
potential energy generation.

21B

The cells demonstrate where each cell
has 3 Cathodes, with one single Anode
Casing for the purpose of extending the
useful life of the cell array

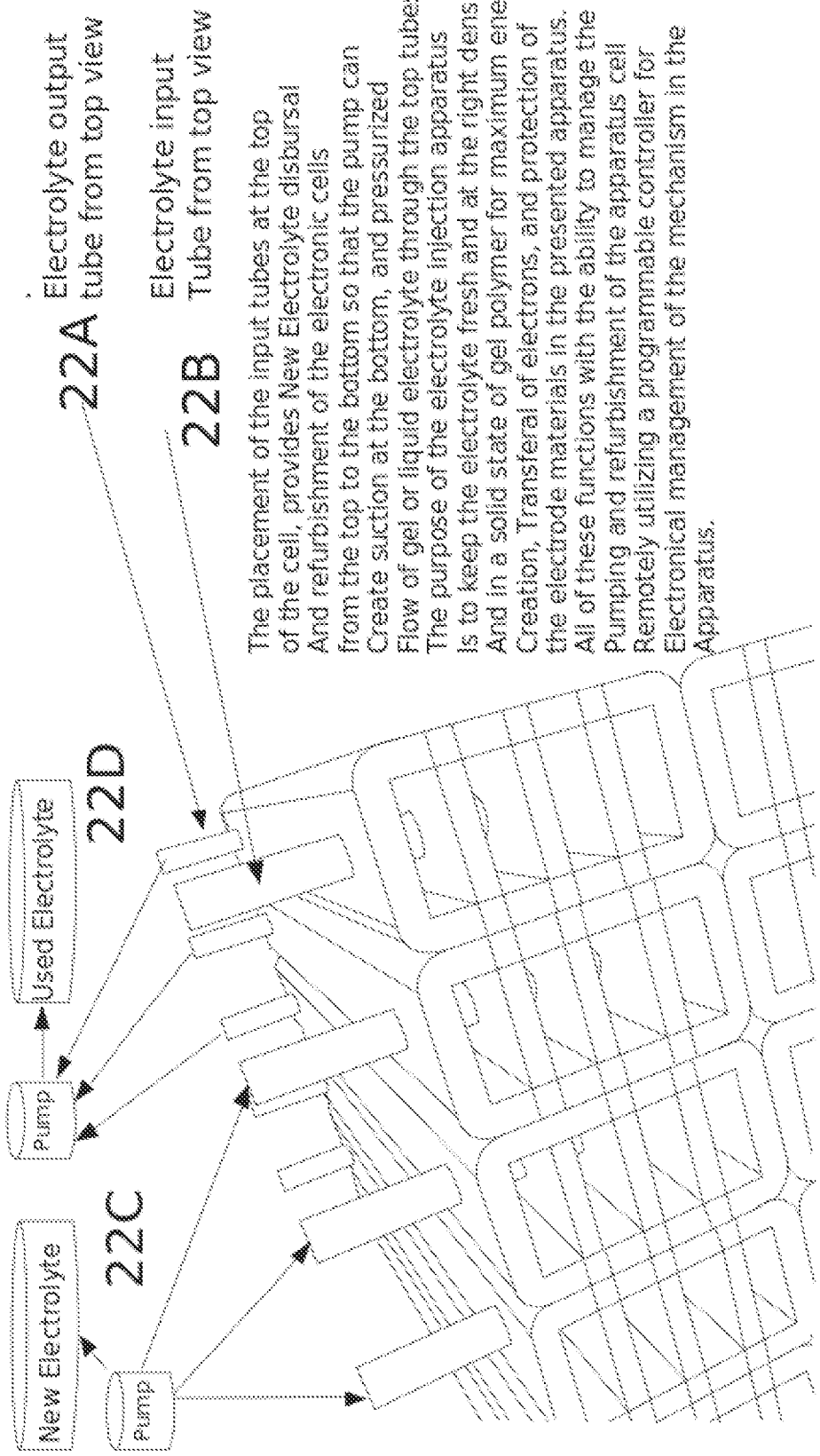

Fig. 22 Placement of Input and Output Electrolyte Delivery Apparatus Describing Disbursal and Refurbishment with Pump in System 22A Electrolyte output tube from top view 22B Electrolyte input Tube from top view The placement of the input tubes at the top
of the cell, provides New Electrolyte disbursal
And refurbishment of the electronic cells
from the top to the bottom so that the pump can
Create suction at the bottom, and pressurized
Flow of gel or liquid electrolyte through the top tubes.
The purpose of the electrolyte injection apparatus
Is to keep the electrolyte fresh and at the right density,
And in a solid state of gel polymer for maximum energy
Creation, Transferal of electrons, and protection of
the electrode materials in the presented apparatus.
All of these functions with the ability to manage the
Pumping and refurbishment of the apparatus cell
Remotely utilizing a programmable controller for
Electronical management of the mechanism in the
Apparatus.

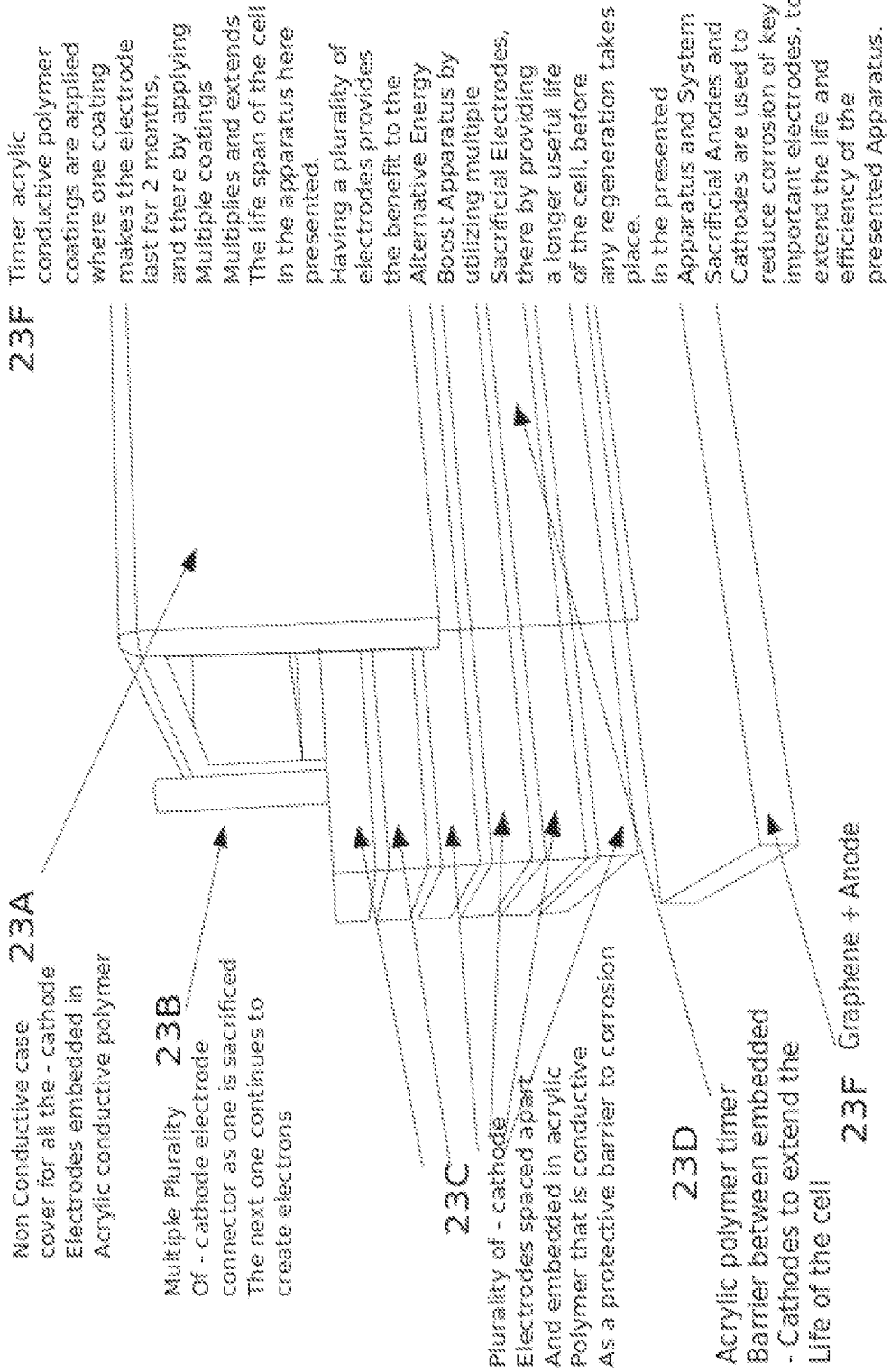

Fig. 23 Sacrificial Electrode Stack with Timer Acrylic Polymer Coating Apparatus 23A Non Conductive case cover for all the - cathode Electrodes embedded in Acrylic conductive polymer 23B Multiple Plurality Of - cathode electrode connector as one is sacrificed The next one continues to create electrons 23C Plurality of - cathode Electrodes spaced apart And embedded in acrylic Polymer that is conductive As a protective barrier to corrosion 23D Acrylic polymer timer Barrier between embedded - Cathodes to extend the Life of the cell 23F Graphene + Anode 23F Timer acrylic conductive polymer coatings are applied where one coating makes the electrode last for 2 months, and there by applying Multiple coatings Multiplies and extends The life span of the cell in the apparatus here presented.
Having a plurality of electrodes provides the benefit to the Alternative Energy Boost Apparatus by utilizing multiple Sacrificial Electrodes, there by providing a longer useful life of the cell, before any regeneration takes place.
In the presented Apparatus and System Sacrificial Anodes and Cathodes are used to reduce corrosion of key important electrodes, to extend the life and efficiency of the presented Apparatus.

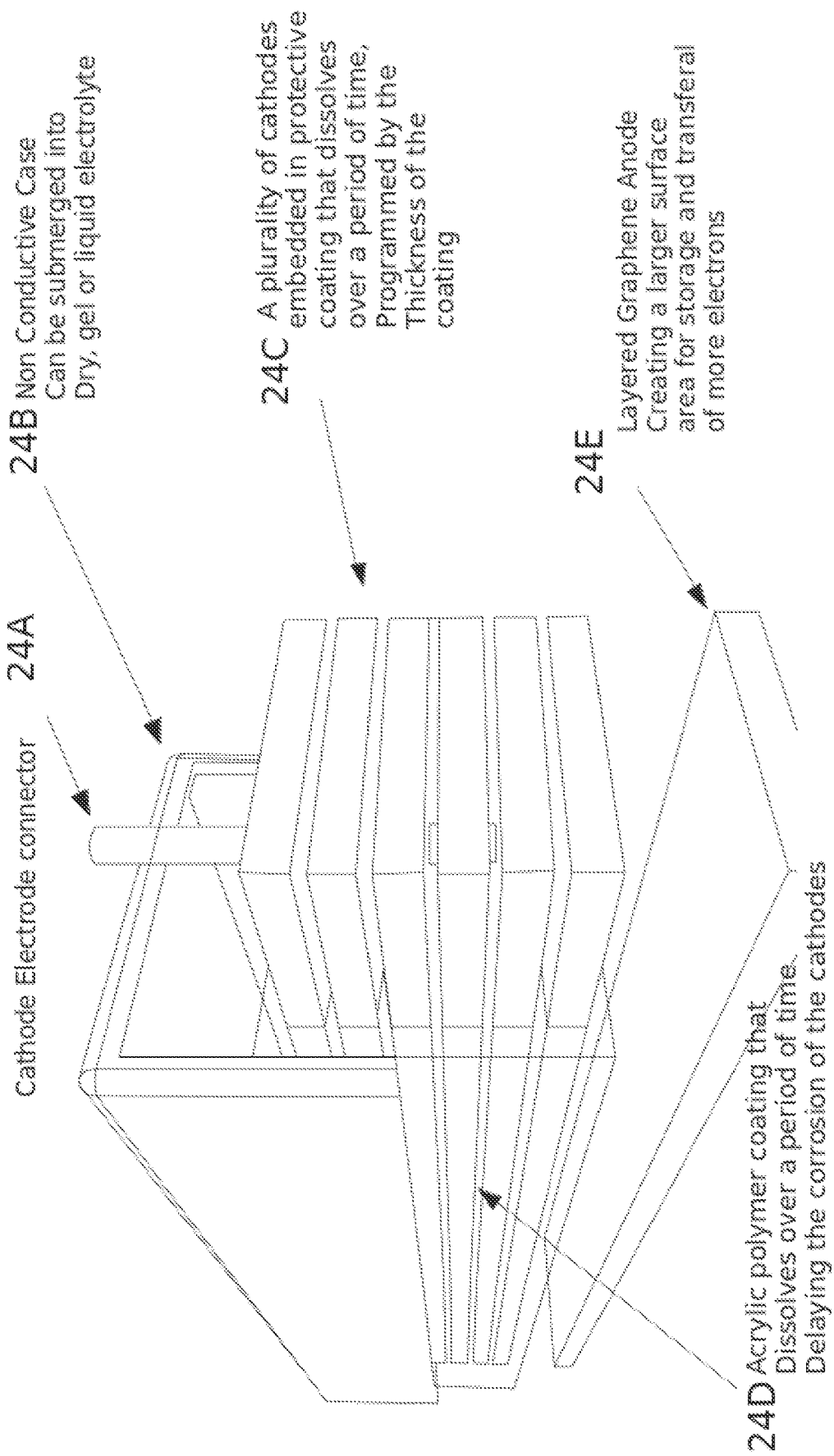

Fig. 24  Top View of Cathode Assembly in the Apparatus with Plurality of Cathodes 24A Cathode Electrode connector 24B Non Conductive Case Can be submerged into Dry, gel or liquid electrolyte 24C A plurality of cathodes embedded in protective coating that dissolves over a period of time. Programmed by the Thickness of the coating 24D Acrylic polymer coating that Dissolves over a period of time. Delaying the corrosion of the cathodes 24E Layered Graphene Anode Creating a larger surface area for storage and transferal of more electrons

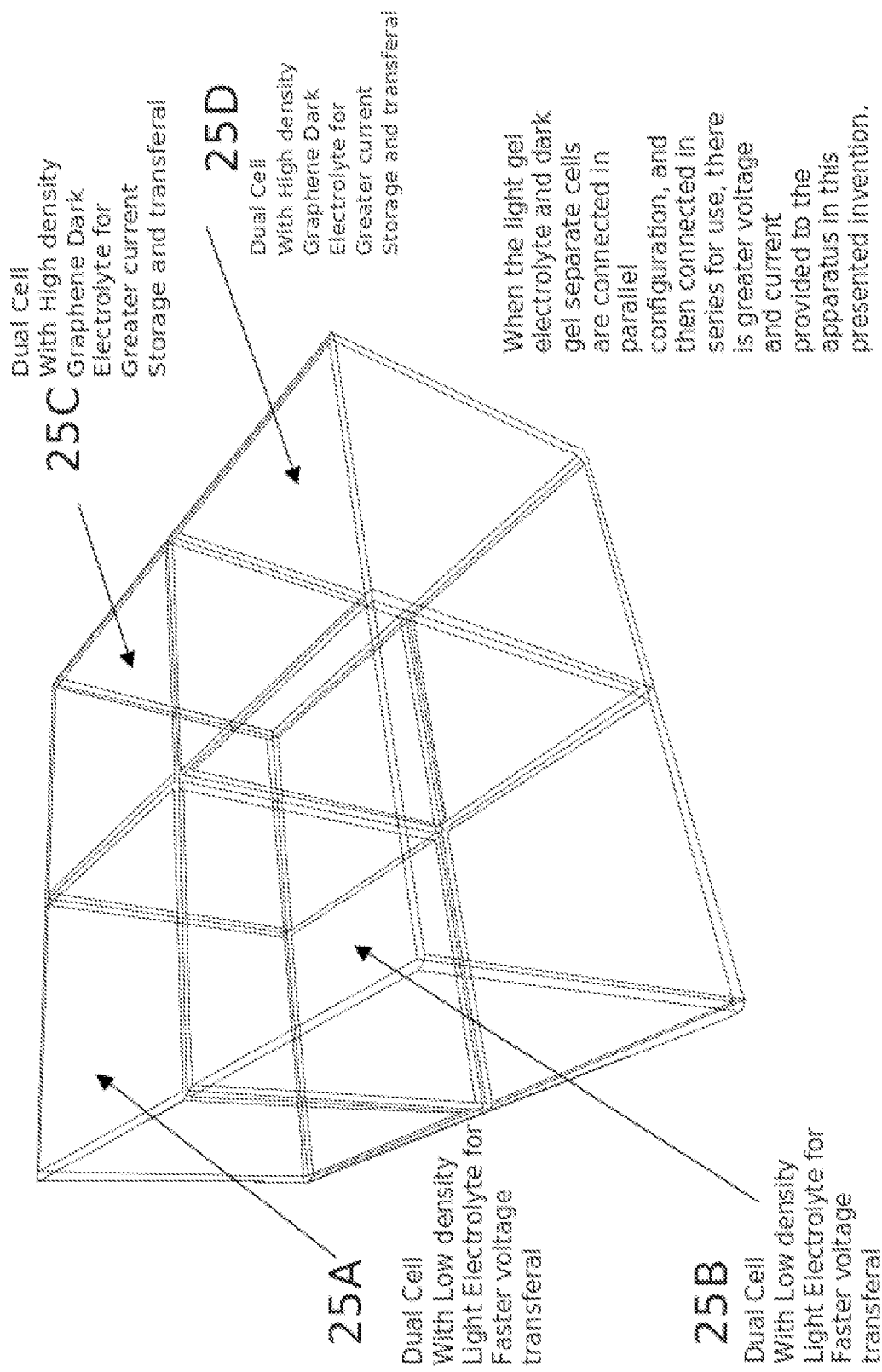
Fig. 25 Dual Cell Configuration of Low Density and High Density Electrolyte

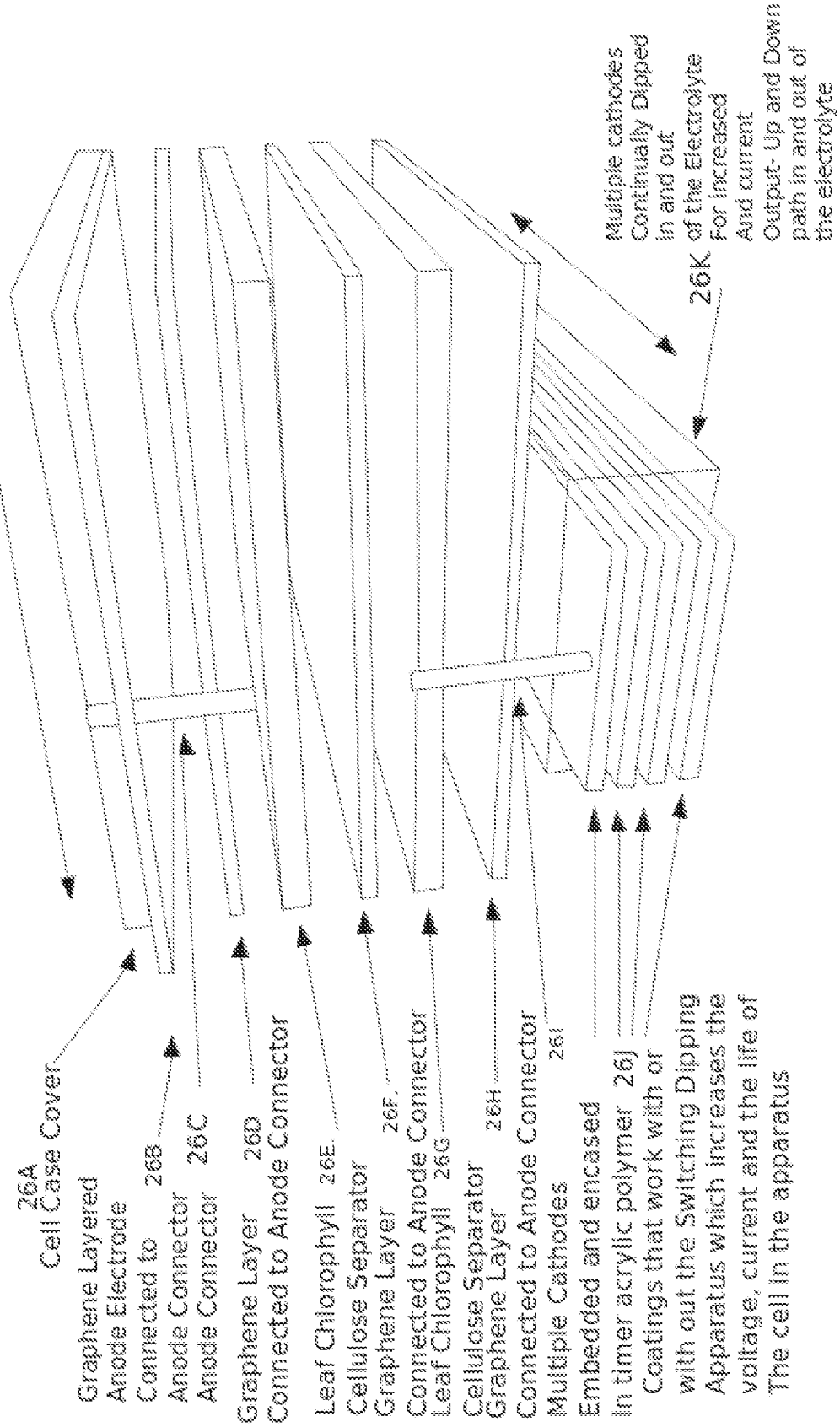

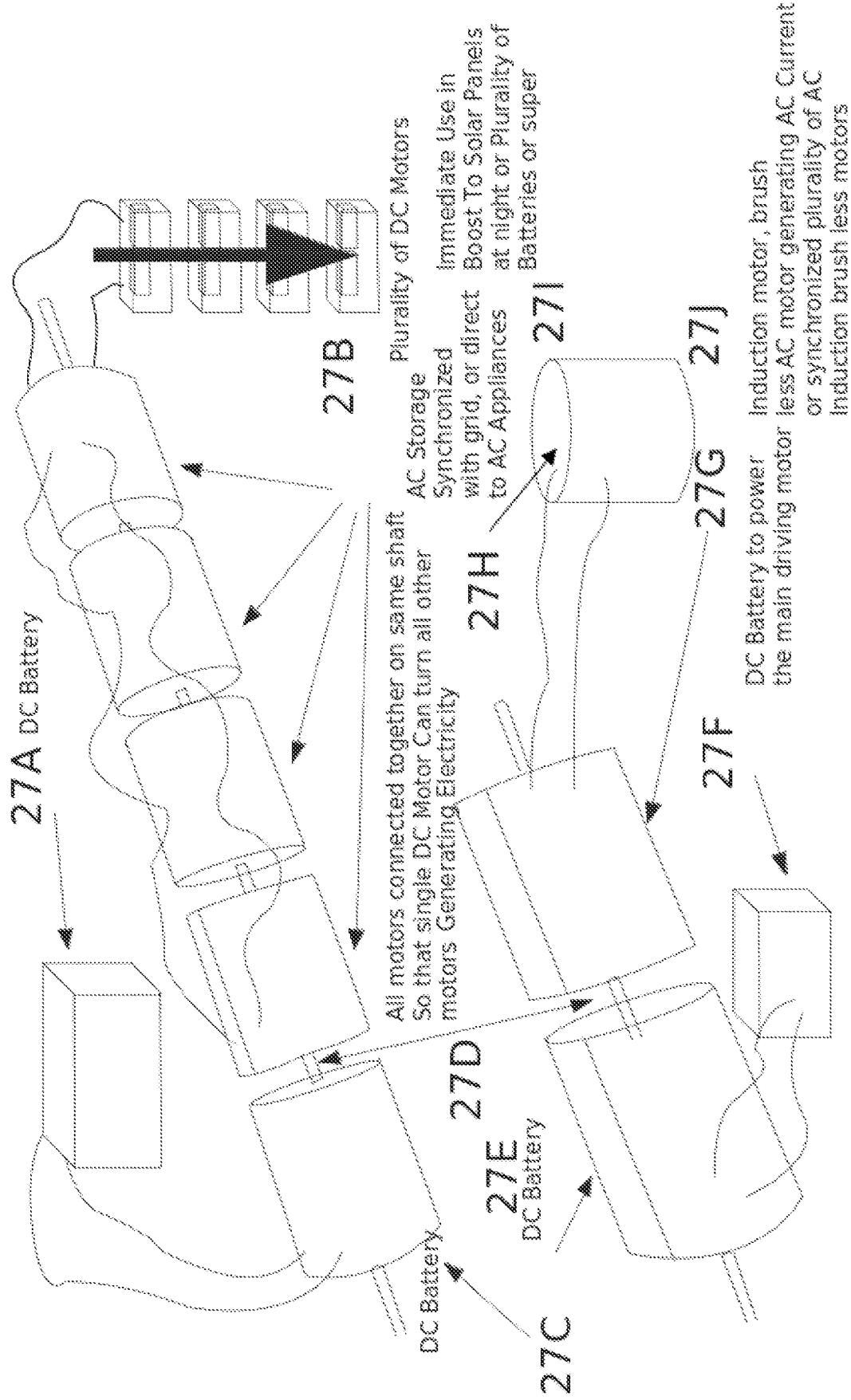
Fig. 27 Mechanical Generators Alternative Energy Apparatus Boost, Backup, Storage Components

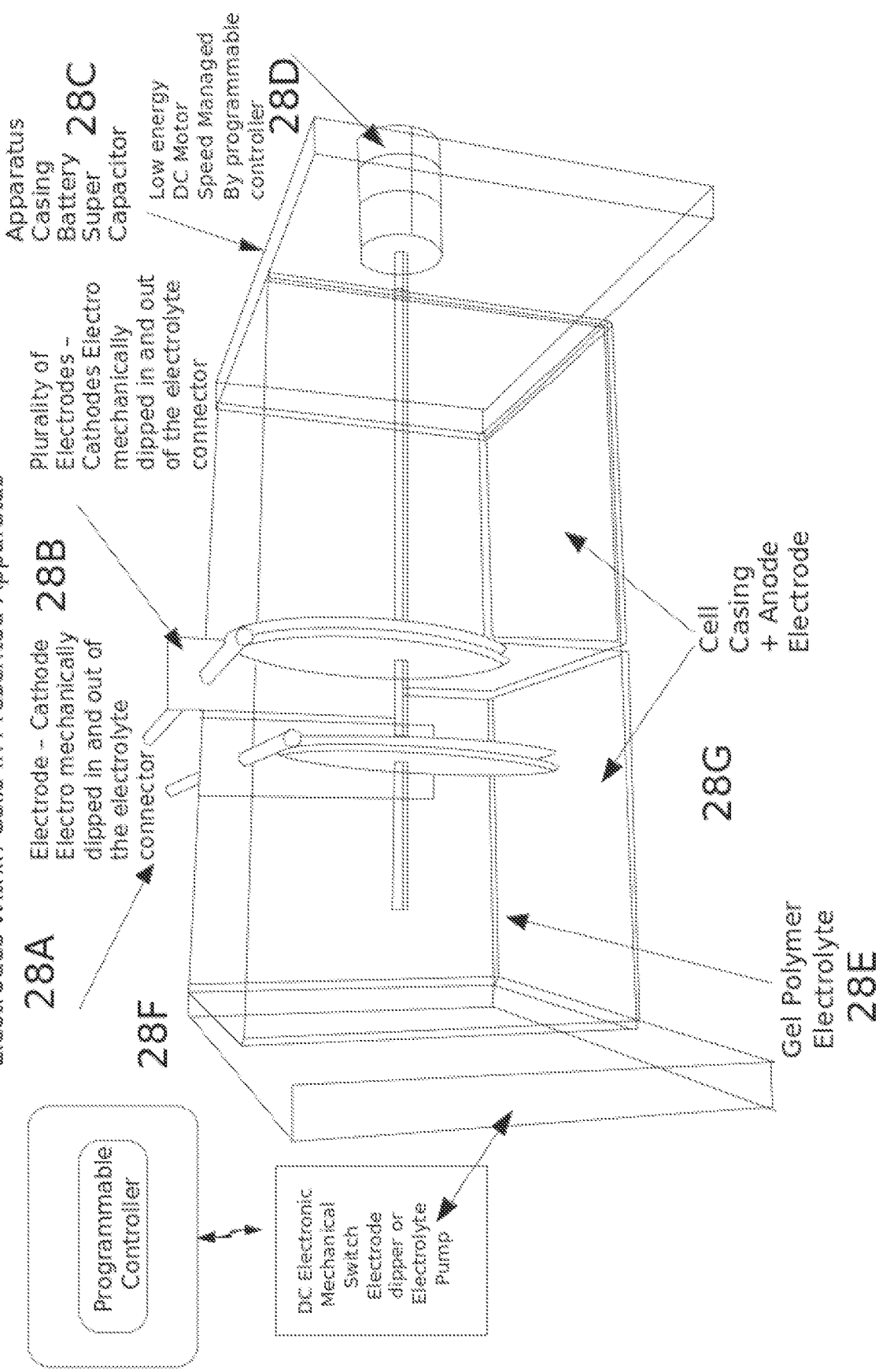

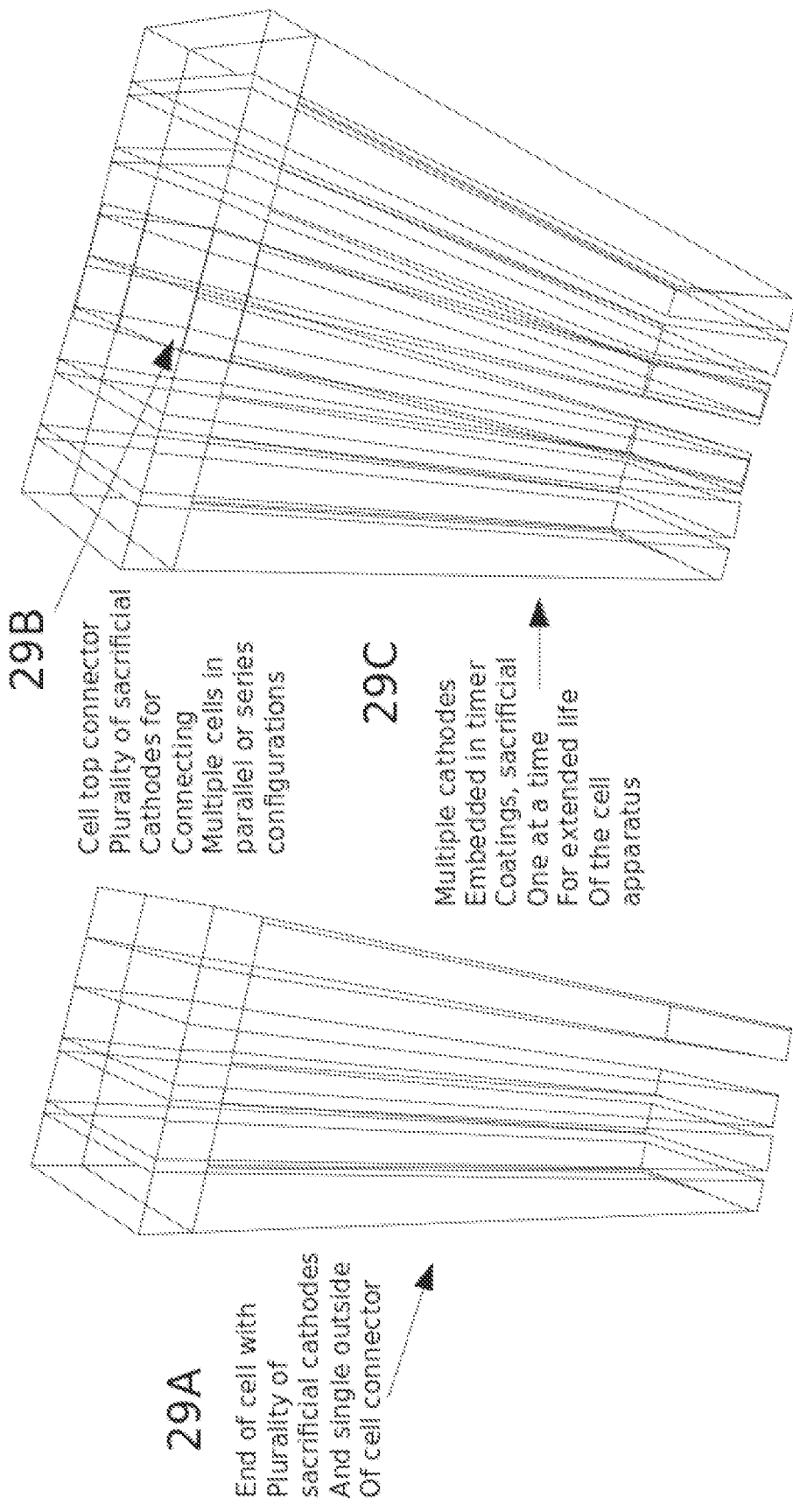

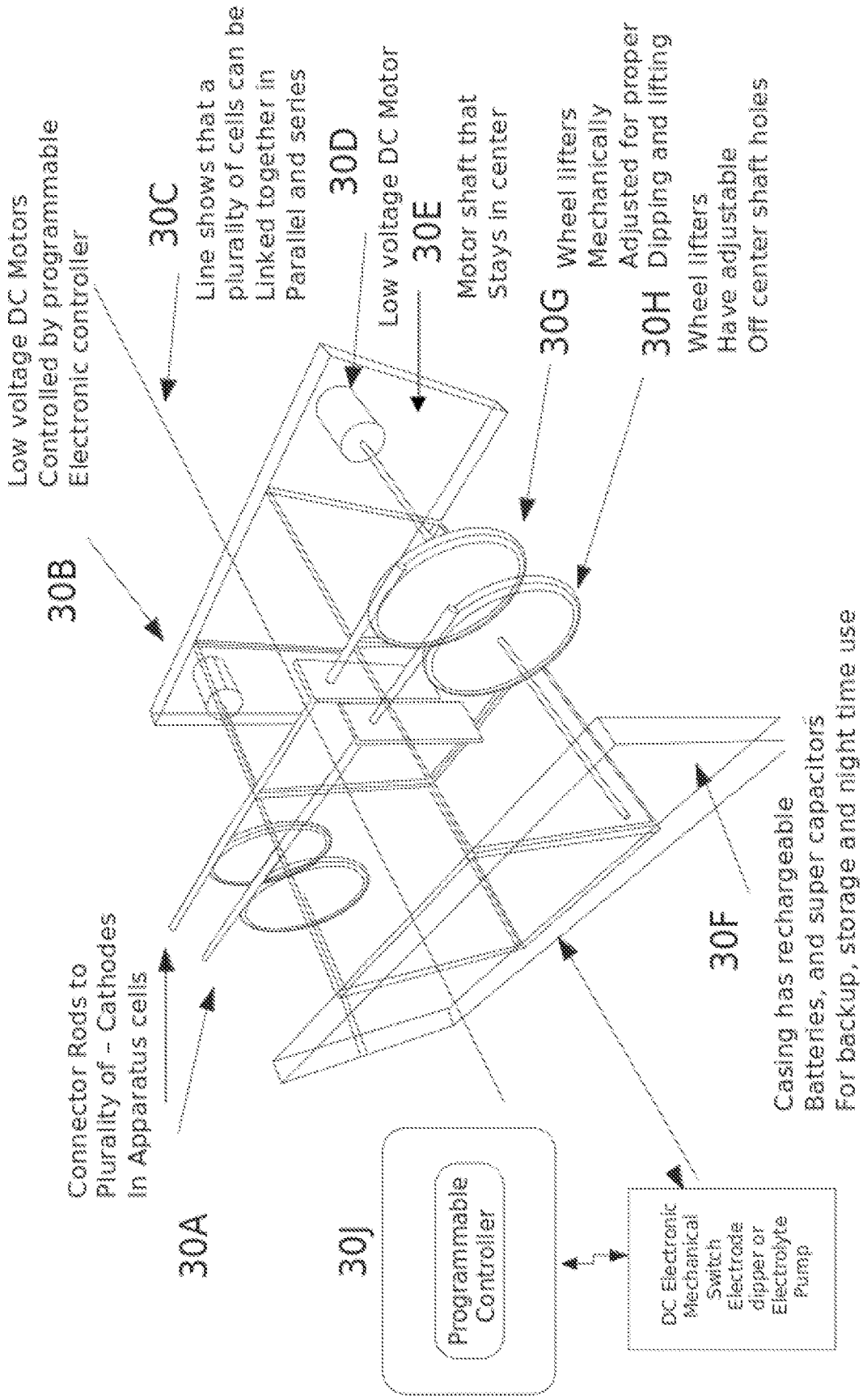
Fig. 30 Electro Mechanical Dipper Switching System for Switching Off and On Cells in Apparatus Electro Mechanical Dipping Switching System for Switching Off and On Cells in Apparatus Fig. 32 Wireless Electrical Transferal Component of the Apparatus Mobile Phone Payment System Connected to mechanically and electronically Shutting off of Cells, Modifying Polarity and reducing energy output of the Solar Panel Boost Apparatus

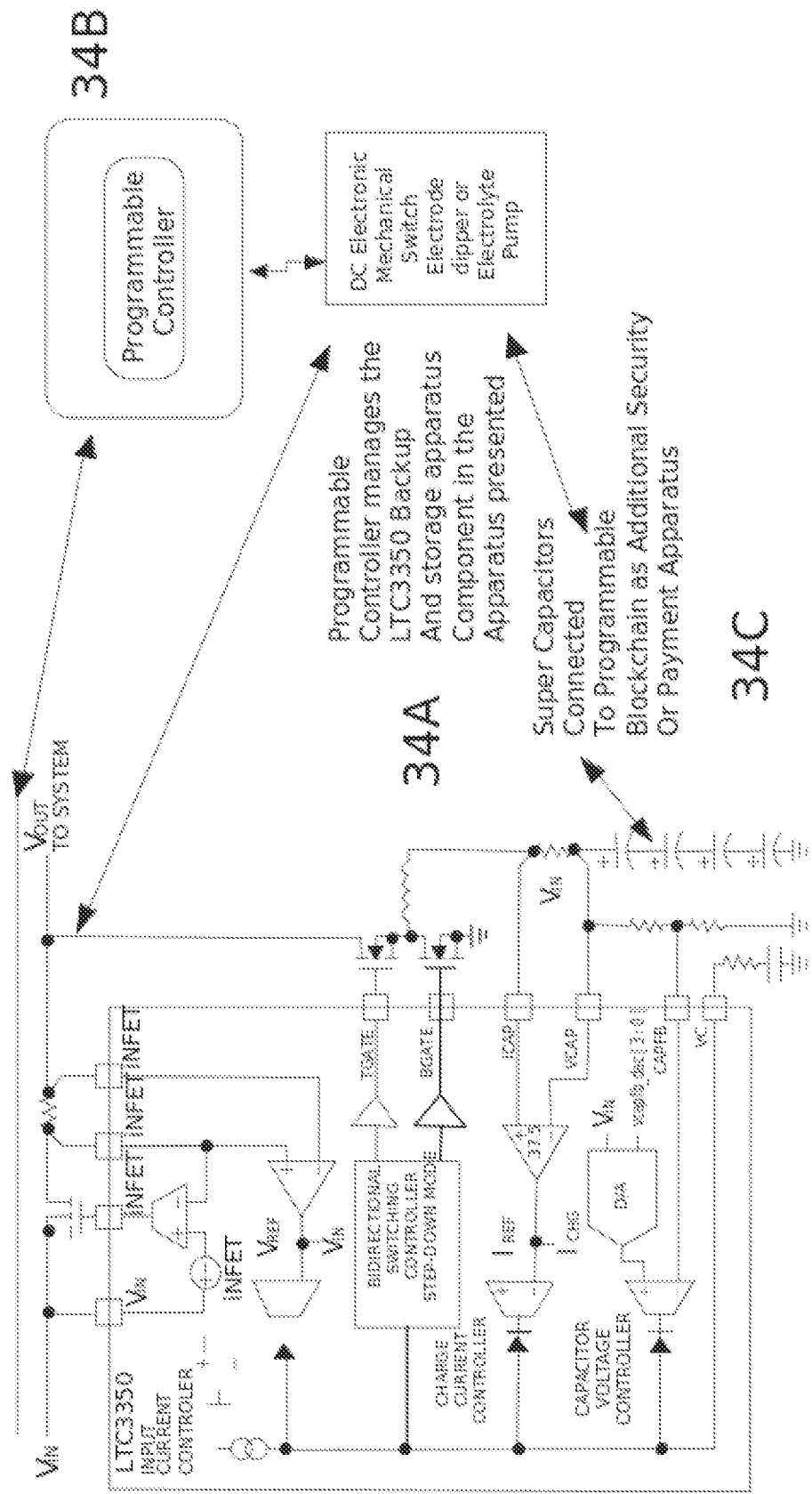
Fig. 34  Switching System for Shutoff of Cells and Modifying Polarity and Backing up Electricity, Storage of Electricity and Night Time Use Of Electricity

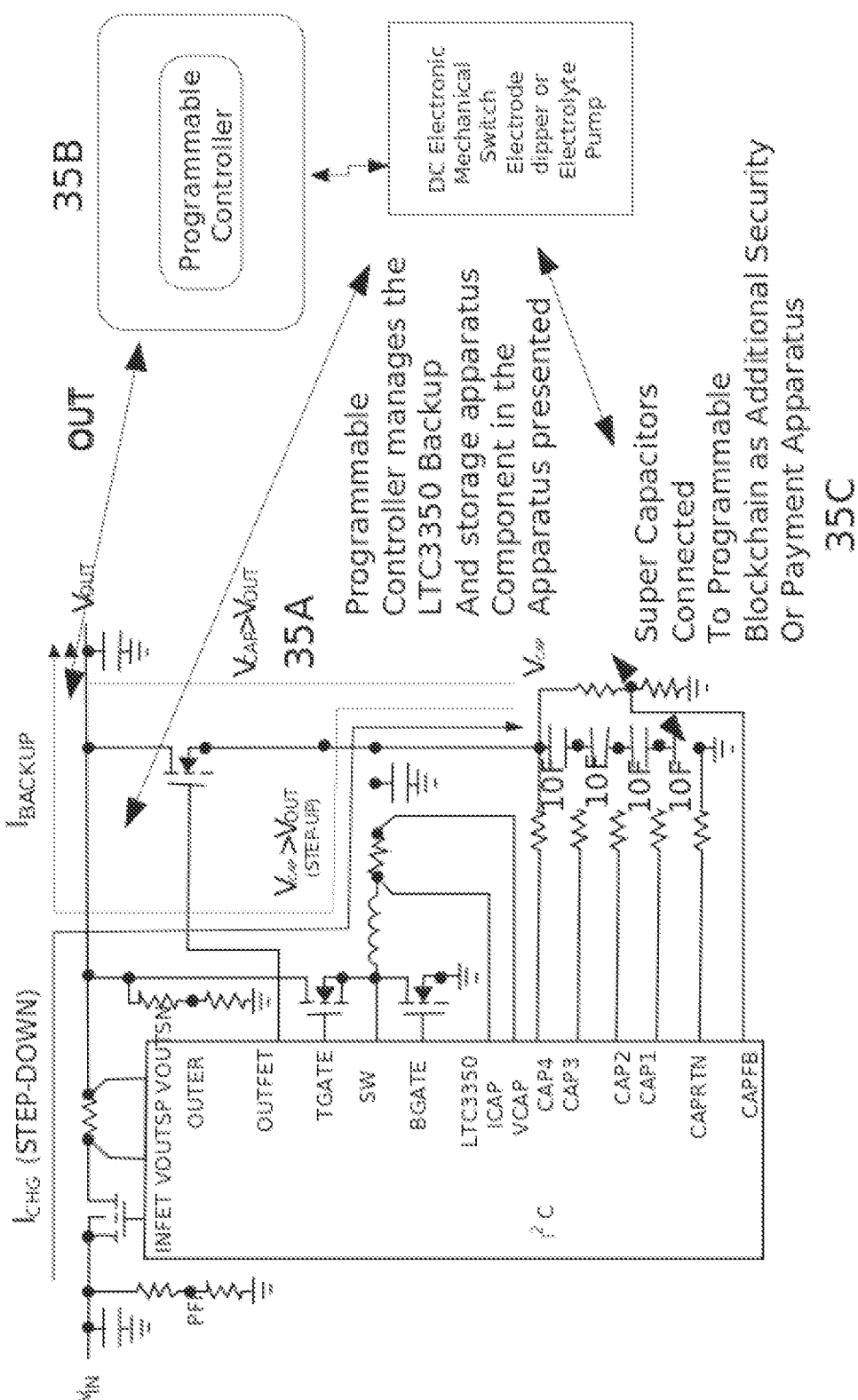
Fig. 35 Switching System for Shutoff of Cells and Modifying Polarity and Backing up Electricity, Storage of Electricity and Night Time Use Of Electricity

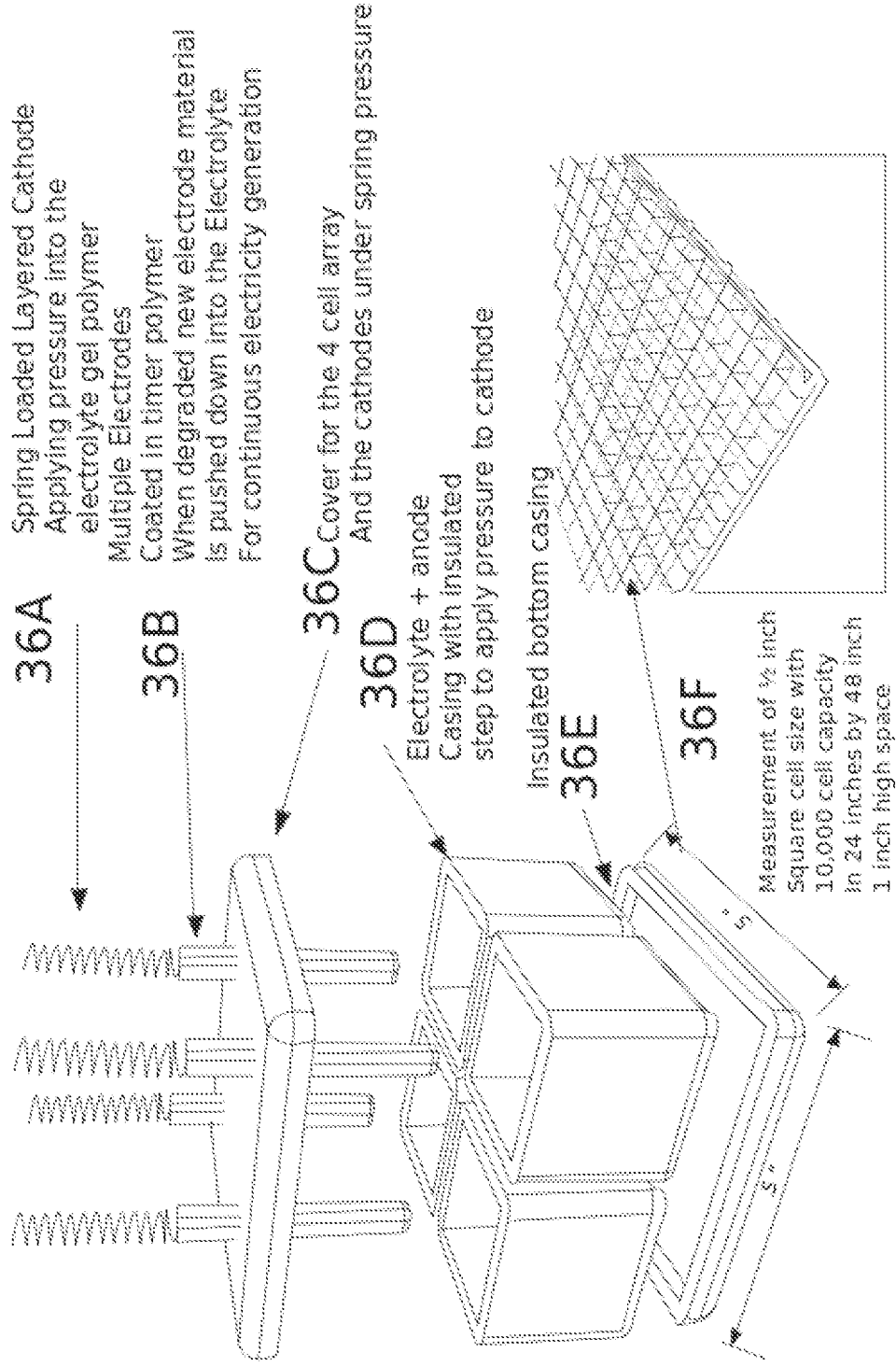
Fig. 36 Low Cost 4 Cell Switching System 6 to 8 volts with Autonomous Layered Cathode Apparatus

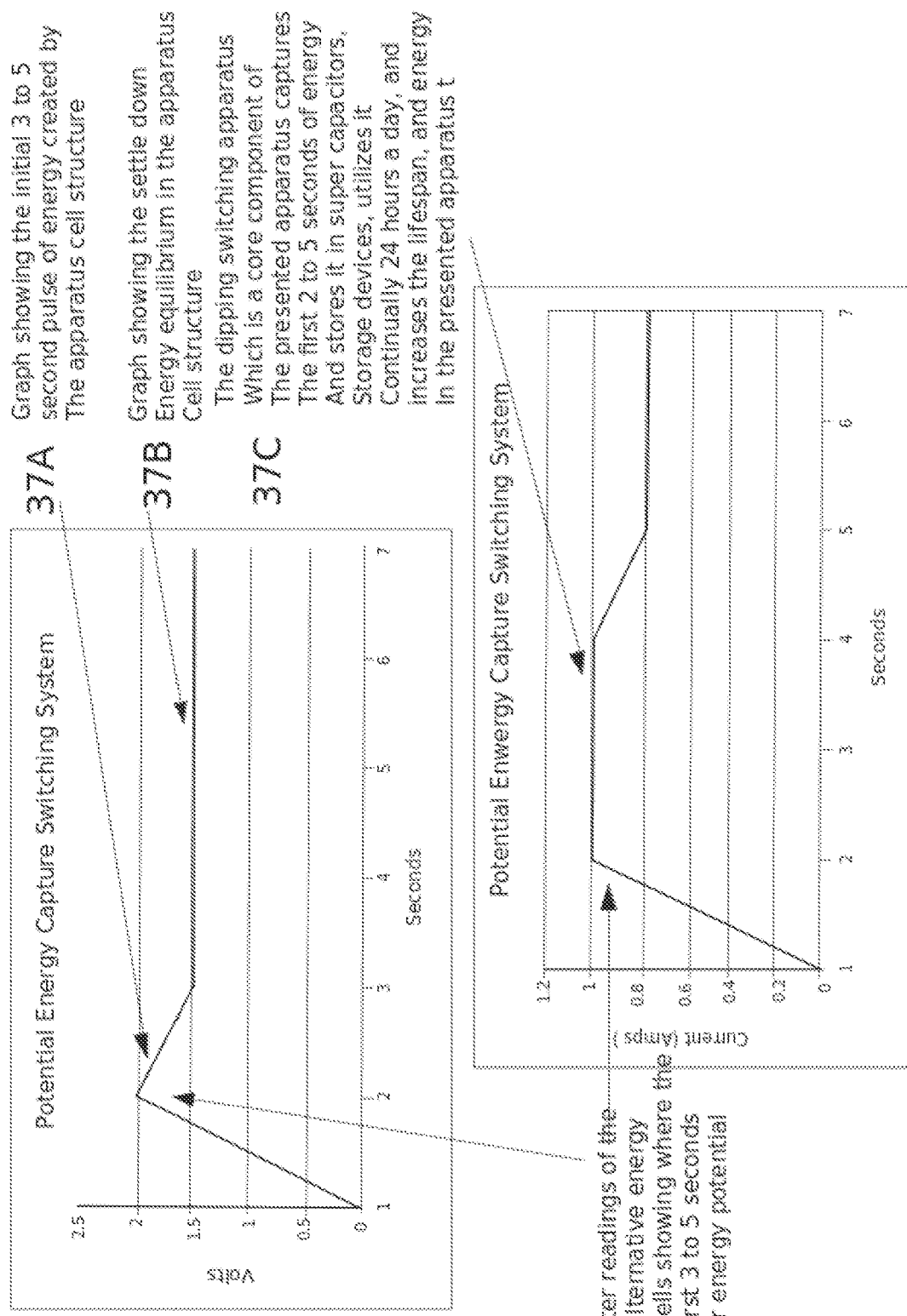

Fig. 37 Potential Energy Switching System for the Capture of Maximum Energy in Apparatus 37A Graph showing the initial 3 to 5 second pulse of energy created by the apparatus cell structure 37B Graph showing the settle down Energy equilibrium in the apparatus Cell structure 37C The dipping switching apparatus Which is a core component of The presented apparatus captures The first 2 to 5 seconds of energy And stores it in super capacitors, Storage devices, utilizes it Continually 24 hours a day, and increases the lifespan, and energy In the presented apparatus t Voltage meter readings of the presented alternative energy apparatus cells showing where the cell in the first 3 to 5 seconds has a higher energy potential

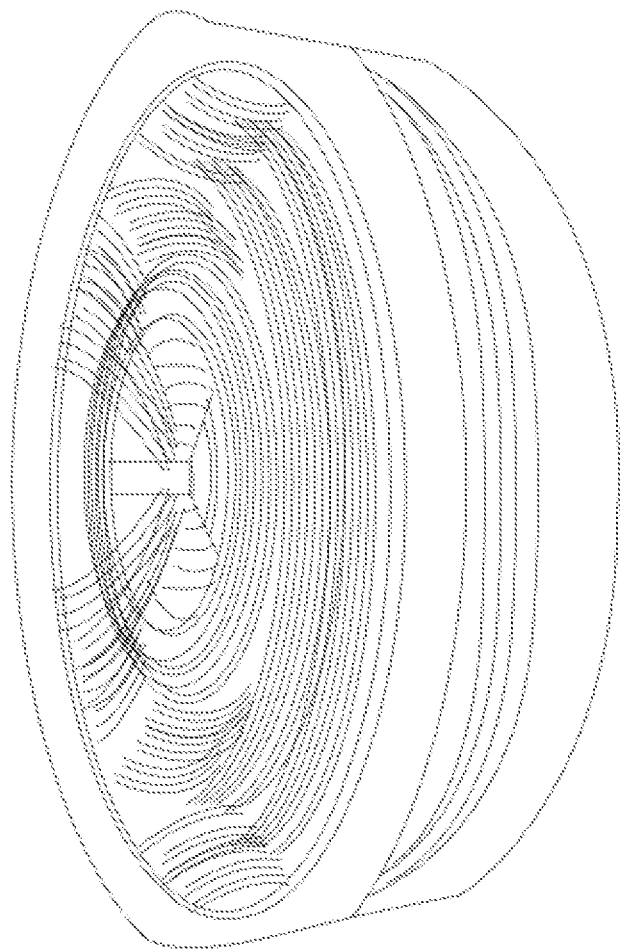
Fig. 38 Infrared Energy System for the Capture of Maximum Energy in Apparatus

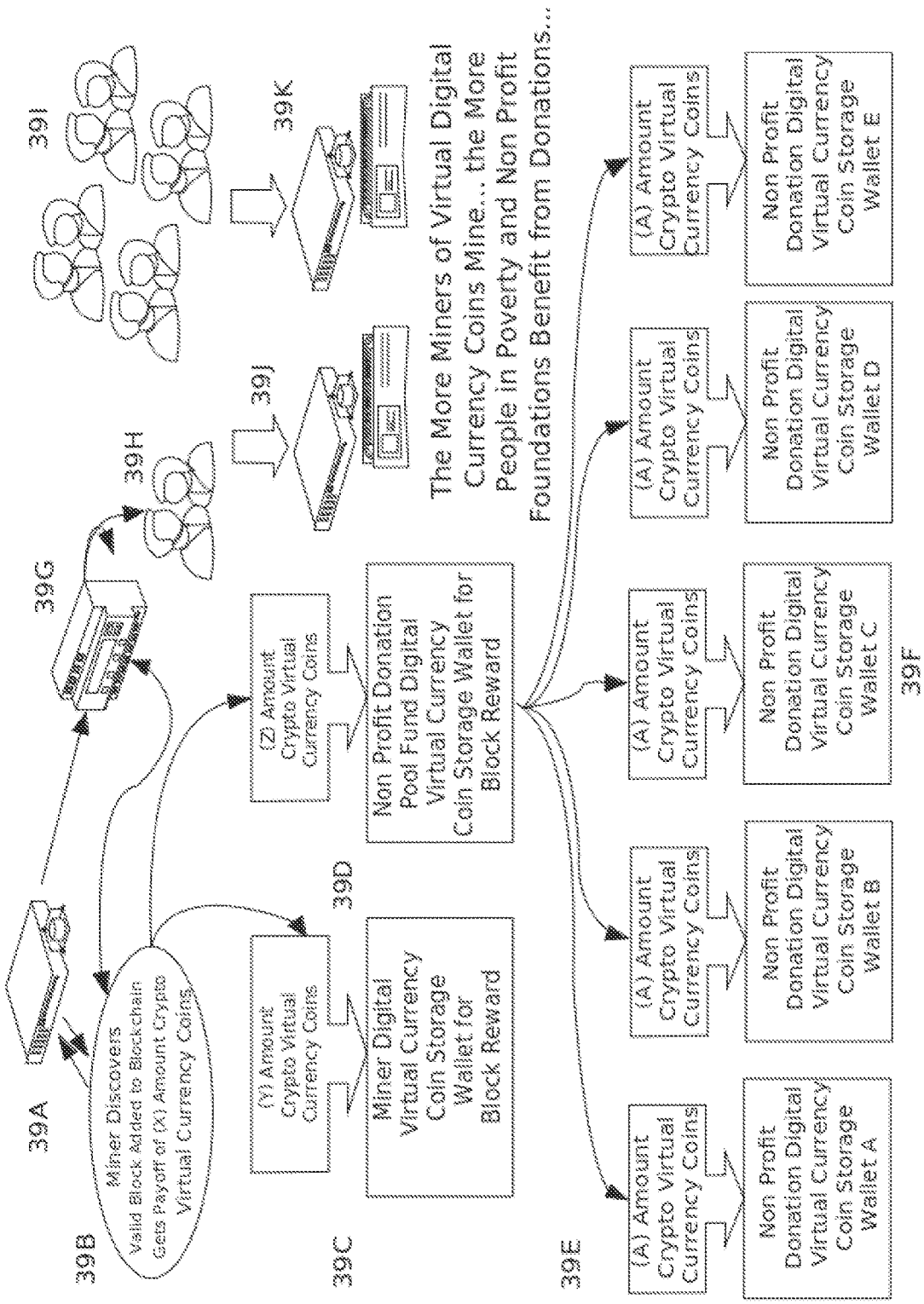
Fig. 39 Apparatus for Splitting Virtual Currency Mining Payoff Rewards with Non Profit and Poverty Individuals Through Donations

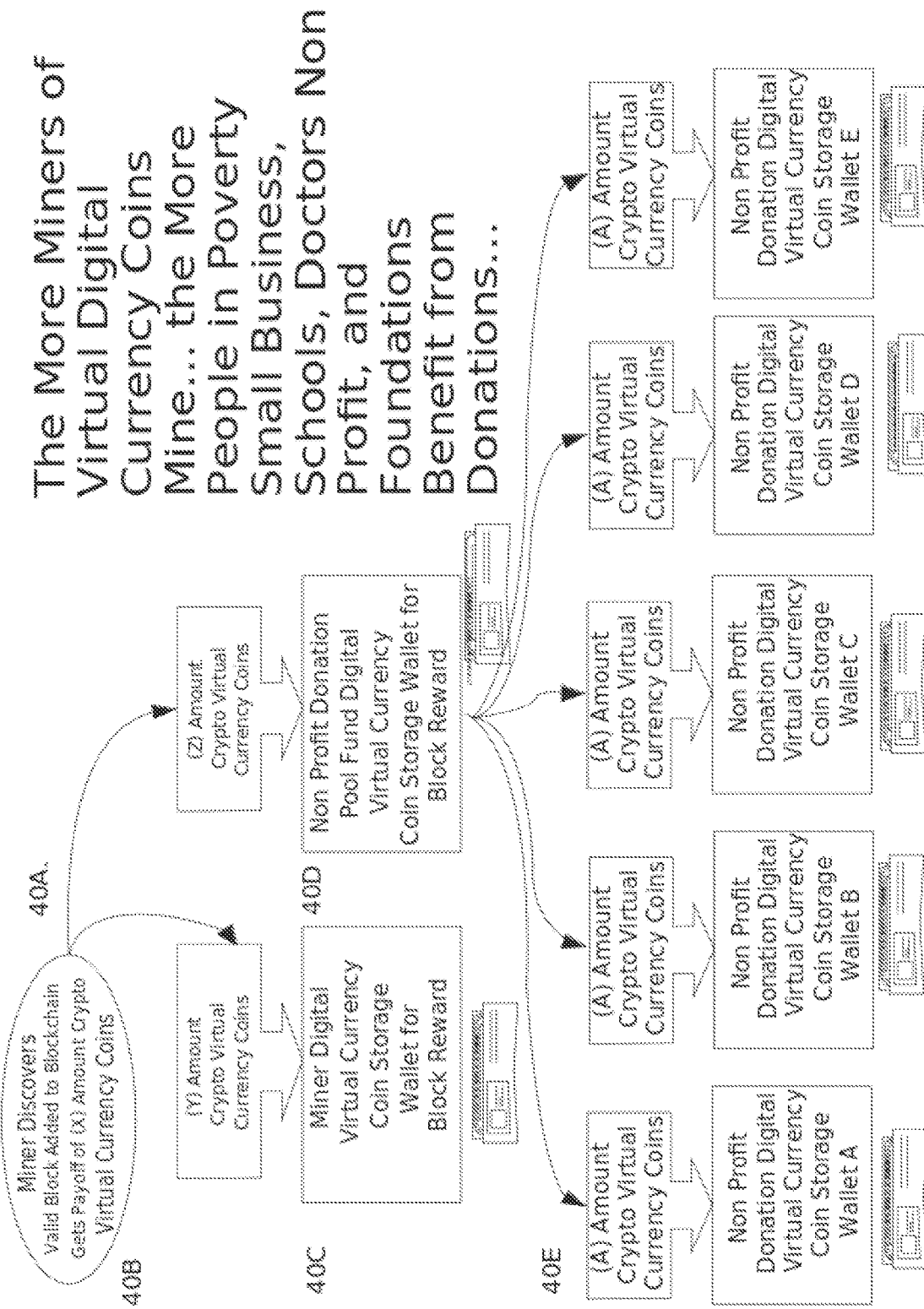
Fig. 40 Apparatus for Splitting Virtual Currency Mining Payoff Rewards with Non Profit, For Profit and Poverty Individuals Through Donations

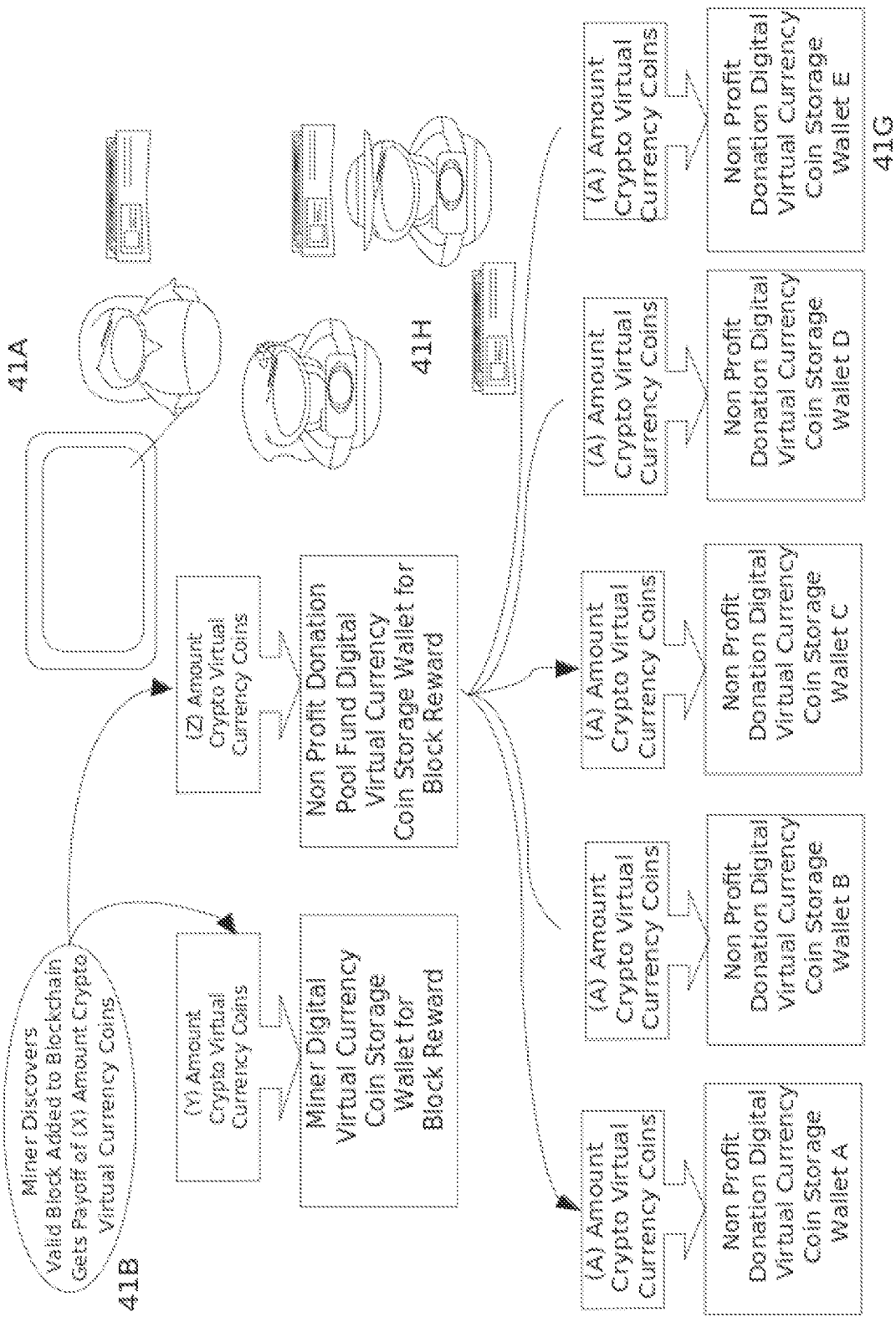
Fig. 41 Apparatus for Splitting Virtual Currency Mining Payoff Rewards with Non Profit and Poverty Individuals Through Donations

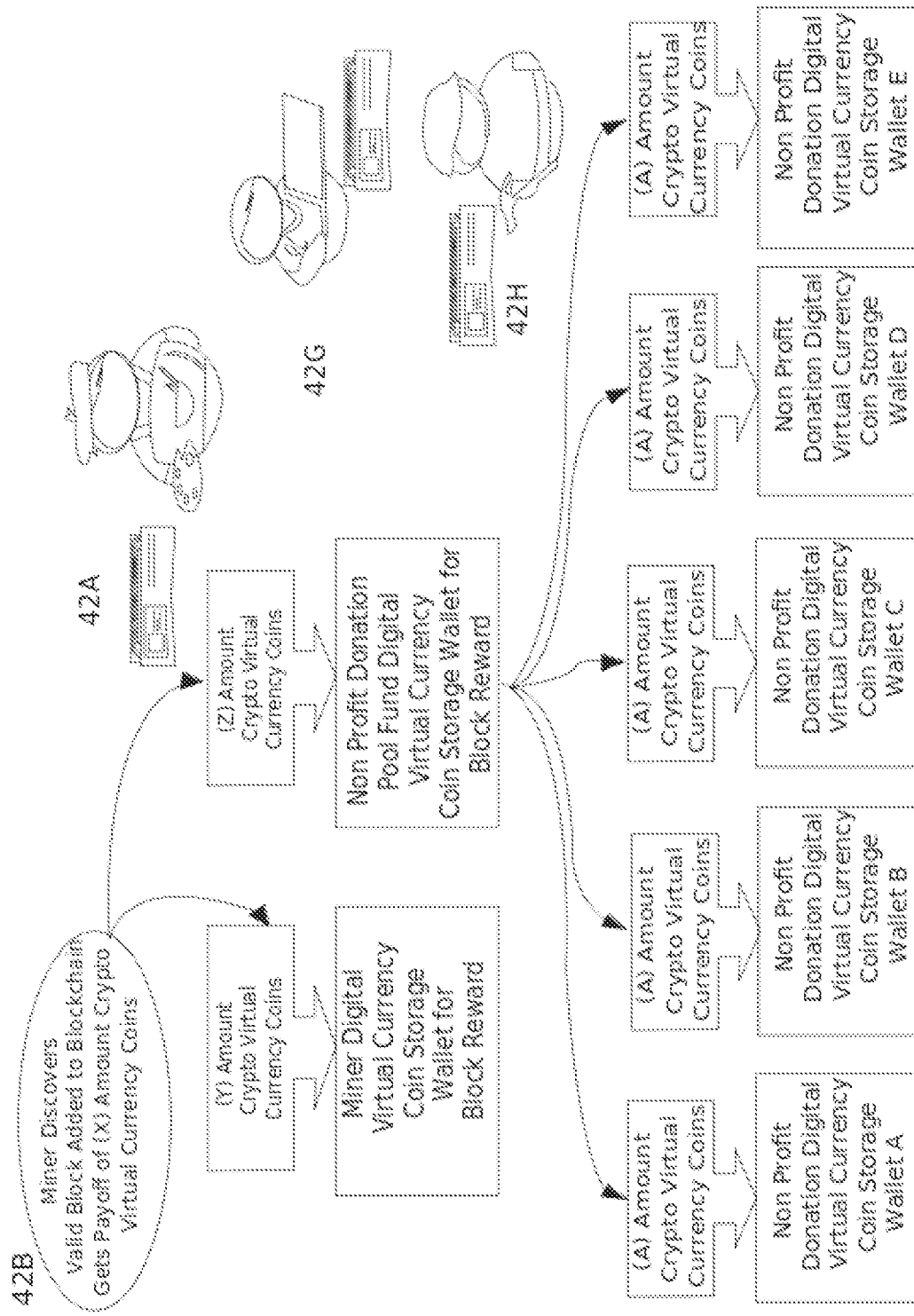
Fig. 42 Apparatus for Splitting Virtual Currency Mining Payoff Rewards with Non Profit and Poverty Individuals Through Donations

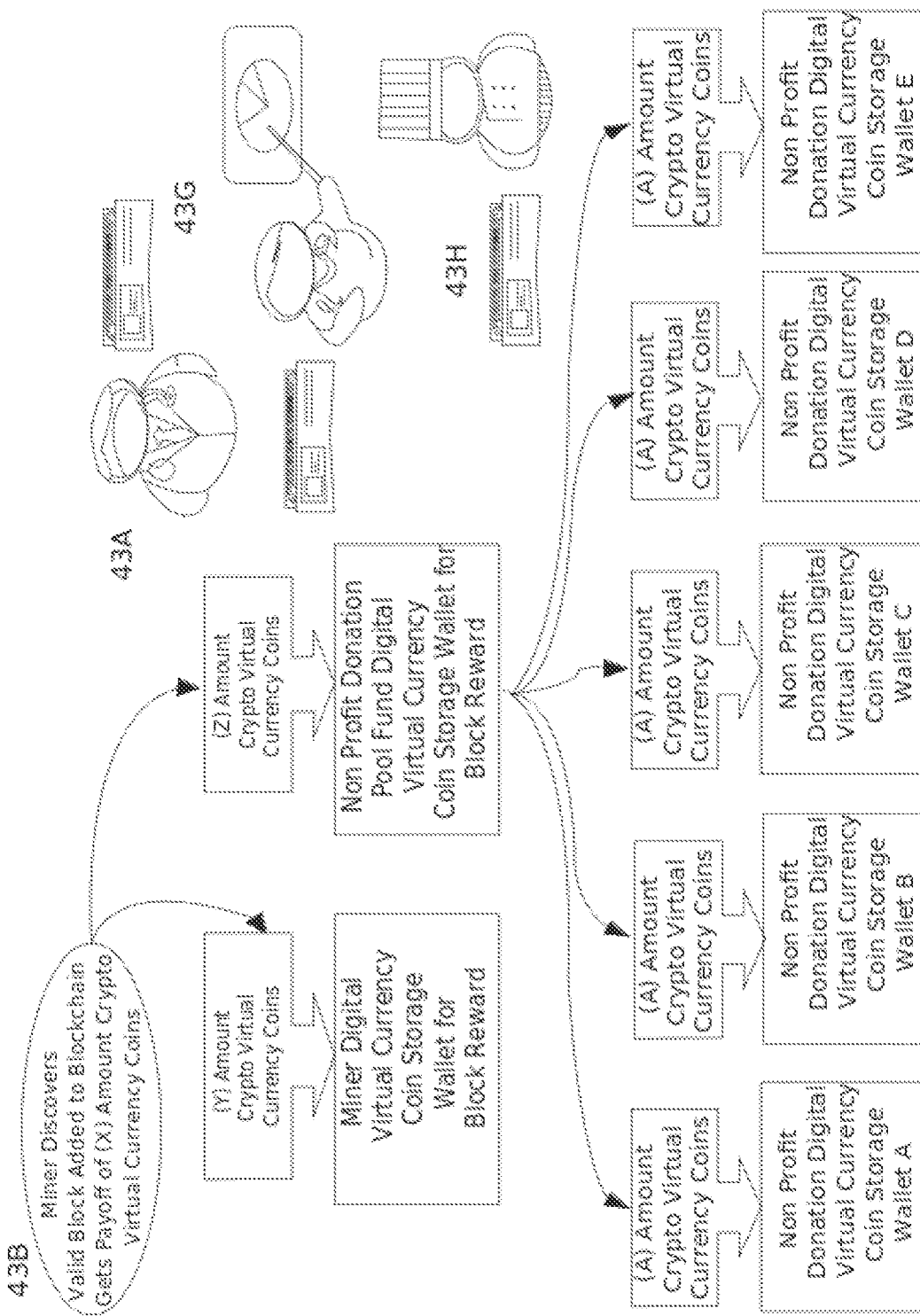
Fig. 43 Apparatus for Splitting Virtual Currency Mining Payoff Rewards with Non Profit and Poverty Individuals Through Donations

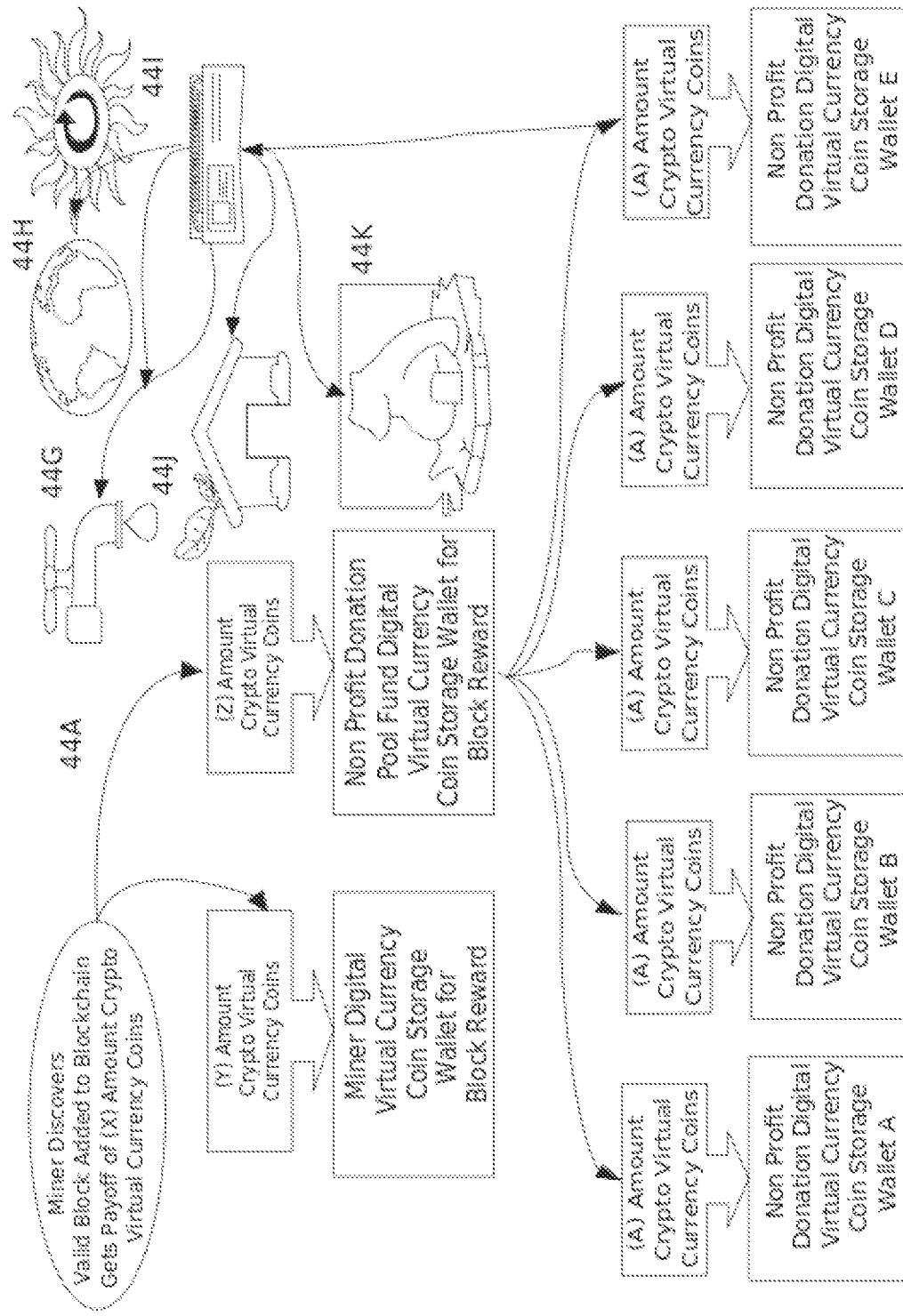
Fig. 44   Apparatus for Splitting Virtual Currency Mining Payoff Rewards with Non Profit Environment and Poverty Individuals Through Donations

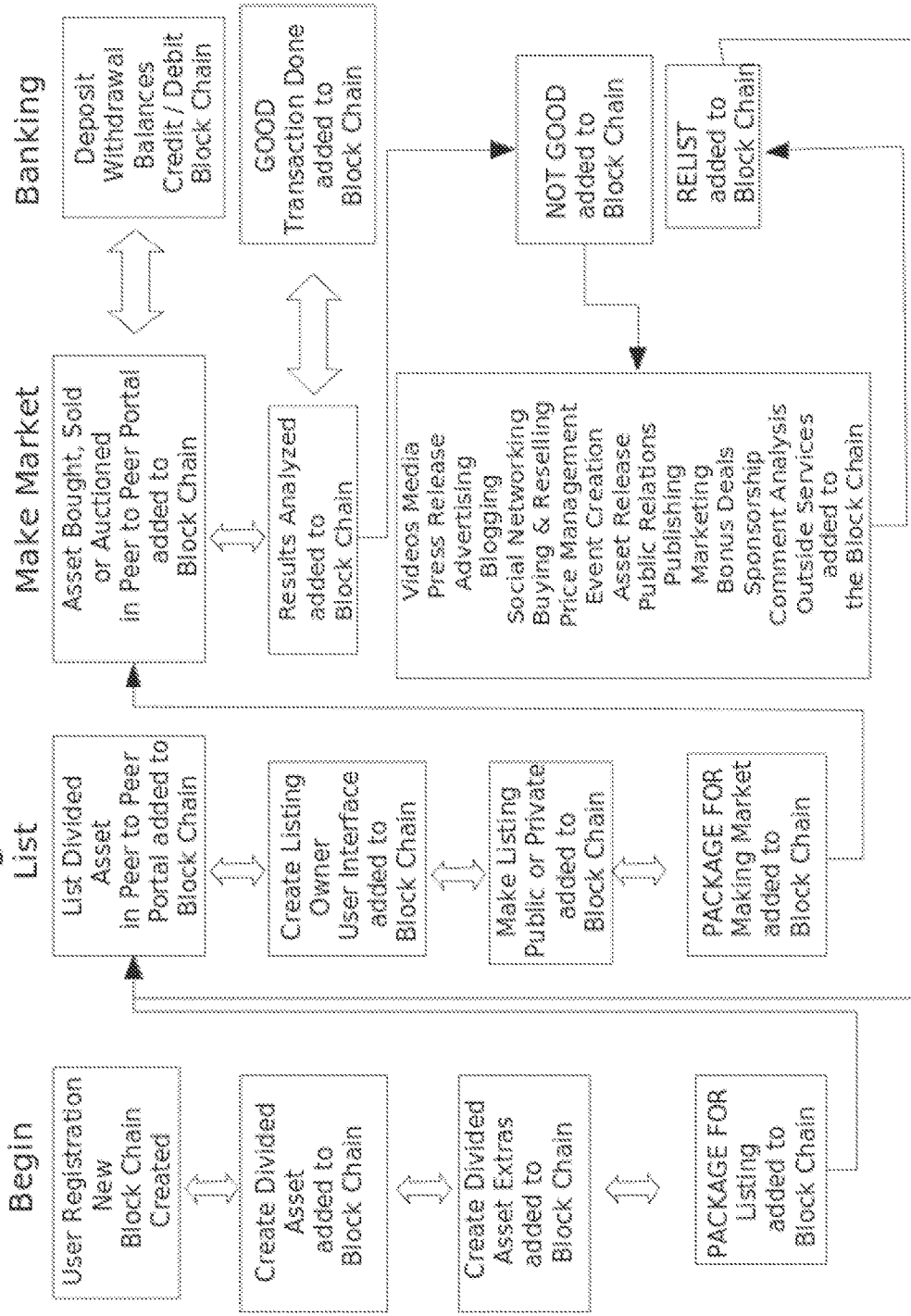

Apparatus for generating electricity from a plurality of Solar Photo Voltaic Panels in a rack mounting structure utilizing a Mirror Tracking apparatus for increasing electricity generation in a specific spatial point area Fig. 47 Apparatus for generating electricity from a plurality of Solar Photo Voltaic Panels in a rack mounting structure utilizing a Mirror Tracking apparatus for increasing electricity generation in a specific spatial point area Fig. 48  600 Watt Dual Concentrated Solar Panel Agriculture Growing Cell Fig. 49 Apparatus for generating electricity from a plurality of Solar Photo Voltaic Panels in a rack mounting structure utilizing a Mirror Tracking apparatus for increasing electricity generation in a specific spatial point area Apparatus for generating electricity from a plurality of Solar Photo Voltaic Panels in a rack mounting structure utilizing a Mirror Tracking apparatus for increasing electricity generation in a specific spatial point area

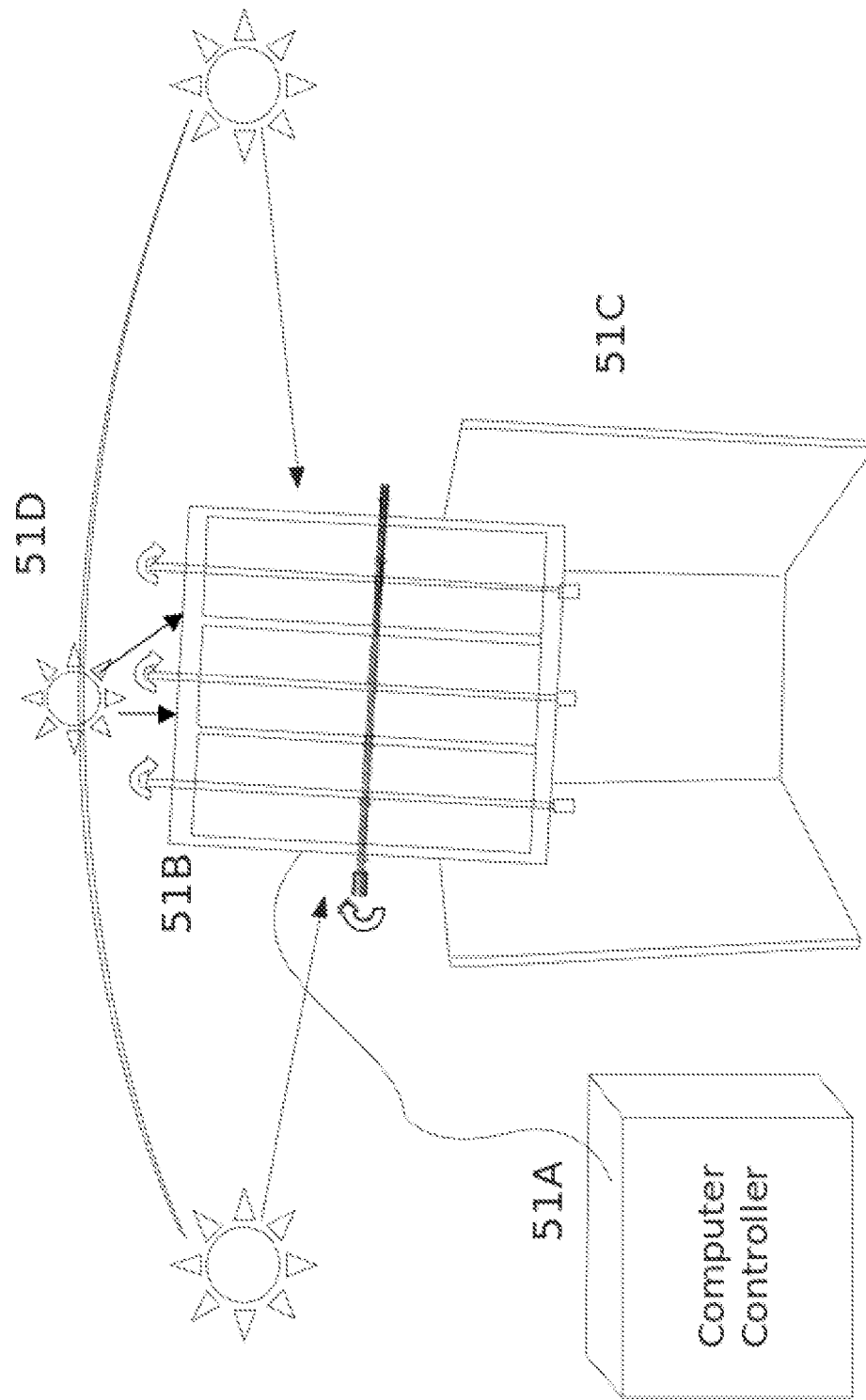
Fig. 51 Apparatus for generating electricity from a plurality of Solar Photo Voltaic Panels in a rack mounting structure utilizing a Mirror Tracking apparatus for increasing electricity generation in a specific spatial point area

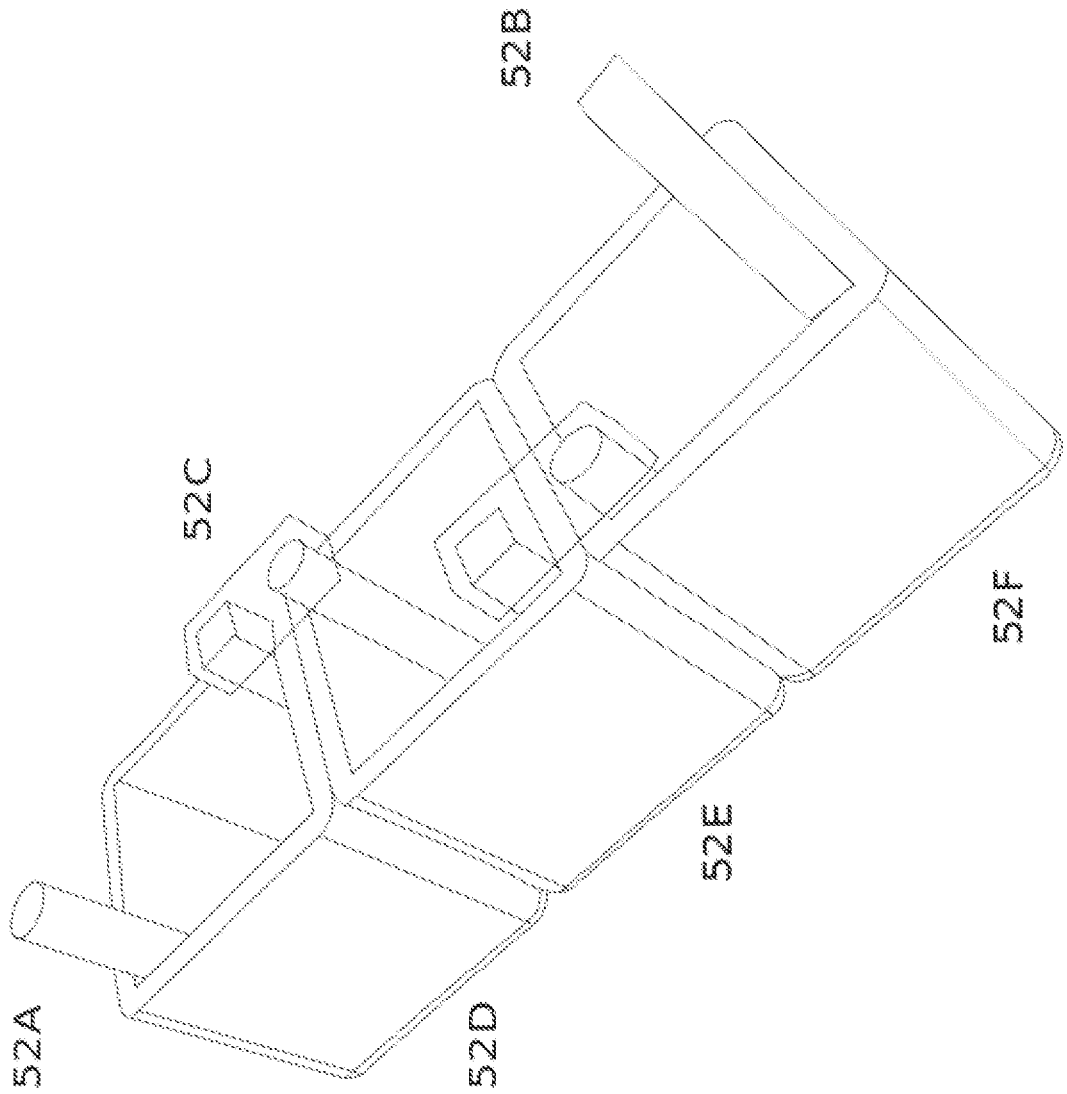

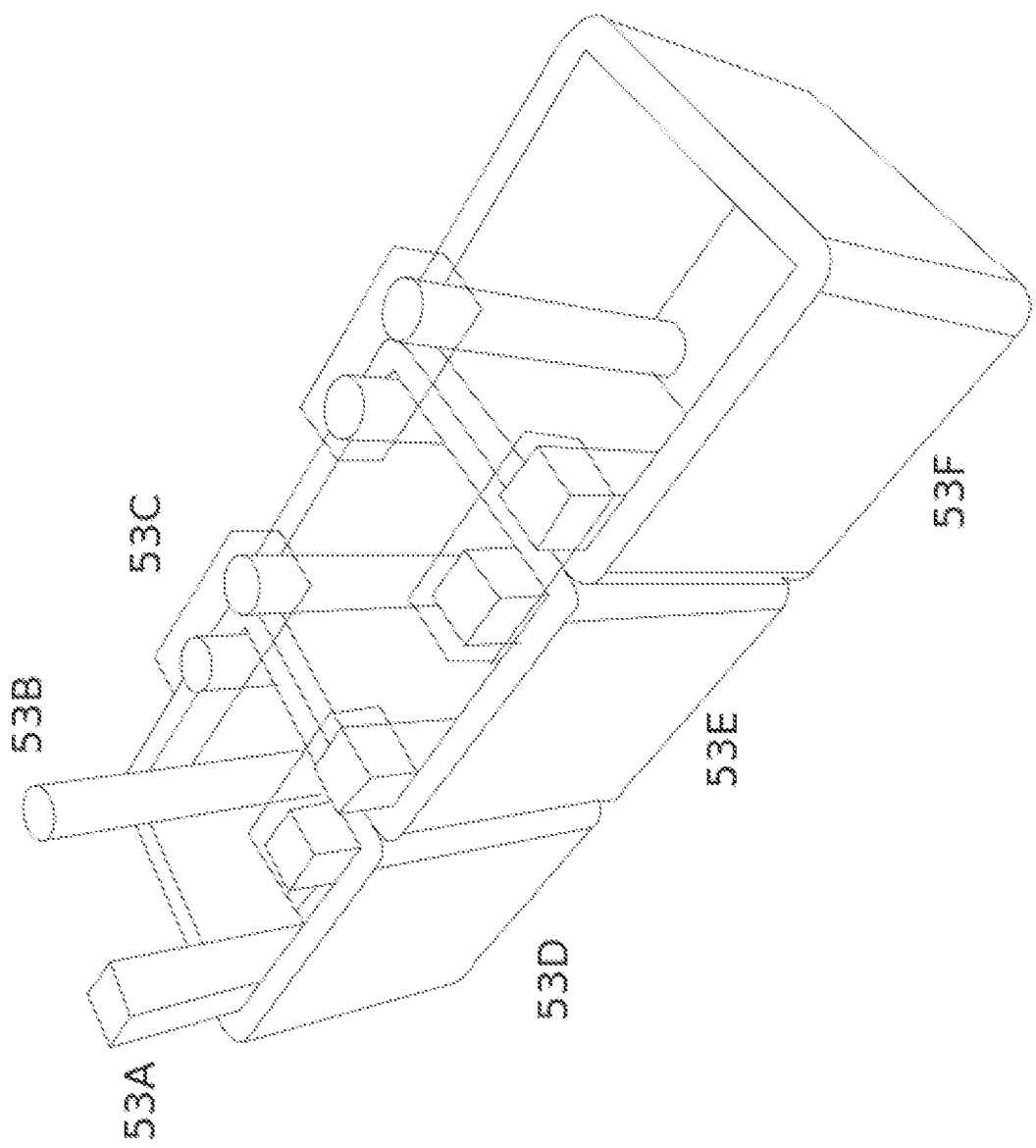
Fig. 53  Apparatus for Multiple Cell Electricity Generation

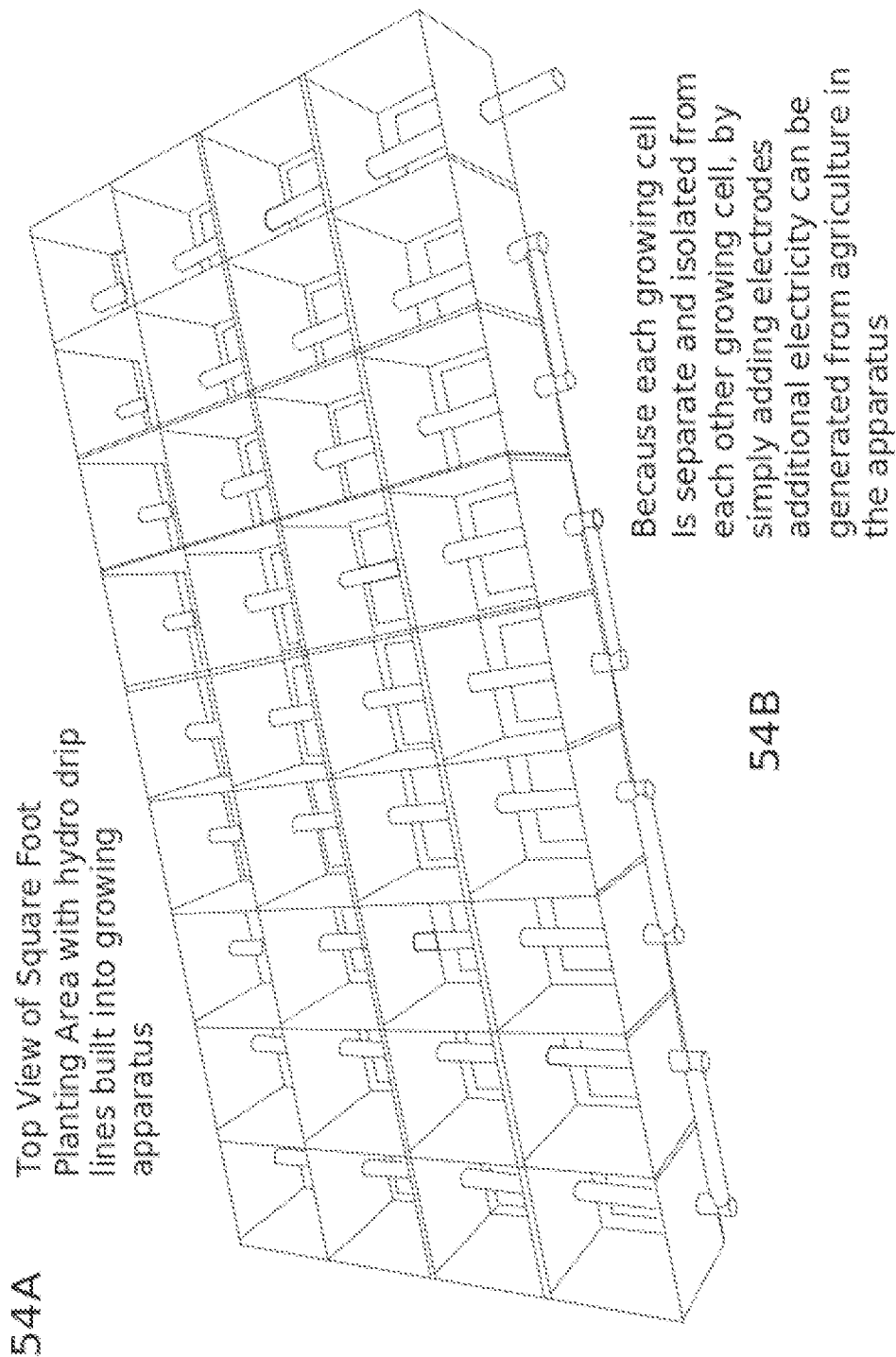

Fig. 54 Apparatus for a Hugelkultur growing bed, below a plurality of Solar panels with square foot agricultural, drip irrigation growing cells 54A Top View of Square Foot Planting Area with hydro drip lines built into growing apparatus 54B Because each growing cell is separate and isolated from each other growing cell, by simply adding electrodes additional electricity can be generated from agriculture in the apparatus

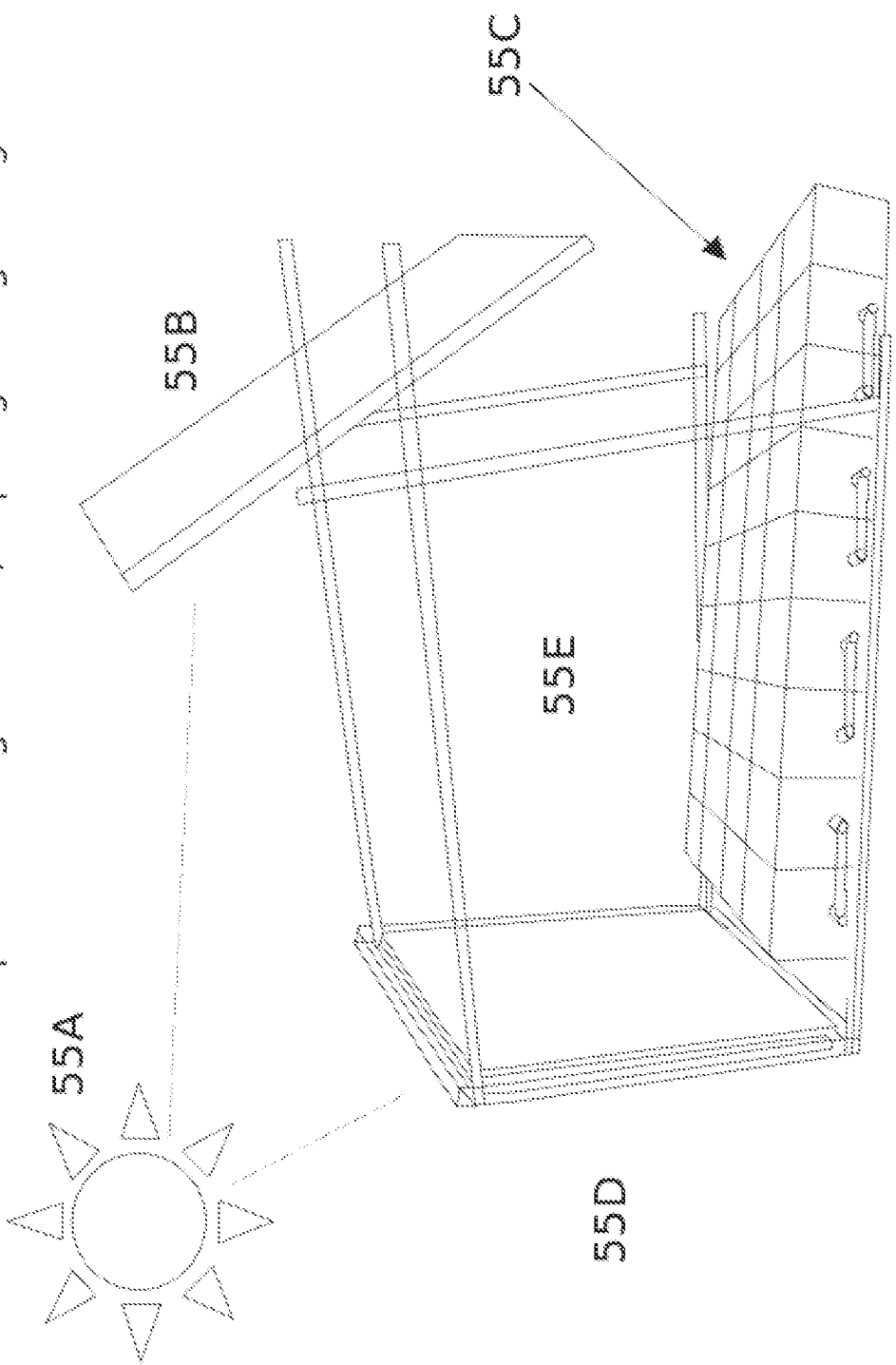
Fig. 55 Apparatus for a Hugelkultur growing bed, below a plurality of Solar panels with square foot agricultural, drip irrigation growing cells

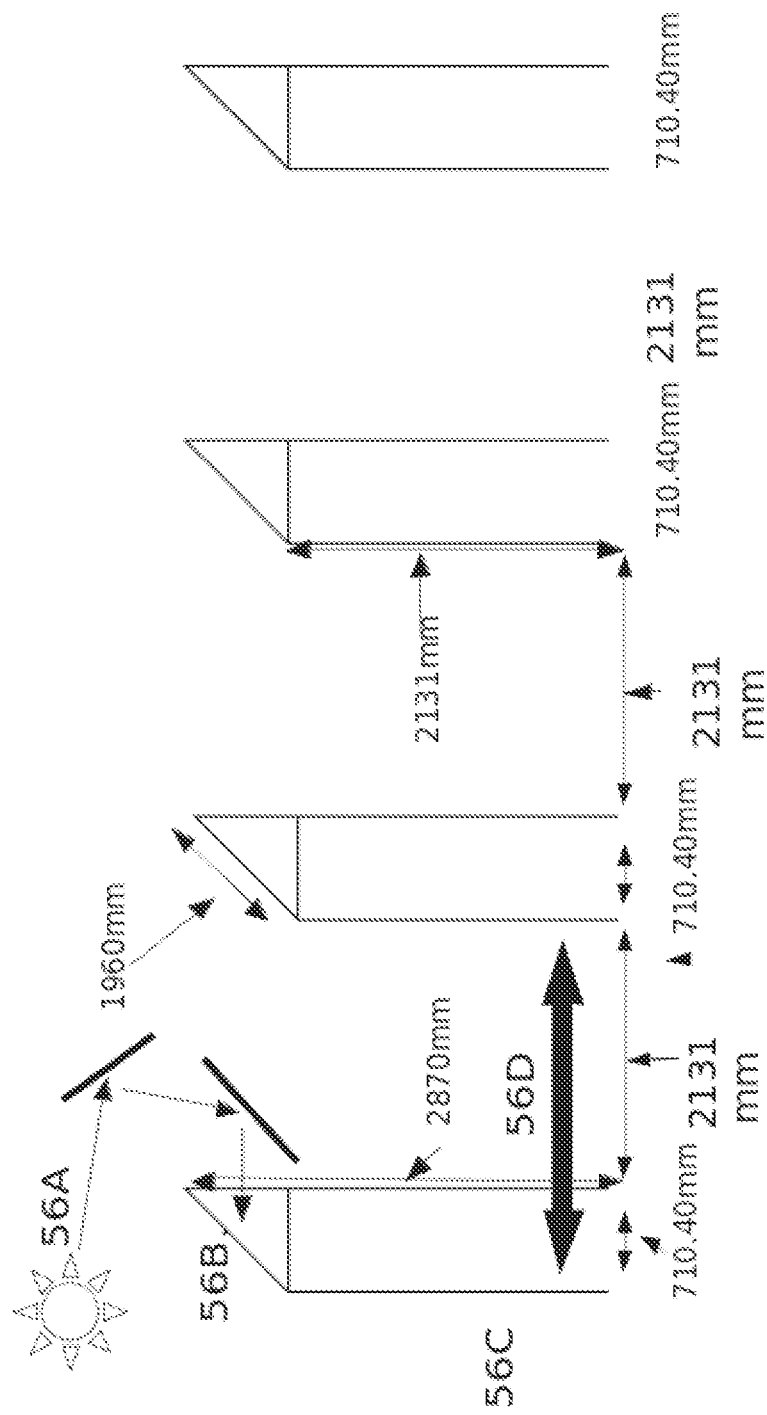
Fig. 56 Apparatus for a Hugelkultur growing bed, below a plurality of Solar panels with square foot agricultural, drip irrigation growing cells

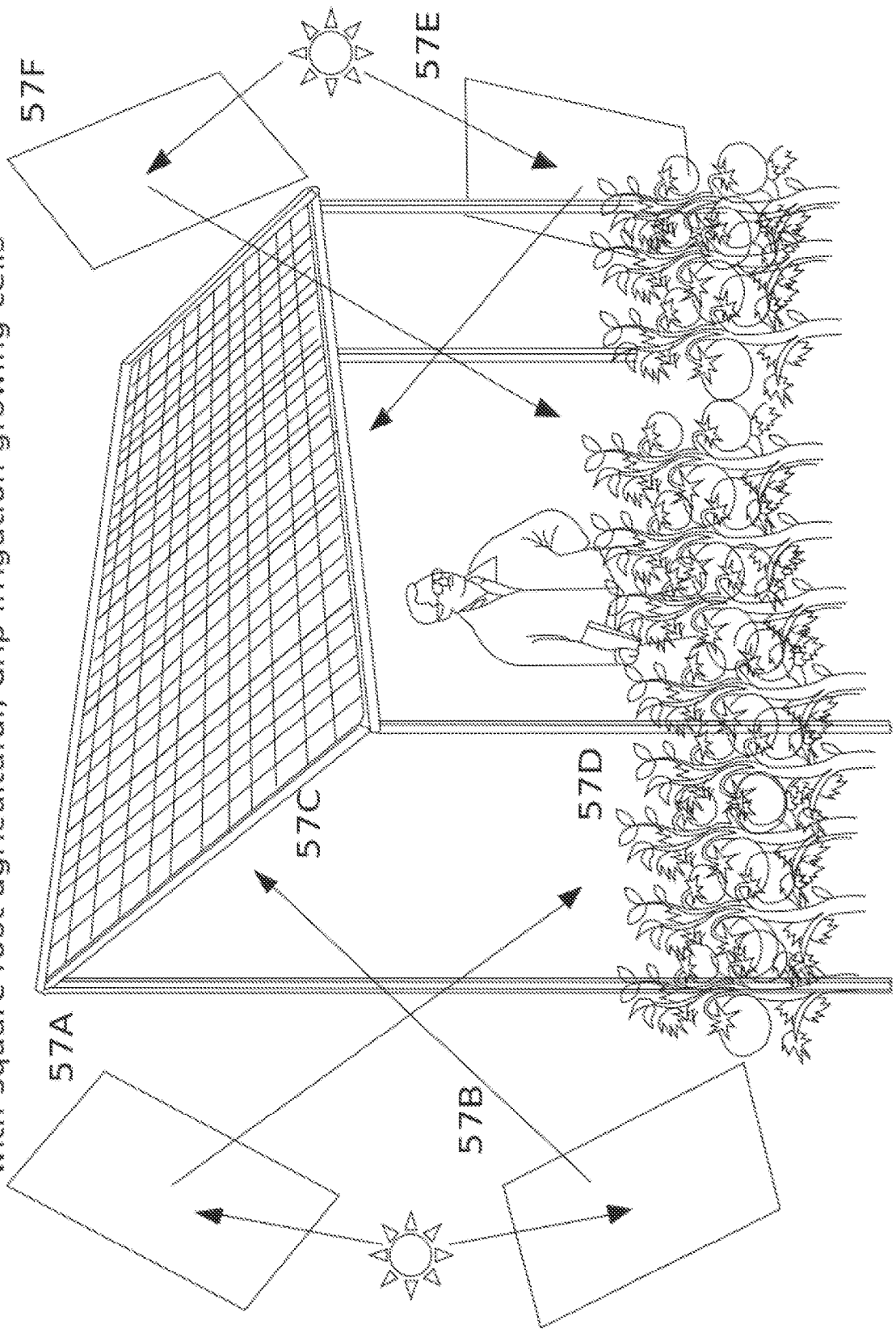
Fig. 57 Apparatus for a Hugelkultur growing bed, below a plurality of Solar panels with square foot agricultural, drip irrigation growing cells

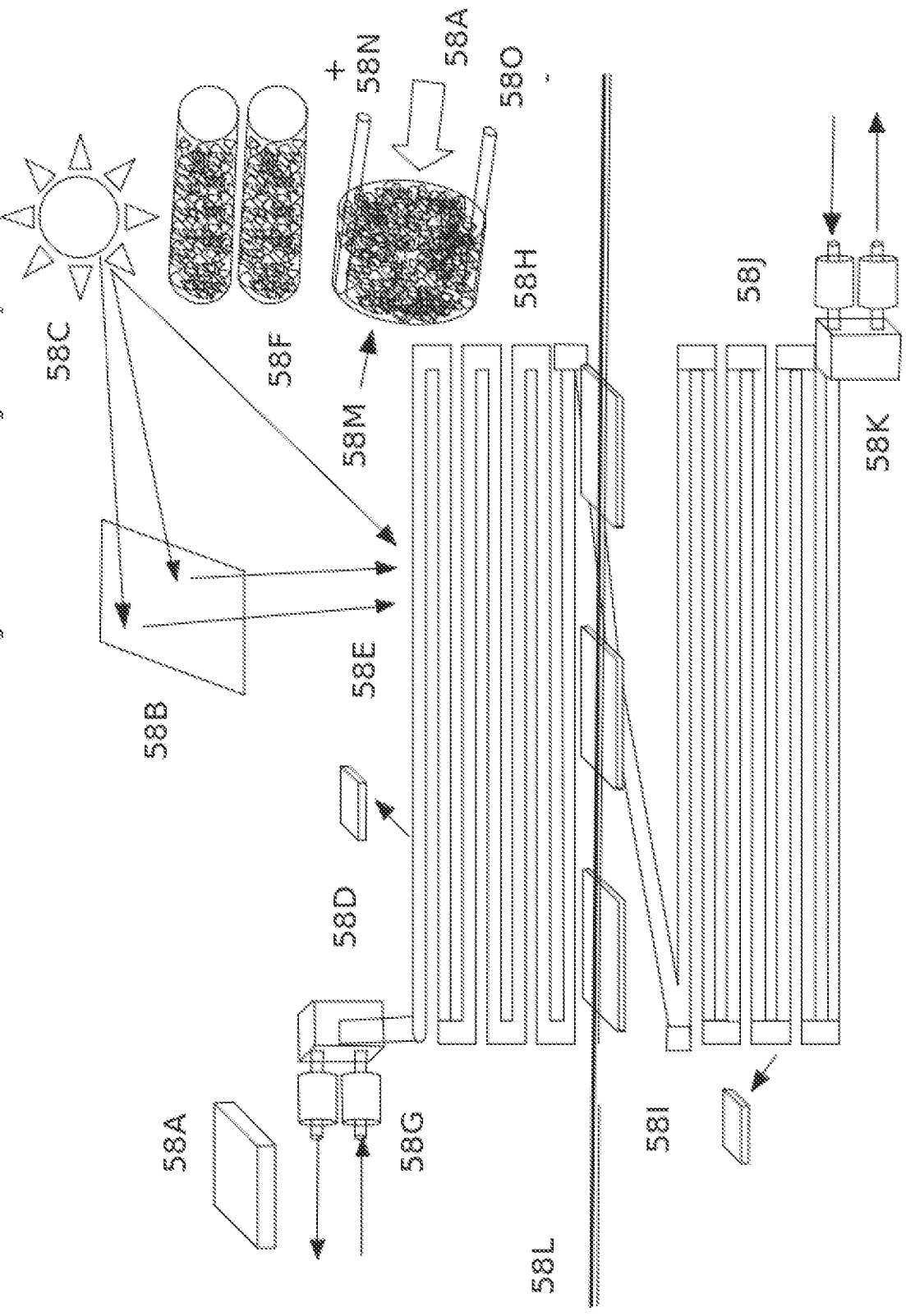
Fig. 58 Apparatus for Air Heating and Cooling with Electricity Generation between a plurality of Solar Pv Modules in an above ground and below ground System

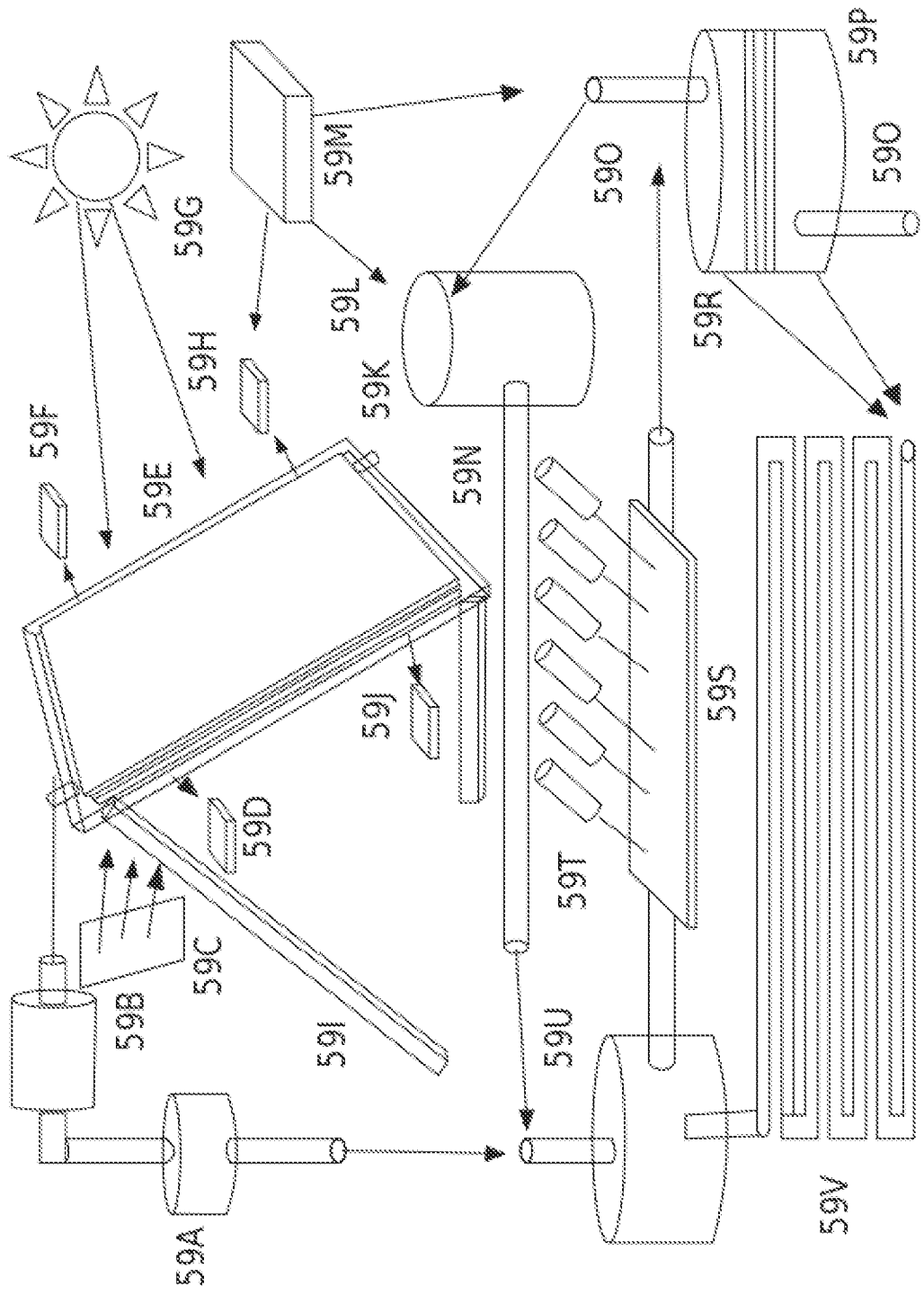
Fig. 59  Apparatus for Air Heating and Cooling with Electricity Generation between a plurality of Solar PV Modules in an above ground and below ground System

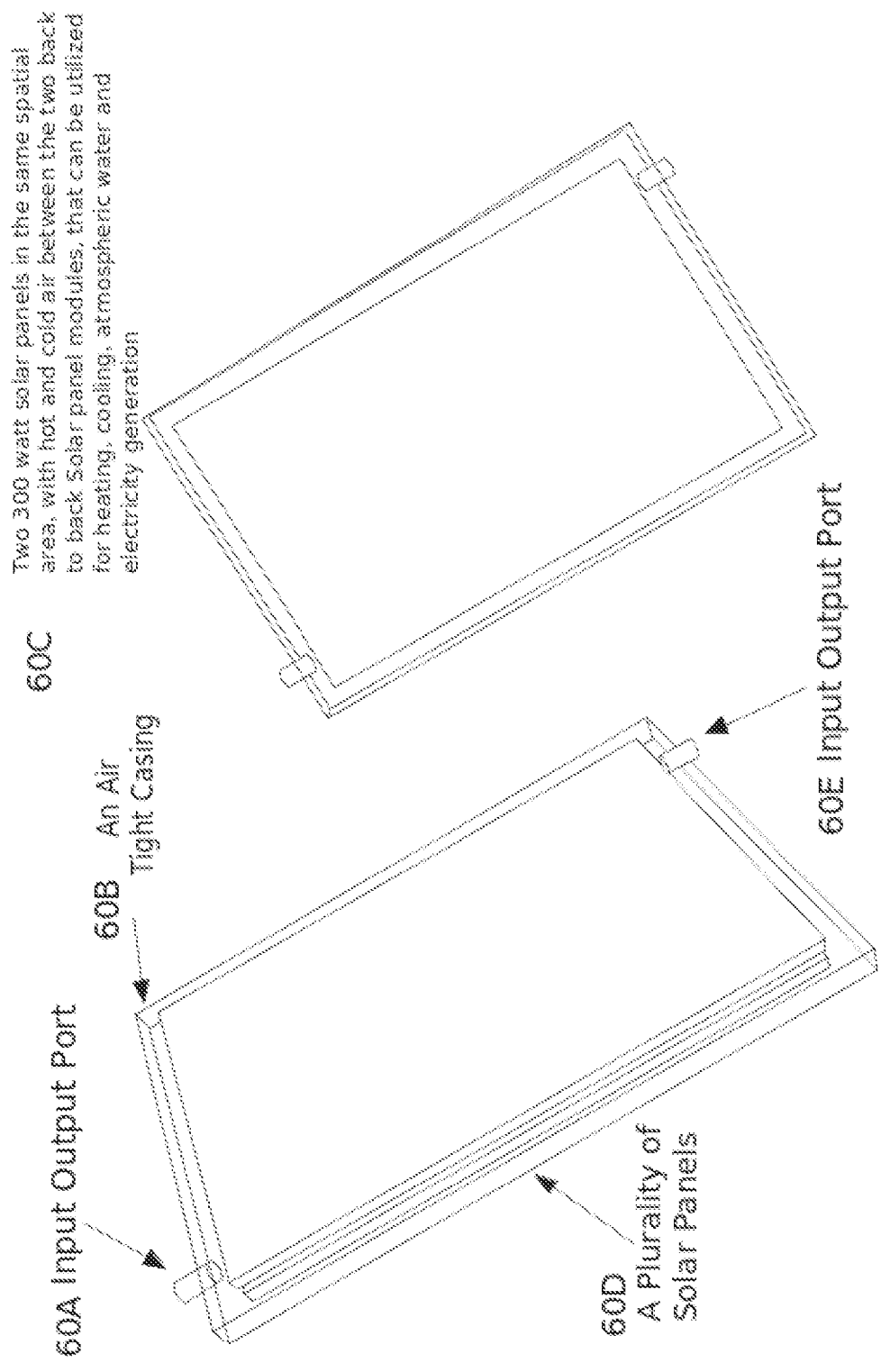
Fig. 60 Apparatus for Air Heating and Cooling with Electricity Generation between a plurality of Solar PV Modules in an above ground and below ground System

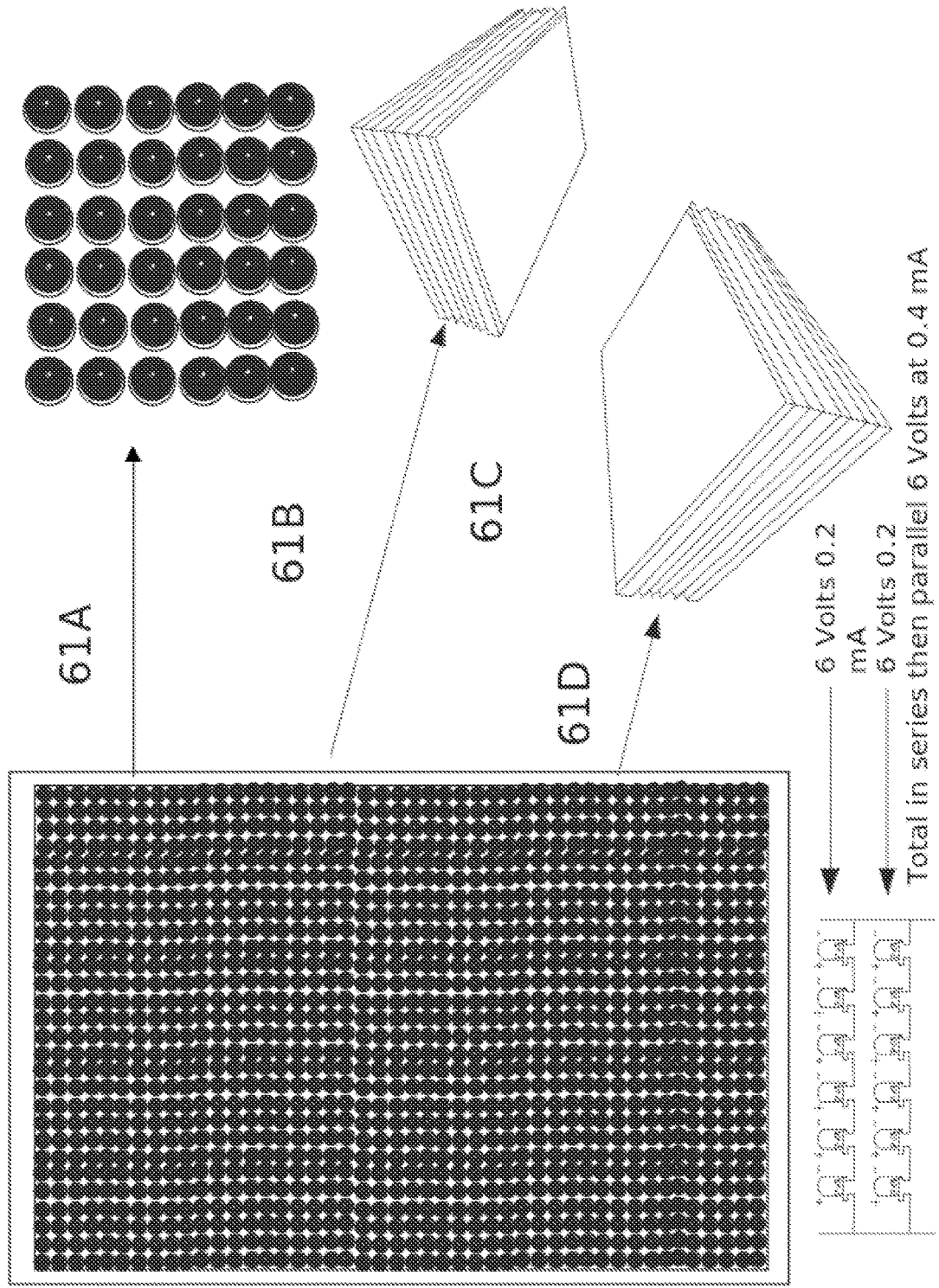
Fig.61 Apparatus for Air Heating and Cooling with Electricity Generation between a plurality of Solar PV Modules in an above ground and below ground system

ENERGY GENERATION, SOLAR PANEL RACKING SWITCHING PUMPING APPARATUS MECHANISM AND SYSTEM

CROSS-REFERENCE TO RELATED APPLICATIONS

"The present patent application claims priority to the earlier provisional patent application having Ser. No. 62/667,298, Titled: Hydro Electric Generator Structured Water Apparatus with Pump Storage Hydro Electricity Generator Energy Storage Apparatus and Graphene Water Filtration component, filed on May 4, 2018 and hereby incorporates subject matter of the provisional patent application in its entirety.

And is summarized for clarity of reason for inclusion here, like this:

Application 62/667,298 is a sustainable Hydro Electric Generator Structured Water Apparatus with Pump Storage Hydro Electricity Generator Energy Storage Apparatus and Graphene Water Filtration component system managed by plurality of autonomous or manual computer controllers, with Hydro turbine apparatus and electricity generation apparatus for for utilizing low-energy pumping systems to move water uphills or from underground to above ground without using all the groundwater and available aquifers. Application 62/667,298 adds water generation, purification, structured water for better growing of food, lower impact environmental affects, conservation of water, and reduction of poverty to and is a core component of the disclosed Ser. No. 16/395,175 application herein submitted."

"The present patent application claims priority to the earlier filed provisional patent application having Ser. No. 62/667,293, Titled: Alternative Energy Power Switching, Current Boosting Apparatus, filed on May 4, 2018 and hereby incorporates subject matter of the provisional patent application in its entirety.

And is summarized for clarity of reason for inclusion here, like this:

Application 62/667,293 is an Alternative Energy Booster, utilizing organic materials that provides additional electricity to batteries, appliances, inverters and increases the output of electricity from Solar Panels, and electricity generator devices and further provides USB—Type C Power Delivery connectors for powering low energy appliances directly from alternative energy devices, and storage devices. Application 62/667,293 adds significantly more energy generation to alternative energy systems for better growing of food, lower impact environmental affects, conservation of water, and reduction of poverty to and is a core component of the disclosed Ser. No. 16/395,175 application herein submitted."

"The present patent application claims priority to the earlier filed provisional patent application having Ser. No. 62/670,834, Titled: A Programmable Computer Controller Apparatus with Processes for Crypto Currency, Virtual Currency, and Block Chain Coin Mining with Distribution of Tangible and Intangible Assets Mined, filed on May 13, 2018 and hereby incorporates subject matter of the provisional patent application in its entirety.

And is summarized for clarity of reason for inclusion here, like this:

Application 62/670,834 is related to in our world today we can often forget about those people that are less fortunate than half the people on the earth. But the issue is that when you have half the people in the earth living in poverty it does affect all of the fortunate people that do not live in poverty in some way, shape or form. The changing climates are very good example of a planet that has half the people living in poverty. At least 4.3 million people mainly women and children die every year from using trees to cook their food, and warm their homes. They also use trees to burn to make room for growing animals to eat. Millions of acres of land are levels just for the purpose of growing food for animals that later on get eaten by humans. There is a better way and all of this leads to technology changing the way things are done. Bitcoin is a phenomenon that gives us all the ability to vote with our wallets. Many people, or half the people on earth have the ability to utilize crowdfunding and crowd sourcing technology combined with the Bitcoin system to make the world a better place especially for half the people that live on the earth. The related art to the Application 62/670,834 invention disclosed and presented here can be described as payment, proof of work, crypto coin apparatus, processes and systems. The Application 62/670,834 invention presented here is related to payment systems and data center server farm systems that are used in the mining of crypto currencies, coins, tokens, Bitcoin, an alternative currencies. Additional related art can be summarized as how to reduce poverty in the world, reduce the suffering and misery of animals involved in animal agriculture, reduce the amount of carbon footprint that half the people in poverty would bring forward to the world if they adopted the same system as the other half of the world is not in poverty. Additional related art is related to the effects of huge amounts of people 3.5 billion to be exact that affect wildlife, plants and trees, forest, water supplies, rivers streams and potable water supplies, along with sanitation and how all the systems function involving payment systems around the world. Can payment systems actually affect the quality of life on the earth for people, animals, wildlife and the environment? Yes, in a related way there is a big affect on people not having money to live their lives in a less toxic way. Bitcoin in itself and its algorithm has many potential capabilities to make life better for people, animals, wildlife and the environment on the earth. This can be done while making fortunes for anyone who wants to get involved in this new paradigm. The Application 62/670,834 invention presented here has the ability to make the world a better place. The Application 62/670,834 invention presented here has the ability to reduce electricity used in the mining process of Bitcoin. Invention presented here has the ability to change the game to where everyone can play, benefit, get payoffs, and have a better existence while at the same time being more gentle on the resources of the planet Earth. Application 62/670,834 adds a payment system that incorporates sharing of payments with people in poverty, while protecting animals, wild life and the environment while lowering the impact of environmental affects, conservation of water, electricity and the reduction of poverty as a core component of the disclosed Ser. No. 16/395,175 application herein submitted."

"The present patent application claims priority to the earlier filed provisional patent application having Ser. No. 62/667,150, Titled: Apparatus for generating electricity from a plurality of Solar Photo Voltaic Panels in a rack mounting structure utilizing a Mirror Tracking apparatus for increasing electricity generation in a specific spatial point area, filed on May 4, 2018 and hereby incorporates subject matter of the provisional patent application in its entirety.

And is summarized for clarity of reason for inclusion here, like this:

"The presented invention and apparatus application 62/667,150 was developed for peoples in undeveloped countries and peoples affected by the changing climates to create additional electricity, more water retention in the soils used for growing food all year round, for heating and cooling purposes of food and peoples living areas. The application 62/667,150 invention is an apparatus for generating electricity from a plurality of solar photo voltaic panels in a rack mounting structure utilizing a mirror tracking apparatus for increasing electricity generation in and at a specific spatial point area. Application 62/667,150 adds an additional electricity and water management system that incorporates helping people in poverty, while protecting animals, wild life and the environment lowering the impact of environmental affects, conservation of water, electricity and the reduction of poverty as a core component of the disclosed Ser. No. 16/395,175 application herein submitted.

"The present patent application claims priority to the earlier filed provisional patent application having Ser. No. 62/667,280, Titled: Apparatus for Multiple Cell Electricity Generation in Parallel and Series Battery Storage and Electricity Generation Switching and Pumping Apparatus System filed on May 4, 2018 and hereby incorporates subject matter of the provisional patent application in its entirety.

And is summarized for clarity of reason for inclusion here, like this:

Application 62/667,280 adds Multiple Cell Electricity Generation in Parallel and Series with a Battery Storage and Electricity Generation Switching and Pumping Apparatus System. Where with different kinds of materials are placed between electricity flow for the purpose of increasing electricity voltage and current flow in solar panel's systems between the photo voltaic solar panels in the battery storage system. By arranging different organic materials in different orders the apparatus presented here creates a pulsing current wave of electricity increasing and storing it on its way to being delivered to a battery system from a solar panel photo voltaic array. Application 62/667,280 adds an additional electricity generation component, plus a powerful battery storage component that can be used by people in poverty, while protecting animals, wild life and the environment ultimately lowering the impact of environmental affects, with conservation of water, electricity and the reduction of poverty as a core component of the disclosed Ser. No. 16/395,175 application herein submitted."

"The present patent application claims priority to the earlier filed provisional patent application having Ser. No. 62/667,262, Titled: Apparatus for a Hugelkultur growing bed, below plurality of solar panels with square foot agricultural, drip irrigation growing cells, filed on May 4, 2018 and hereby incorporates subject matter of the provisional patent application in its entirety.

And is summarized for clarity of reason for inclusion here, like this:

The Application 62/667,262 apparatus provides for Hugelkultur growing bed below a plurality of solar panels with square foot agricultural drip irrigation growing cells was invented to combine agriculture into electricity generation systems in a healthy organic way. No dig or till of soil is used in the system. Compost is created through apparatus and growing cells that are cubes 12"×12"×12". The purpose of the invention is so that more energy and electricity can be generated using solar photo voltaic panels in a plurality rather than singularity in a specific spatial point area. This way less land is wasted and obstructed in more energy is generated. While at the same time agriculture can provide people and animals food and a less invasive technological generation of electricity process. Application 62/667,262 adds a useful growing area below solar panels that conserves energy, and provides nutritional minerals in the soil for food agricultural growing for people in poverty, while protecting animals, wild life and the environment while lowering the impact of environmental affects, conservation of water, electricity and the reduction of poverty as a core component of the disclosed Ser. No. 16/395,175 application herein submitted."

"The present patent application claims priority to the earlier filed provisional patent application having Ser. No. 62/667,274, Titled: Hybrid Apparatus for air heating and cooling with electricity generation between a plurality of Solar Photo Voltaic modules in an above ground and below ground apparatus filed on May 4, 2018 and hereby incorporates subject matter of the provisional patent application in its entirety.

And is summarized for clarity of reason for inclusion here, like this:

Application 62/667,274 is a Hybrid Apparatus and system for air heating and cooling with included additional electricity generation and structured water conditioning components with temperature controlled heating and cooling created from a plurality of solar photo voltaic modules, above ground and underground piping system for water, and programmable computer controller utilizing data from sensing devices for managing the performance of the apparatus. Application 62/667,274 adds an inexpensive, healthier, dependable, trustworthy and reliable generation of heating, cooling and electricity as core component of the apparatus; heating and cooling apparatus for people in poverty, while protecting animals, wild life and reducing the burning of trees destruction to the environment and ultimately lowering the impact of environmental affects, conservation of water, electricity exponentially directly involved in the reduction of poverty as a core component of the disclosed Ser. No. 16/395,175 application herein submitted."

This application claims priority from and is a continuation in part of U.S. Ser. No. 14/611,285, Titled: "Wall Paneling Construction Smart Apparatus and System", filed on 2015 Feb. 2, which is incorporated by reference in its entirety for all purposes as if fully set forth herein.

And is summarized for clarity of reason for inclusion here, like this:

Application U.S. Ser. No. 14/611,285 is a component of the current application for the utility to provide electrical alternative energy device installations in a safe way. It is an apparatus and system which is a self contained Wall Paneling Construction Smart Apparatus that utilizes and requires a plurality of apparatus's to effectively perform the functions of transferring electricity, data and further providing a point where low energy electrical devices can plug into for charging, and use. The apparatus's presented as part of the system, are all together required to carry out the functions needed in the functioning of the presented system. The system principles carried out in the apparatus and system are for the purpose of making it easier to install directly in a safe way to alternative energy devices. The wall apparatus also provides microphones, cameras, and speakers and other components for other useful purposes with the apparatus in the system, here defined as identification of humans and objects, utilizing measurements and entertainment, by people users, especially people in poverty, while protecting animals, wild life and protecting the environment.

This application claims priority from and is a continuation in part of U.S. Ser. No. 14/611,172, Titled: "Method and process for registration, creation and management of micro shares of real or intangible properties and advertisements in a network system", filed on 2015 Jan. 31, which is incorporated by reference in its entirety for all purposes as if fully set forth herein.

And is summarized for clarity of reason for inclusion here, like this:

Application U.S. Ser. No. 14/611,172 is a component of the current application for the utility to provide the ability to generate profits by dividing properties and connecting advertisement to the properties through a digital network giving the currently disclosed invention a utility and useful connection to the internet that is beneficial to the user of the invention, It is a method for real or intangible divided and transformed property or properties or advertising sponsor user, using a client computer, or mobile device to be able to register, login and create zip code related local sponsor real or intangible divided and transformed property or properties or advertisements, with small real or intangible divided and transformed property or properties or advertisements for creating interest in the offers, that link to bigger real or intangible divided and transformed property or properties or advertisements with an embedded shopping cart. When a user creates the real or intangible divided and transformed property or properties or advertisements, they can upload their images, and create their type for the offers in the same interface form and the real or intangible divided and transformed property or properties or advertisements are instantly created and able to be published immediately throughout a network by people, especially people in poverty, while protecting animals, wild life and protecting the environment.

This application claims priority from and is a continuation in part of U.S. Pat. No. 8,369,997, Titled: "Solar Panel Wind Turbine Communication Server Network Apparatus Method and Mechanism", filed on 28 Apr. 2010, which is incorporated by reference in its entirety for all purposes as if fully set forth herein.

And is summarized for clarity of reason for inclusion here, like this:

U.S. Pat. No. 8,369,997 is a component of the current application for the utility to provide the ability to generate electricity remotely while providing communication and electricity transferal in an inexpensive way giving the currently disclosed invention a utility and useful connection to the internet that is beneficial to the user of the invention, especially people in poverty, while protecting animals, wild life and protecting the environment.

This application claims priority from and is a continuation in part of U.S. patent application Ser. No. 12/768,981, Titled: "Solar Panel Wind Turbine Communication Server Network Apparatus Method and Mechanism", filed on 28 Apr. 2010, which is incorporated by reference in its entirety for all purposes as if fully set forth herein.

And is summarized for clarity of reason for inclusion here, like this:

U.S. patent application Ser. No. 12/768,981 is a component of the current application for the utility to provide the ability to generate electricity remotely while providing communication and electricity transferal in an inexpensive way giving the currently disclosed invention a utility and useful connection to the internet that is beneficial to the user of the invention, especially people in poverty, while protecting animals, wild life and protecting the environment.

This application claims priority from and is a continuation in part of U.S. patent application Ser. No. 12/860,936, Titled: "A method for connecting a human key identification to objects and content for identification, tracking, delivery, advertising, and marketing", filed on 23 Aug. 2010, which is incorporated by reference in its entirety for all purposes as if fully set forth herein.

And is summarized for clarity of reason for inclusion here, like this:

U.S. patent application Ser. No. 12/860,936 is a component of the current application for the utility to provide the ability to have security, tracking, and payments with transferal in an inexpensive way giving the currently disclosed invention a utility and useful payments and commerce remotely that is beneficial to the user of the invention, especially people in poverty, while protecting animals, wild life and protecting the environment.

This application claims priority from and is a continuation in part of U.S. patent application Ser. No. 12/653,749, Titled: "Method and Mechanism for identifying protecting, requesting, assisting and managing information", filed on 17 Dec. 2009, which is incorporated by reference in its entirety for all purposes as if fully set forth herein.

And is summarized for clarity of reason for inclusion here, like this:

U.S. patent application Ser. No. 12/653,749 is a component of the current application for the utility to provide the ability to have inexpensive smart object identification for health and security, with tracking, and connection to payments, with transferal of data, and encryption of identity and data attached to objects with a quick reliable, encrypted de-encrypted indexing and lookup system, with security enabling people to be communicating in a free way, and further in an inexpensive way giving the currently disclosed invention a utility and useful payments and commerce remotely that is beneficial to the user of the invention, especially people in poverty, while protecting animals, wild life and protecting the environment.

This application claims priority from and is a continuation in part of U.S. patent application Ser. No. 13/282,730, Titled: "Method for Transformation of a Website", filed on Jun. 29, 2011, which Is incorporated by reference in its entirety for all purposes as if fully set forth herein.

And is summarized for clarity of reason for inclusion here, like this:

U.S. patent application Ser. No. 13/282,730 is a component of the current application for the utility to provide the ability to have a easy way to build a communication place with security, tracking, payments with transferal in an inexpensive way giving the currently disclosed invention a utility and useful creation of places on the internet and other remote networks for free communication with payments and commerce remotely that is beneficial to the user of the invention, especially people in poverty, while protecting animals, wild life and protecting the environment.

This application claims priority from and is a continuation in part of U.S. patent application Ser. No. 13/171,746, Titled: "Method and process for registration, creation and management of campaigns and advertisements in a network system", filed on Jun. 29, 2011, and is a granted U.S. Pat. No. 8,818,850 which has an issue date of Aug. 26, 2014 which is incorporated by reference in its entirety for all purposes as if fully set forth herein.

And is summarized for clarity of reason for inclusion here, like this:

U.S. patent application Ser. No. 13/171,746 and U.S. Pat. No. 8,818,850 is a component of the current application for the utility to provide the ability to have a easy way to build a communication campaign place with security, tracking, connections to advertisements for revenue generation of the user, creating and attaching virtual bank accounts to the registered users account; setting the value for a first virtual currency, and the conversion rate to a second virtual currency; and including either a first or second virtual currency as an incentive tool in advertisements and campaigns; and trading virtual currencies for tangible and intangible property products and services payments with transferal in an inexpensive way giving the currently disclosed invention a utility and useful creation of campaign places on the internet and other remote networks for free communication with payments, donations to suffering and needy beneficiaries, and commerce remotely that is beneficial to the user of the invention, especially people in poverty, while protecting animals, wild life and protecting the environment.

This application claims priority from and is a continuation in part of U.S. patent application Ser. No. 13/357,029, Titled: "Apparatus for connecting a human key identification to objects and content for identification, tracking, delivery, advertising, and marketing", filed on 24 Jan. 2012, which is incorporated by reference in its entirety for all purposes as if full set forth herein.

And is summarized for clarity of reason for inclusion here, like this:

U.S. patent application Ser. No. 13/357,029 is a component of the current application for the utility to provide the ability to have a easy way to build a communication campaign place with security, tracking, connections to advertisements for revenue generation of the user, enabling and requiring advertisements used in the campaigns or outside campaigns in the method and system to include at least one or a plurality of offers, such as a campaign promotion, discount, incentive, reward, coupon, gift, cash back, benefit, product, or service incentives; quantifying the relative value of a campaign or outside campaign for the purpose of reselling the campaign; quantifying the relative value of an advertising campaign for the purpose of reselling the advertisement; quantifying the relative value of a user for the purpose of reselling the user account; quantifying the relative value of a website for the purpose of reselling the website; disseminating the advertisement to a video, audio, catalog, grid placement system, print media, television, radio, mobile phone, network, or computer, kiosk, transforming a website into one or more campaign pages creating and attaching virtual bank accounts to the registered users account. In it's entirety implemented in the presented application here for use by people for free communication with payments, donations to suffering and needy beneficiaries, and commerce remotely that is beneficial to the user of the invention, especially people in poverty, while protecting animals, wild life and protecting the environment.

This application claims priority from and is a continuation in part of U.S. patent application Ser. No. 13/360,670, Titled: "Method for connecting a human key identification to objects and content for identification, tracking, delivery, advertising, and marketing", filed on 28 Jan. 2012, which is incorporated by reference in its entirety for all purposes as if fully set forth herein.

And is summarized for clarity of reason for inclusion here, like this:

U.S. patent application Ser. No. 13/360,670 is a component of the current application for the utility to provide the ability of people and poor people to have a easy way to build a communication campaign place with security, tracking, connections to advertisements for revenue generation of the user providing an incentive device for utilizing points, and discounts with scanning, capabilities for matching with products can be incorporated into the method; providing scanning to see if a product has a rebate, discount, coupon, or Virtual Cash incentive that can be used in the current purchase being considered; connecting to an identification encrypted human key for identification; scanning the product with a mobile phone, hand held, or any device enabled with product registration scanning capabilities, on mobile phone to see the discount, other offers; purchasing the product; receiving the incentive, discount, coupon, or information; and charging the purchase to the user's encrypted block chain identification human key. The presented application further provides where people or people people in poverty can utilize simply speaking into their mobile phone which most people in poverty have access to where they create an audio voice print; streaming video images and creates video print; converting video data to color band calculated pattern to numbers; registering the numbers in a database with special interpolation algorithm as a digital fingerprint; recording a phrase; creating an audio voice print login; streaming video images; creates a video print; converting video data to color band calculated pattern to numbers; and comparing converted data to a database of pre-registered audio video prints digital fingerprint thereby providing a Virtual World energy bank; for the people to uploading content; protecting content automatically; providing a virtual cash virtual currency (VCVC) appraisal and payment for the users uploaded content directly into their content bank; providing collaborations to make the content better or for packaging, marketing, opinions from other users, then the user can test the interest in the content, and sell, license, rent, or lease; selling the content through an independent outside clearing house with only a small percentage of the revenue generated going back to the system; and depositing an equal amount to the commission being deposited in (VCVC) in the user who approved the generated revenues virtual cash virtual currency (VCVC) bank account. In it's entirety implemented in the presented application here for use by people for free communication with payments, providing additional income for people in poverty in remote areas, and undeveloped places as well as developed places. It also enables real effective donations to suffering and needy beneficiaries, and commerce remotely that is beneficial to the user of the invention, especially people in poverty, while protecting animals, wild life and protecting the environment.

This application claims priority from and is a continuation in part of U.S. patent application Ser. No. 13/332,173, Titled: "Method for identifying and protecting, information ", filed on 12 Dec. 2011, which is incorporated by reference in its entirety for all purposes as if fully set forth herein.

And is summarized for clarity of reason for inclusion here, like this:

U.S. patent application Ser. No. 13/332,173 is a component of the current application for the utility to provide the ability of people and poor people to have a easy way to communicate medical information to doctors, academic educators and medical researchers in an inexpensive, free communication through access to mobile phone system. Ser. No. 13/332,173 teaches where easy tasks are performed by people or people in poverty simply by looking into a camera; aligning the cross hair with a user's nose; saying a key phrase; displaying a calendar with time date and place stamp comes up next to medical records; recording type, amount, time, date, and location data when a user takes medicine; providing reminders to take; storing usage and medical information for a medication, when a user buys a prescription; verifying when a user ID when the pharmacy fills prescription; automatically alerting a user to take a user medication; tracking when a user took medicine; forwarding data to a user doctor; saving data in a medical journal; and publishing data to a data exchange for determination of how a patient is doing. Also Ser. No. 13/332,173 teaches where elderly people, people, or people in poverty can; use a voice message recorder to fill in forms; selecting any language; storing data to be analyzed and added to clinical trials, doctor reports, or a user's medical journal; displaying an updated user's medical journal upon data storage. Ser. No. 13/332,173 further teaches where people or people in poverty can receive instructions and audio alerts and video diagrams for precare, aftercare, and wellcare situations; tailoring information and instructions to be sent and received by a user based on their identification; receiving instructions and audio alerts and video diagrams related to how to get ready for an upcoming medical event; and receiving health information and tips for staying well and how to prevent illness. And Ser. No. 13/332,173 further teaches where people in poverty remotely after logging in to the system; using an audio verbal command requests their medications be repeated a registered phrase; returning information telling the user when they took their medication, the location and time, and any results or side effects previously recorded; listing the user's medication and a calendar of time and locations of when and where they were taken; providing an audio typing module that converts spoken works into text and a language translator that can translate spoken words into translated text; storing all responses and entries in a user's medical database; and storing all responses and entries in a medical research database base if opt in is selected by the user. And still further Ser. No. 13/332,173 teaches where people, elderly people and people in poverty can be using the voice and text messages for tracking how the user/patient takes care of themselves; tracking through an information exchange, how suggested treatments or actions are occurring for an individual user and comparing that to groups of users under the same orders to see if the orders can be better tailored or executed to obtain the desired results; and learning systems can be indexed for learning related to different disease treatment methods around the world which is a key component to relieving suffering and helping needy beneficiaries, and commerce remotely that is beneficial to the user not to mention all mankind due to half the world population 3.7 billion people living in poverty, as a key component of the presented invention, for reducing the people in poverty, while protecting animals, wild life and protecting the environment.

This application claims priority from and is a continuation in part of U.S. patent application Ser. No. 12/459,353, Titled: "Method and mechanism for protection, sharing, storage, accessing, authentication, certification, attachment and tracking anything in an electronic network", filed on Jun. 29, 2009, which is incorporated by reference in its entirety for all purposes as if fully set forth herein. And is summarized for clarity of reason for inclusion here, like this:

U.S. patent application Ser. No. 12/459,353 is a component of the current application for the utility to provide the ability of people and poor people to have a easy way to communicate and work with each other to make their lives better together creating collaboration groups to reduce poverty in 3.7 billion people in the world. Ser. No. 12/459,353 teaches where a collaborative mechanism which automatically enables individuals, groups and corporations to buy and sell as a group through aggregating people together into buying and selling groups; which will allow them to price things together in groups; bid together in groups; shop together in groups; request for anything as a group; pay together in groups; collaborate together in a groups; help people places or things together in a group; utilizing a shared payment platform as a group throughout all areas of the entire method and this here presented application and invention. Ser. No. 12/459,353 also teaches other methods and mechanisms: fair value, fair deal, fair share; and further more utilizing video, text, audio, email, conventional mail, and a video card method and mechanism for linking a video file, scanned document or any file to lessons, classes, lectures, tutorials, cultural exchanges, online classes, and in addition having the ability to protect, share, store, access, authenticate, attach and the track the files by way of a method, system and mechanism that will automatically create, upload, encrypt, re-encode, store and or de-encrypt any file in a live or non-live networking environment throughout all aspects of the method and here presented application and invention. Commerce traded in groups, and education are very important aspects to relieving poverty around the world which is a key component to relieving suffering and helping needy beneficiaries, and commerce remotely that is beneficial to the user not to mention all mankind due to half the world population 3.7 billion people living in poverty, as a key component of the presented invention, for reducing the people in poverty, while protecting animals, wild life and protecting the environment.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Application/Control Number: Ser. No. 16/395,175
Art Unit: 3649

STATEMENT REGARDING PRIOR DISCLOSURES BY THE INVENTOR OR A JOINT INVENTOR

The Provisional Applications filed prior to the filing of this application that were filed in May 2018, that are respectively 62/667,298, 62/667,293, 62/667,280, 62/667, 274, 62/667,262, 62/667,150, and 62/670,834 are directly a part of and directly related to application Ser. No. 16/395, 175 a nonprovisional utility patent which applications are core components of this presented invention disclosed here. I respectfully request that they be included as core components in their entirety as intended retaining their priority filling dates. The Application Data Sheet has been corrected as per the examiners direction, with fee paid and with all respect I appreciate the guidance of the examiner in the corrected filing.

All prior disclosures are related to the core mission of applications related to the reduction of poverty, protection of animals, wild life and the environment.

BACKGROUND OF THE INVENTION (1) Field of the Invention is related to Affordable Energy Generation and Storage, Water Generation and Storage, Agriculture and Farming in small areas, Conservation of Water, Soil and Nutrients, Remote payment systems, Healthy Food and Abundant Production of Food apparatus, Healthy reduced smoke cooking, heating, cooling for food storage and preservation, and education.

(2) The core problem in poverty reduction always leads back to lack of energy, clean water, housing development, healthy agricultural systems that do not deplete the minerals and active enzymes in the growing soil. Also the areas that are used for growing have depleted water attributed to droughts from climates changing due to the way food is grown, combined with ground water depletion and non structured pure growing water.

(3) The solution presented here utilizes a plurality of apparatus and systems all combined into a system for inexpensive sustainable energy generation, water generation and conservation, energy storage, sharing of payments, non tilling agricultural apparatus, with cooling and heating components for people in undeveloped places, helps reduce poverty, reduce deaths and sickness from the burning of trees to cook, heat and live. The invention disclosed here has components that can bring relief to people in poverty, while at the same time protect animals, wild life and the environment world wide.

(4) Description of Related Art including information disclosed. The presented Apparatus System comprises the following: A Sustainable Hydro Electric Structured Water low-energy pumping mechanism to move water uphills. An Alternative Energy Booster Apparatus, providing additional electricity to batteries, increasing electricity from Solar Panels. Programmable Computer Controller's with integrated processes for distribution of Virtual Currency, from Crypto Mining for Distribution of Assets. An apparatus for generating electricity from a plurality of solar panels in rack mounting structure utilizing mirror tracking apparatus. An Apparatus for Multiple Cell Electricity Generation with Battery Storage and Electricity Generation Switching and Pumping Apparatus System combined. An Apparatus and Mechanism for Hugelkultur Farming, combined with Solar Panel racking. A Hybrid Apparatus for air heating, cooling and additional electricity generation, with structured water conditioning components including temperature controlled heating and cooling created from solar photo voltaic modules. With programmable computer controllers utilizing sensing devices for managing performance of the apparatus and the complete system. In the end people in poverty can produce their own Energy, Food, Heat, Cooling, and can have online access to earn additional revenue that they can add to their $3.00 a day they currently earn. This allows them to expand their seed banks, provide better health and reduce their mobile phone charging costs they have to pay charging people, that add up to 8.33% of their daily $3.00, while giving their families a healthier life. Mobile phones in undeveloped countries are used as banks for people in poverty. In addition the apparatus system presented here gives the ability for people in poverty to access a robust available education due to the online payment system included in the system.

BRIEF SUMMARY OF THE INVENTION

There is a need for inexpensive solutions to providing energy, water, food, housing, heating, cooling and education to not just the 50% 3.7 billion people on the planet but also the not included people in poverty that adds up to 3.5 billion people at the time of the filing of this application. This invention presents a solution that utilizes the apparatus, mechanisms, components, processes and systems that working all together can reduce poverty, while protecting animals, wild life and the environment. The issues today are that all electricity production depletes fresh drinking water. Places in Africa and many underdeveloped places, have very little fresh water for generating electricity so they have huge amounts of energy poverty. 4.3 million women and children die each year due to burning fossil fuel, wood and other things from lung illnesses. People in poverty have to cut trees to stay warm, cook their food, and boil the tainted water not to get sick. The cutting of the trees depletes wild life, lowers global oxygen production, and pollutes land, water, and air. Providing education, and apparatus such as what is presented here can reduce poverty, while protecting animals, wild life and the environment combined with education powered by abundant remote electricity combined with communication, education and payment tools. The components assembled here to make up this apparatus and system have been picked for their reliability, low cost, non toxic, organic capabilities. The methods and computer programmable mechanisms have been applied for their sustainability. The agricultural apparatus have been tested in the field and are a perfect solution combined with the energy and water apparatus presented here for reducing poverty, protecting animals, wild life and the environment.

BRIEF DESCRIPTION OF THE DRAWINGS

The figures presented here in this current application are representing the apparatus and system but the provincial patent filings have other drawings that more clearly show how the apparatus works, along with the other applications in their entirety as defined in the amended Application Data Sheet as directed by the examiner. See below a brief description of the 61 drawings submitted with the current application for more clarity in understanding the main scope of the any components presented in the application and how they are needed for the apparatus and system to function properly.

FIGS. 1-5 Drawings are related to Reducing Poverty, Protecting Animals, Wildlife and the Environment in these ways: A. Utilizing Flowing of Water to Generate Additional Electricity B. Storing and Moving Water that is Generated from well, tanks, or other water source such as Atmospheric Water Generation C. Structured Water: Not all water is H2O. Research published by Dr. Gerald Pollack, from the Bio Engineering Department at the University of Washington reveals a fourth phase of water with a molecular structure of H3O2 that acts like a battery, releasing energy to support healthy, vibrant crops. Energized or Structured Water in agriculture is the secret for a higher quality crop with 30% less water. Less water and less pumping mean lower bills and greater profits. Here are a few specific health issues that have become less bothersome or have disappeared altogether according to various regular users of structured water~with no guarantee, of course, that these are universal improvements that will apply in all cases: Dentures: plaque buildup Digestion: weak, reactive, gas, bloating, amoeba Eating issues: see Overeating Eyes: tired, tense, sore, droopy eyelids, near-sighted Exhaustion Fingers: dry hard fingertips, hangnails Gums: bleeding, sore, smelly Hair: dry, dandruff, weak, thin Headaches Insomnia, unable to go to bed at night, not sleeping enough Nails: weak, cracked, break Odor: body odor, bad breath Overeating: not feeling satisfied, eating from nerves/tension Parasites: water-borne infections: apparent protection Skin: dry, blotchy, lumpy, mini warts, non-healing scaliness, wrinkles, psoriasis Sleep issues: falling asleep when you need to stay awake (in classroom, in meditation); see also Insomnia, Tiredness Stiffness, inflexibility: neck, shoulders, back, ankles, hips Teeth: plaque Tiredness: low energy, exhaustion Tongue: fuzz Varicose veins Wrinkles, lines Animals also benefit from structured water. Wild Life drink Structured Water from Streams, Rain and Spring Water The Environment is fueled by Structured Rain Water, Streams, Rivers and Springs.

FIGS. 6-11 Drawings are related to Increasing Electricity in an inexpensive way for keeping batteries charged during night time and inclement weather where there is a reduction in sunlight to run Solar panels. Poor people are the least likely to have access to power and healthy lifestyles. And they are more likely to remain poor if they remain unconnected, or their power they have goes down. 50% of the food in undeveloped areas with people in poverty has to be thrown out spoiled every day due to no sustainable electricity for cooling, to preserve the food. The switching apparatus here presented as a core component in this application is needed in the work of Reducing Poverty, Protecting Animals, Wildlife and the Environment.

FIGS. 12-16 Drawings shows where in the presented application here that to be able to reduce poverty we need as a core component of the invention a special inexpensive manufacturing process. A 3D printed case with layers of Anode and Cathode materials were developed to fit the needs of this component in what we have presented here. By using this apparatus with conductive and non conductive 3D printing materials, these Energy Generation storage components can be quickly manufactured utilizing inexpensive organic non toxic materials. Plus combing special switching apparatus as a component increases current and energy. Having inexpensive 3D printed quickly manufactured low cost generation and storage apparatus as core components in what is presented here increases the ability to be able to reduce Poverty, Protecting Animals, Wildlife and the Environment.

FIGS. 17-18 Drawings are related to utilizing low cost low voltage wall panel apparatus that has a energy generation and energy transferal apparatus that is needed with housing for poor people, affording them safe and dependable lighting with out expensive wiring materials and when combined with the other apparatus as part of the resented invention people can reduce the amount of wood burning which cost the lives of 4.3 million women and children every year. This apparatus and its functions are a core component of the system presented here to be used together with the other core components in Reducing Poverty, Protecting Animals, Wildlife and the Environment.

FIGS. 19-38 and 52-53 Drawings respectively are related to multiple apparatus that are used in the presented system where each serves as a utility to solve specific problems in keeping the whole apparatus and system sustainable with less repairs and longer life for inexpensive, non toxic organic energy generation and energy storage. All these components combined make up the presented mechanism for the purpose of Reducing Poverty, Protecting Animals, Wildlife and the Environment.

FIGS. 39-45 Drawings are related to providing people in poverty a payment system that can be used in remote areas utilizing all the other components of the current presented application here. People in poverty make under $1.90 per day, and 25 cents of that amount has to be paid to people to charge their mobile phone which is their bank account. people in poverty have to have a mobile phone so that they can use it to buy the seeds they need to grow their food if they are fortunate enough to have a place to grow their food. Having a payment system for these people as presented in this application is a core component apparatus for the purpose combined with all the other components for the purpose of Reducing Poverty, Protecting Animals, Wildlife and the Environment.

FIGS. 46-51 Drawings are related to having an inexpensive amount of land and space that can be used to generate electricity, create a hot house for growing in hot or cold climates, combined with back Bi Facial solar panels where mirrors can be used to increase electricity in a passive way, or to increase the temperature during very cold times of the year. The presented invention here has this apparatus as a core component and when it is covered during the summer and winter it also reduces the amount of water needed to grow abundant food and drastically reduces the amount of ground water during drought conditions needed. This inexpensive apparatus is part of the core components that make up the presented invention here for Reducing Poverty, Protecting Animals, Wildlife and the Environment.

FIGS. 58-60 Drawings are related to utilizing inexpensive apparatus added to the core components of the system apparatus presented here to provide cooling for air and water to preserve food, and heating in the winter to keep people warm. The apparatus component presented here has an additional inexpensive electricity generation apparatus working in coordination with alternative energy for sustainable heating, cooling and electricity generation with battery storage for Reducing Poverty, Protecting Animals, Wildlife and the Environment.

FIG. 61 Drawing are related to utilizing infrared energy at night to generate additional electricity when the sun can not be used at night for generation helping the core apparatus presented here in Reducing Poverty, Protecting Animals, Wildlife and the Environment.

DETAILED DESCRIPTION OF THE SEVERAL VIEWS OF THE DRAWING(S)

Figure 31:
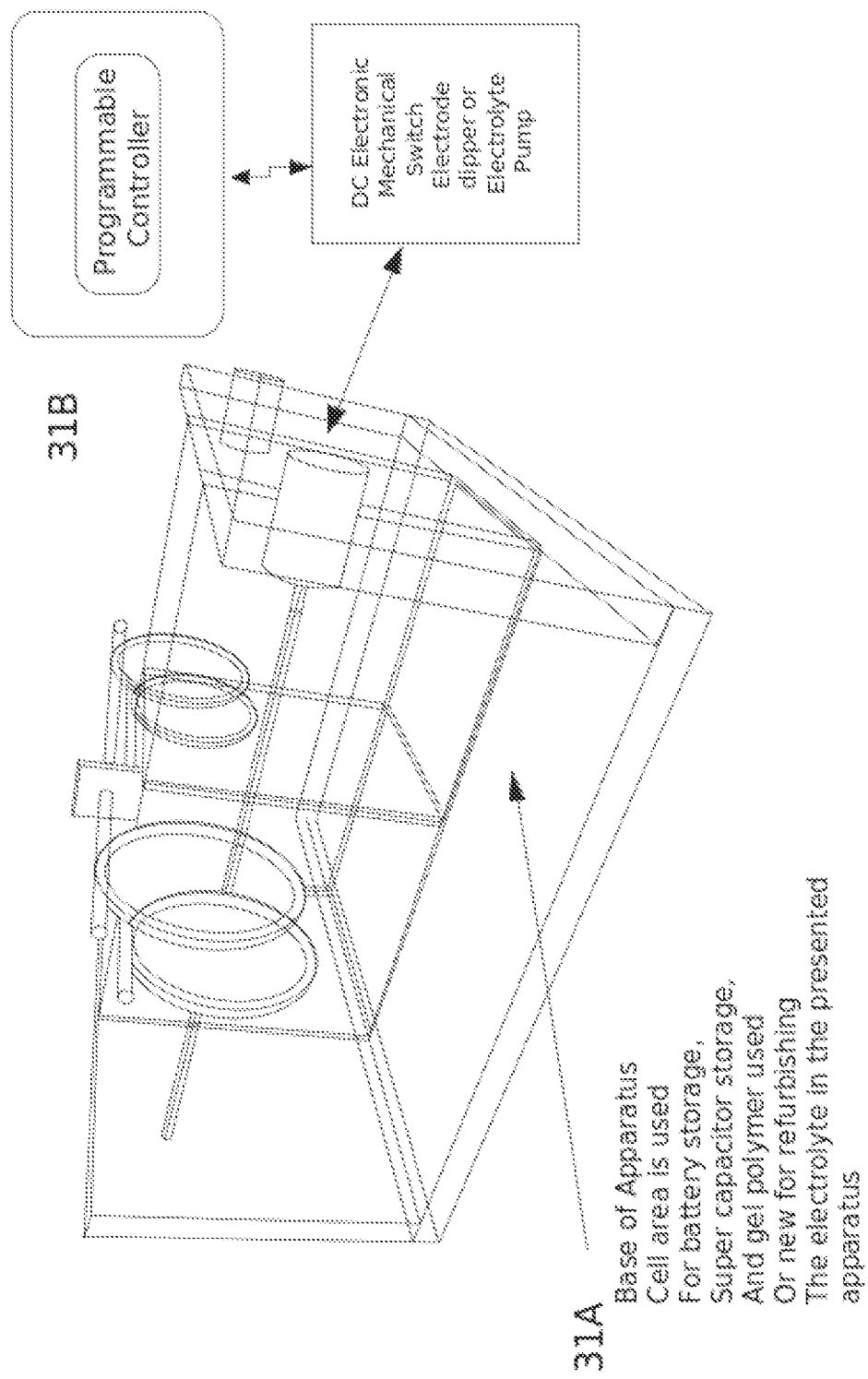

FIG. 1 shows a pump generator energy storage apparatus and system presented here managed by a plurality of autonomous or manual computer controllers that can be programmed for energy creation and water conservation. And also shows egg shape Hydro electric generator for structuring water with graphene water filtration system, and electricity generation through fluid turbine piping system.

FIG. 2 shows Hydro Electric Structured Water Apparatus which has water flowing in the egg shape in a torus formation before it flows into the center tapered column that creates a vortex with the water flow as water circulates through the egg shaped apparatus.

FIG. 3 shows the pump generator energy storage apparatus with the programmable computer controllers, water storage tanks, water pumps, brush less water turbine electricity generators, and the flow of water.

FIG. 4 shows the Pump Generator Energy Storage Hydro Turbine Apparatus.

FIG. 5 shows a pump generator energy storage apparatus and system presented here managed by a plurality of autonomous or manual computer controllers that can be programmed for energy creation and water conservation.

FIG. 6 Describes structural aspects functions and processes of the Alternative Energy Booster Apparatus Switching System for the individual Shutoff of Cells, the Modifying Polarity and the Switching of Circuits from Parallel to Series Connection.

FIG. 7 Describes component aspects functions and processes of the Alternative Energy Booster Apparatus Electricity Generation and Energy Storage Capacitor Area.

FIG. 8 Describes structural and component aspects, functions and processes of the Alternative Energy Booster Apparatus Switching System for Shutoff of Cells and Modifying Polarity.

FIG. 9 Describes structural, material and component aspects, functions and processes of the Alternative Energy Booster Apparatus Switching System for the individual Shutoff of Cells, the Modifying Polarity and the Switching of Circuits from Parallel to Series Connection.

FIG. 10 Describes flow, functions and processes of the Alternative Energy Booster Apparatus Switching System Flow for Shutoff of Cells Rerouting and/or Switching to bring additional Voltage and current into the Circuit.

FIG. 11 Shows diagrams of the Alternative Energy Booster Apparatus Switching System for the individual Shutoff of Cells, the Modifying Polarity and the Switching of Circuits from Parallel to Series Connection and Voltage drop in Booster Apparatus where the rerouting of electricity can be done, and/or additional energy can be added into the circuit to bring additional Voltage and Current into the Circuit.

FIG. 12 Shows diagrams of the Alternative Energy Booster Apparatus Case Apparatus Assembly with Cathode and Anode Built into 3D Additive Printed and Manufactured Structure of the Booster Apparatus.

FIG. 13 Shows diagrams of the Alternative Energy Booster Apparatus 3D Printed Case with Layers of Materials to Create Anode and Cathode of the Booster Apparatus.

FIG. 14 Shows diagrams of the Alternative Energy Booster Apparatus Switching System for Shutoff and Programmable Software Controlled Management of Electricity Storage Apparatus and Modifying Polarity.

FIG. 15 Shows diagrams of the Alternative Energy Booster Apparatus Switching System for Shutoff and Programmable Software Controlled Management of Electricity Generation, Use and Storage Apparatus.

FIG. 16 Shows diagrams of the Alternative Energy Booster Apparatus DC Electricity Generation Apparatus Booster Cell with these components and functions; DC Electricity Generation Apparatus; Layered and Surface Graphene Coated Electrodes.

FIG. 17 Shows diagrams of the Alternative Energy Booster Apparatus DC Electricity USB-C PDAware Wall Adapter apparatus with the following components and functions.

FIG. 18 Shows diagrams of the Alternative Energy Booster Apparatus and other DC Electricity Sources for 12 volt or higher DC Electricity transferal to USB-C PDAware Wall Adapter apparatus.

FIG. 19 Shows diagrams of the Alternative Energy Booster Apparatus and other DC Electricity Sources with the Electrolyte Pumping Apparatus for Plurality of Cells with Electrode Cell Casings, and Programmable Controller for Electrolyte Delivery.

FIG. 20 Shows diagrams of the Alternative Energy Booster Apparatus and other DC Electricity Sources with the Top View of Multiple Cells in Apparatus Showing Electrodes.

FIG. 21 Shows diagrams of the Alternative Energy Booster Apparatus and other DC Electricity Sources with the Expanded View of Cell Array of the Apparatus and Functions.

FIG. 22 Shows diagrams of the Alternative Energy Booster Apparatus and other DC Electricity Sources with the Placement of Input and Output Electrolyte Delivery Apparatus Describing Disbursal and Refurbishment with Pump in System.

FIG. 23 Shows diagrams of the Alternative Energy Booster Apparatus and other DC Electricity Sources with the Sacrificial Electrode Stack with Timer Acrylic Polymer Coating Apparatus.

FIG. 24 Shows diagrams of the Alternative Energy Booster Apparatus and other DC Electricity Sources with the Top View of Cathode Assembly in the Apparatus with Plurality of Cathodes.

FIG. 25 Shows diagrams of the Alternative Energy Booster Apparatus and other DC Electricity Sources with the Dual Cell Configuration of Low Density and High Density Electrolyte.

FIG. 26 Shows diagrams of the Alternative Energy Booster Apparatus and other DC Electricity Sources with the Plurality Layers Alternate Utility Grade Cell in Apparatus.

FIG. 27 Shows diagrams of the Alternative Energy Booster Apparatus and other DC Electricity Sources with the Mechanical Generators Alternative Energy Apparatus Boost, Backup, Storage Components.

FIG. 28 Shows diagrams of the Alternative Energy Booster Apparatus and other DC Electricity Sources with the Electro mechanical Dipper Switching System for Switching Off and On Electrodes Within Cells in Presented Apparatus.

FIG. 29 Shows diagrams of the Alternative Energy Booster Apparatus and other DC Electricity Sources with the Sacrificial Anode Cathode Layered Timer Electrodes.

FIG. 30 Shows diagrams of the Alternative Energy Booster Apparatus and other DC Electricity Sources with the Electromechanical Dipper Switching System for Switching Off and On Cells in Apparatus.

FIG. 31 Shows diagrams of the Alternative Energy Booster Apparatus and other DC Electricity Sources with the Electromechanical Dipping Switching System for Switching Off and On Cells in Apparatus.

Figure 32:
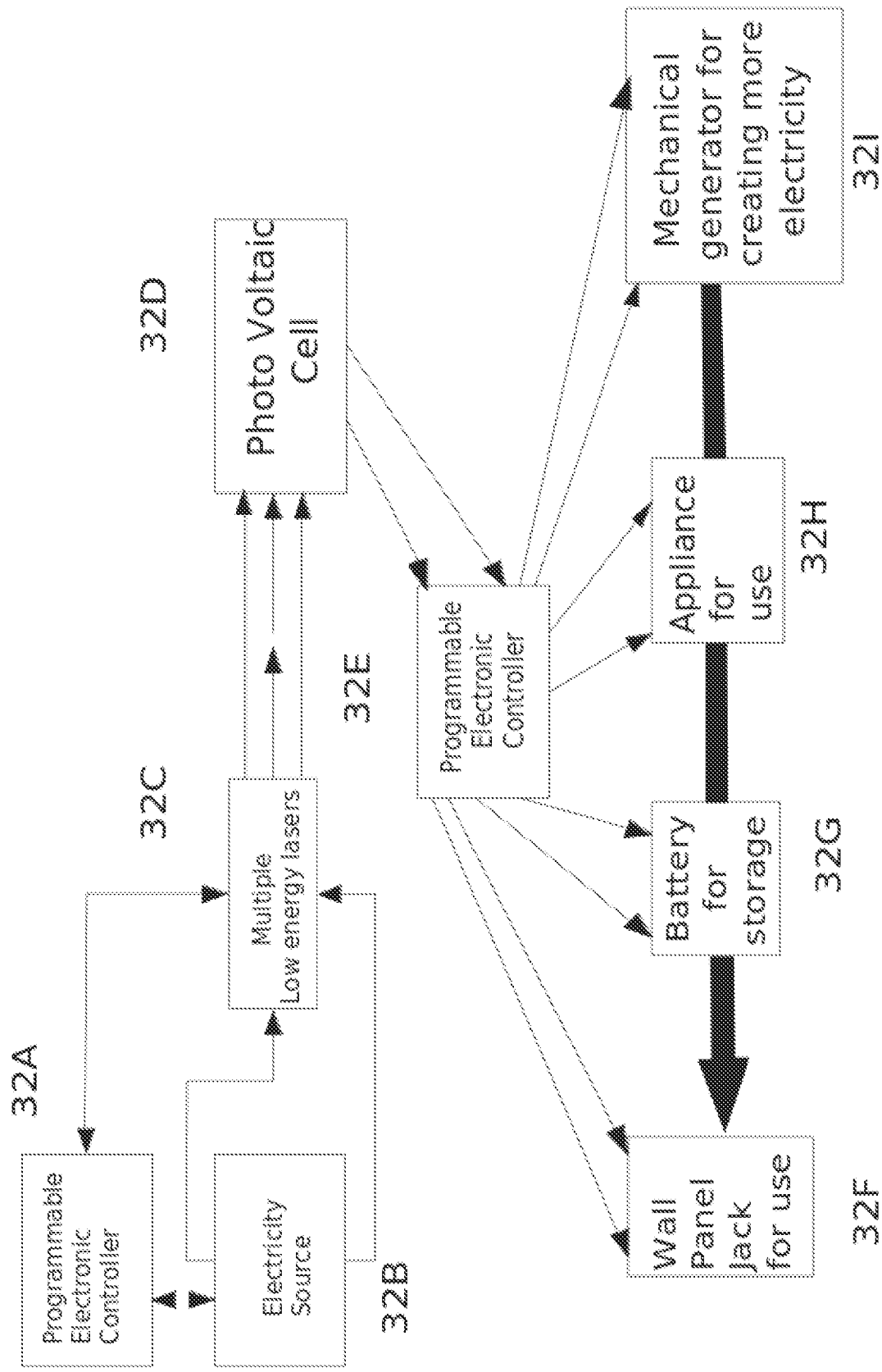

FIG. 32 Shows diagrams of the Alternative Energy Booster Apparatus and other DC Electricity Sources with the Wireless Electrical Transferal Component of the Apparatus.

Figure 33:
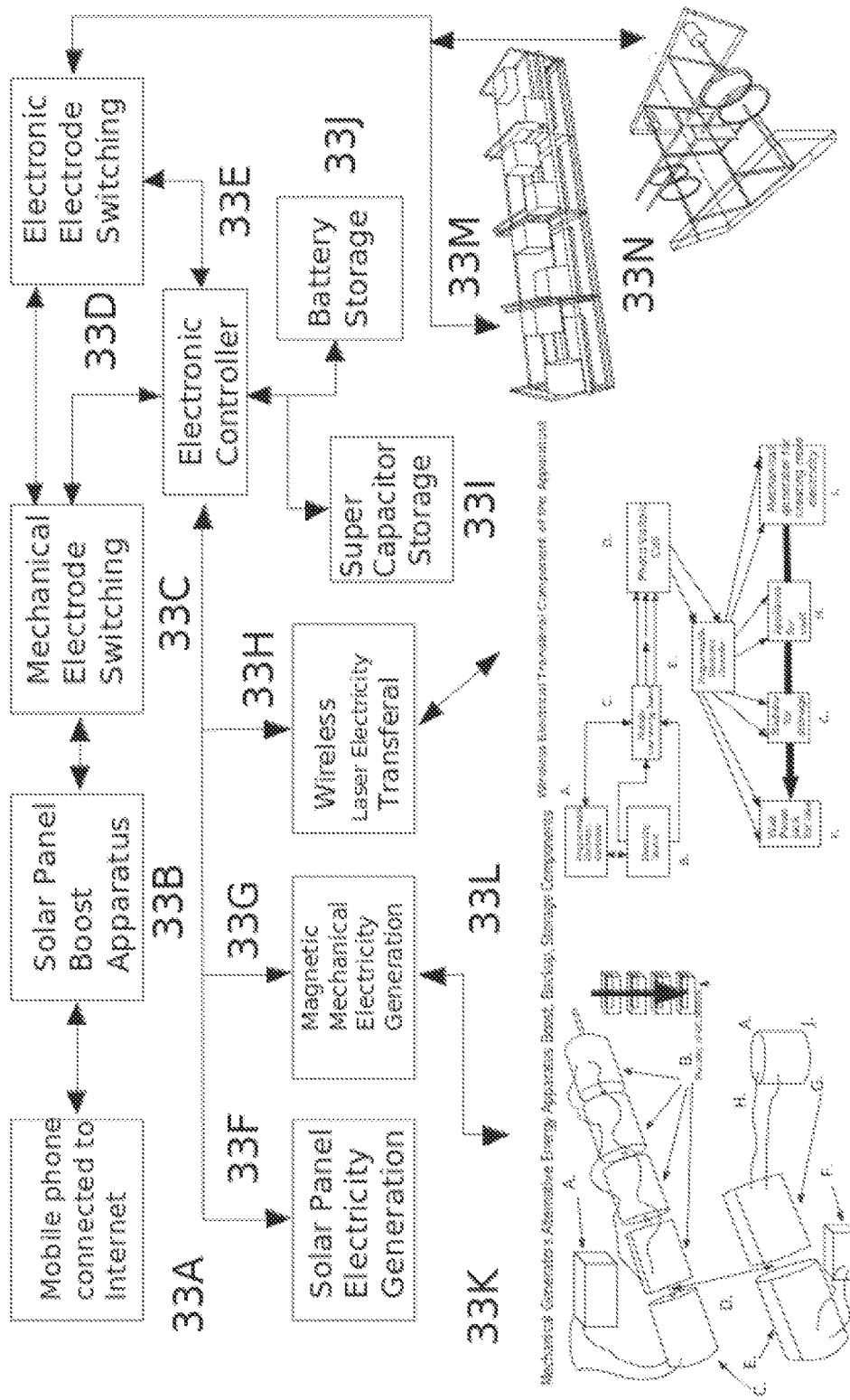

FIG. 33 Shows diagrams of the Alternative Energy Booster Apparatus and other DC Electricity Sources with the Mobile Phone Payment System Connected to mechanically and electronically shutting off of Cells, Modifying Polarity and reducing energy output of the Solar Panel Boost Apparatus.

FIG. 34 Shows diagrams of the Alternative Energy Booster Apparatus and other DC Electricity Sources with the Switching System for Shutoff of Cells and Modifying Polarity and Backing up Electricity, Storage of Electricity and Night Time Use Of Electricity.

FIG. 35 Shows diagrams of the Alternative Energy Booster Apparatus and other DC Electricity Sources with the Switching System for Shutoff of Cells and Modifying Polarity and Backing up Electricity, Storage of Electricity and Night Time Use Of Electricity.

FIG. 36 Shows diagrams of the Alternative Energy Booster Apparatus and other DC Electricity Sources with the Low Cost 4 Cell Switching System 6 to 8 volts with Autonomous Layered Cathode Apparatus.

FIG. 37 Shows diagrams of the Alternative Energy Booster Apparatus and other DC Electricity Sources with the Potential Energy Switching System for the Capture of Maximum Energy in Apparatus.

FIG. 38 Shows infrared electricity generation apparatus, utilizing anode cathode and graphene chlorophyll solution where the temperature increases generation.

In FIG. 39 of the apparatus for splitting virtual currency mining payoff rewards with nonprofit, profit and poverty individuals through donations.

FIG. 40 shows Apparatus for Splitting Virtual Currency Mining Payoff Rewards with Non Profit, For Profit and Poverty Individuals Through Donations.

FIG. 41 shows Apparatus for Splitting Virtual Currency Mining Payoff Rewards with Non Profit and Poverty Individuals Through Donations.

FIG. 41B shows the same processes splitting the main block reward earned by miners into separate useful wallets for the purpose of creating funding sources for goodwill and to fund businesses and nonprofits.

FIG. 41A we see where teachers receive crypto coin currency that is useful in their wallets.

FIG. 41G we see where poverty individuals or any individuals in the world receive crypto virtual Currency coins in their wallets for proof of work in taking pictures and submitting them to the system.

FIG. 41H we see people in poverty, people with mobile phones, or the general population being able to earn additional crypto currency coins from the fund wallet for making videos and uploading them to the system as proof of work.

FIG. 42 shows Apparatus for Splitting Virtual Currency Mining Payoff Rewards with Non Profit and Poverty Individuals Through Donations.

FIG. 43 shows Apparatus for Splitting Virtual Currency Mining Payoff Rewards with Non Profit and Poverty Individuals Through Donations.

FIG. 44 shows Apparatus for Splitting Virtual Currency Mining Payoff Rewards with Non Profit Environment and Poverty Individuals Through Donations.

FIG. 45 shows the process in the apparatus related to a programmed ASIC chip with registration to banking in transactions.

Figure 46:
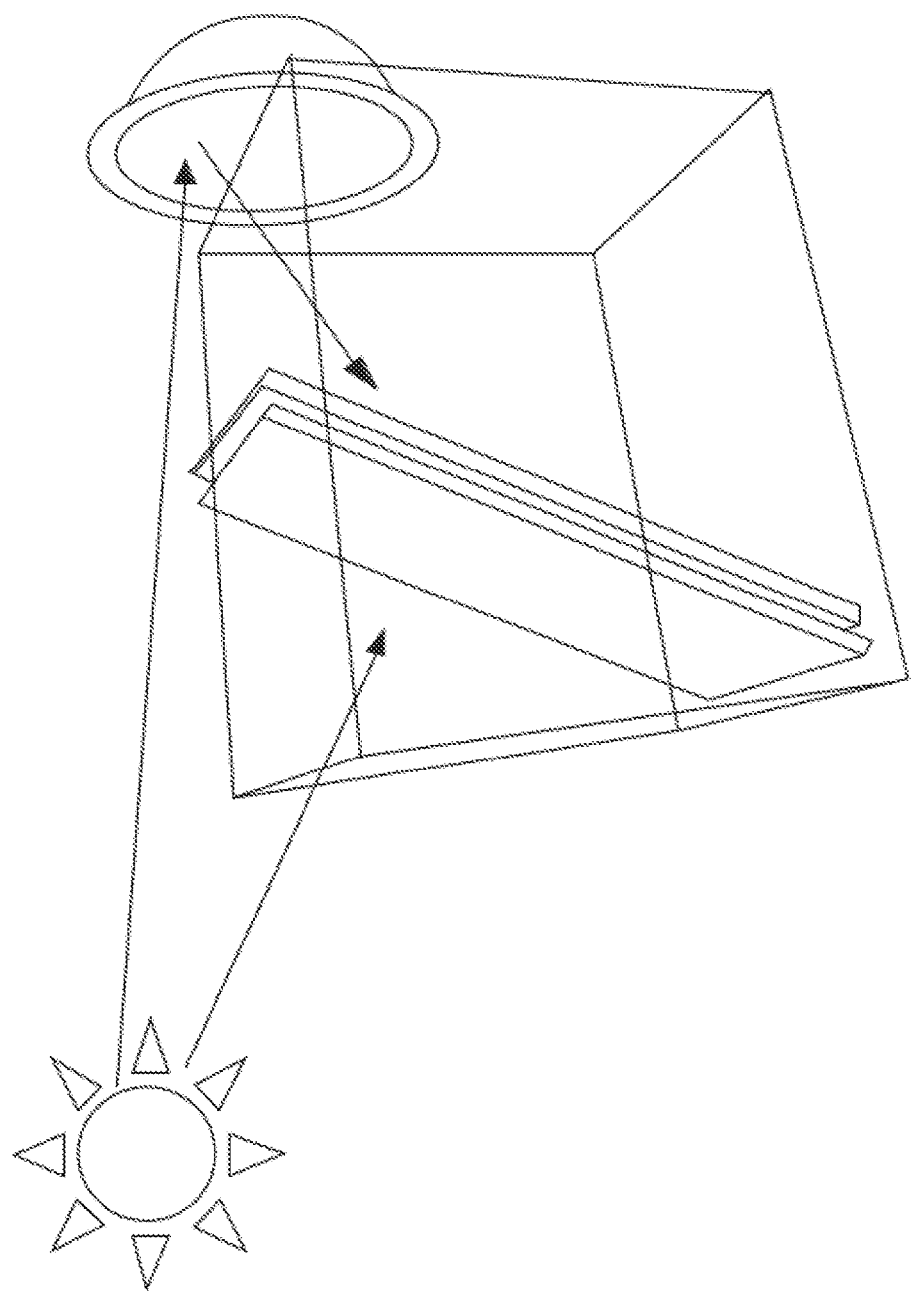

FIG. 46 shows the apparatus presented here for generating electricity from a plurality of solar photo voltaic panels in a rack mounting structure utilizing a mirror tracking apparatus for increasing electricity generation in a specific spatial point area. This drawing also shows non-flat concave mirror concentrates the light on the back solar panel. The drawing also describes the sun reflecting on the front solar panel while at the same time reflecting from the mirror into the back solar panel. In our test most of the time the front solar panel amount of energy was equal to or 10% less. It also shows the top of the apparatus looking down and seeing the casing that surrounds the growing area at the bottom. And further also shows the spacing in between the to solar panels for cooling and heating. And it also further shows the sun in a different position and where the rounded mirror can direct the sun to the back service of the back solar panel.

Figure 47:
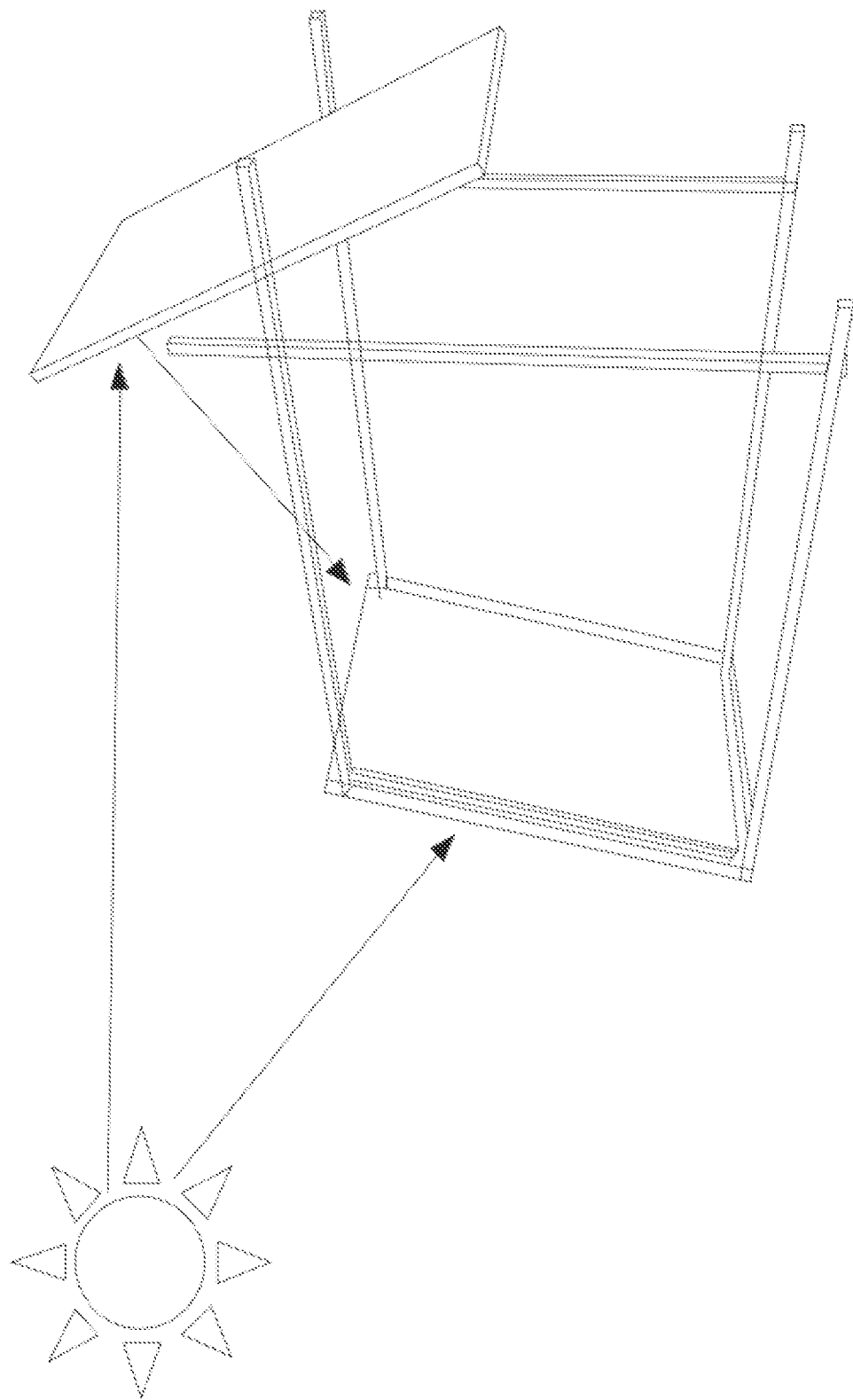

FIG. 47 shows a side view with the racking system where the solar panel back to back array is placed in a case and the mirror is mounted at a higher level than the back to back solar photo voltaic panels are mounted. It also shows the sun in a different position, reflecting light off the mirror the back while at the same time providing light to generate electricity on the surface of the front panel. And shows where the mirror in the back can tilt up and down for illumination at different angles of the sun in comparison with the mounted solar photo voltaic module with the back to back mounting in the rack.

Figure 48:
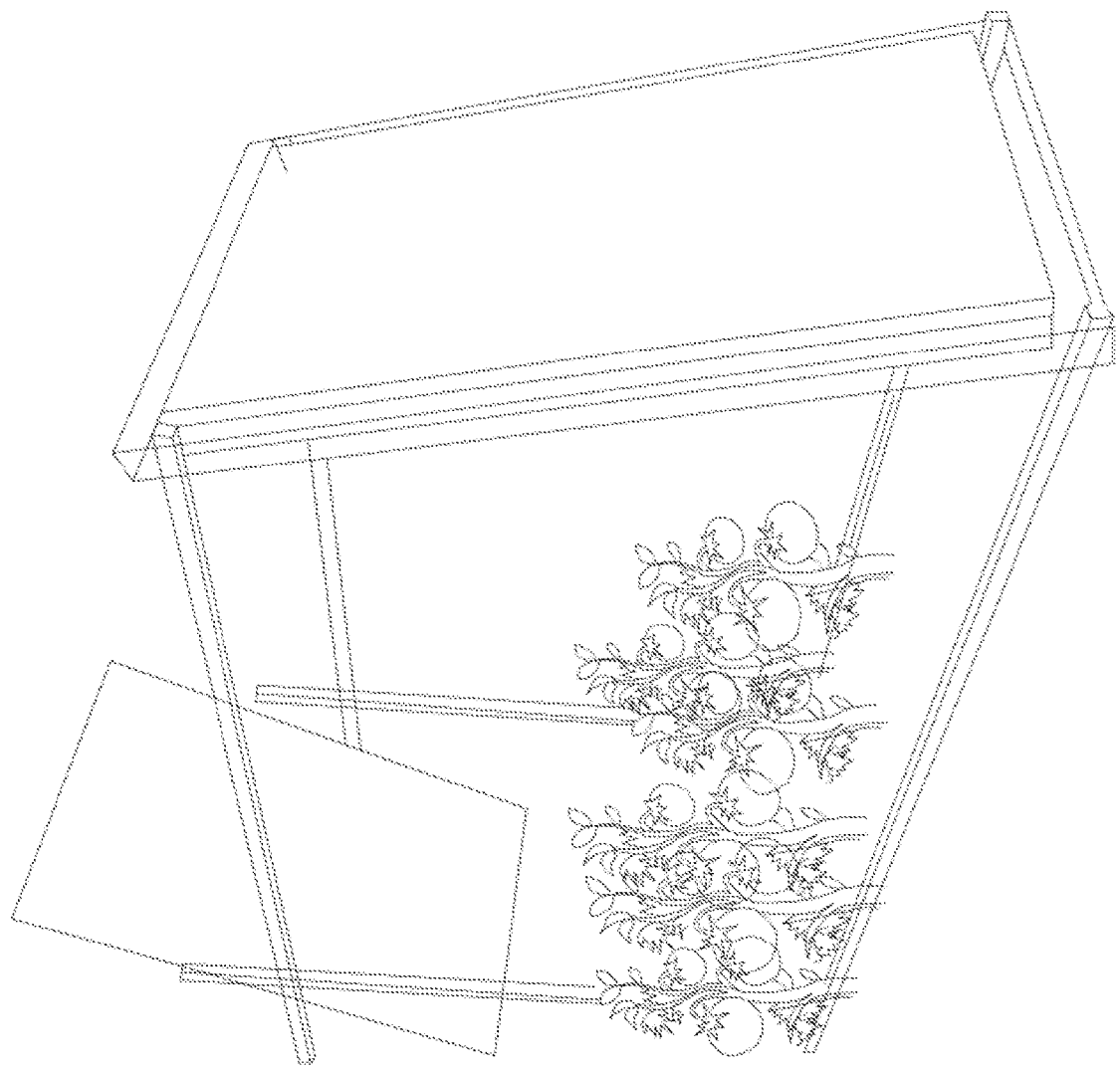

FIG. 48 shows the growing area cold box or a hot box that can be mounted and is mounted below the solar panels and the solar reflector mirror. This area can be used to grow large amounts of food rather than not being used. And shows a solar reflector concentrator mirror that not only reflects light into the back solar panel but adds light to the growing area for better growing of crops in this agricultural apparatus. And shows the apparatus presented with the 600 W dual concentrated solar panel agriculture growing cell with the sunlight being absorbed in the front solar panel and then reflected by the mirror reflector into the back solar panel which provides reflected concentrated sunlight and heat in the winter for growing plants below the solar panel modules. And also shows where reflected sunlight and heat are applied to the plant-based area for growing and cold or hot environments. A cooling system is utilized when the weather is hot, and the actual solar panels shield plants from extreme heat also. And still further shows a front view of the 600 W dual concentrated solar panel agriculture growing cell with the front solar photo voltaic panel and the air space between the two panels mounted in an airtight case. It further shows Hardy tomatoes growing in the base area with the racking system and the movable flat mirror in the back.

Figure 49:
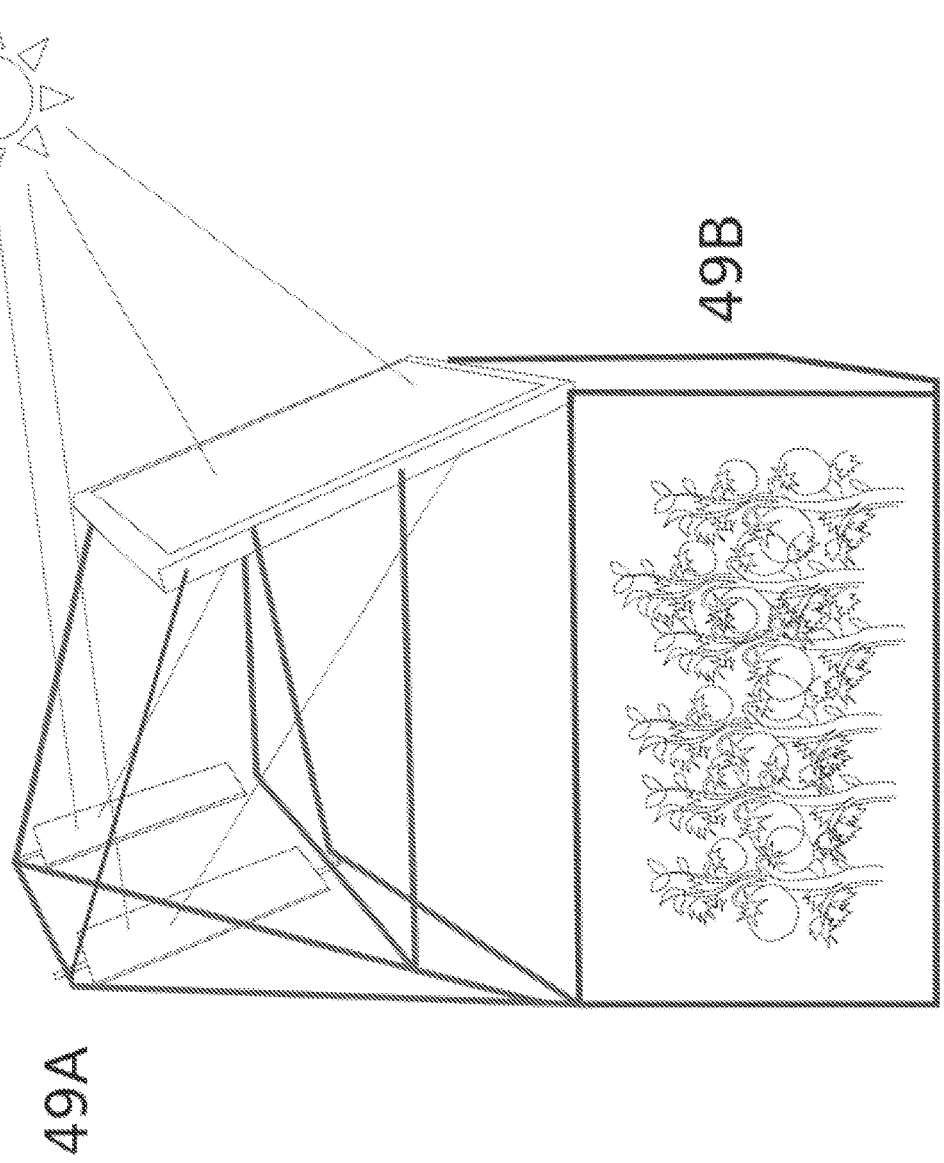

FIG. 49 shows the apparatus for generating electricity from a plurality of solar photo voltaic panels in a rack mounting structure utilizing a mirror tracking apparatus for increased electricity generation in a specific spatial point area.

Figure 50:
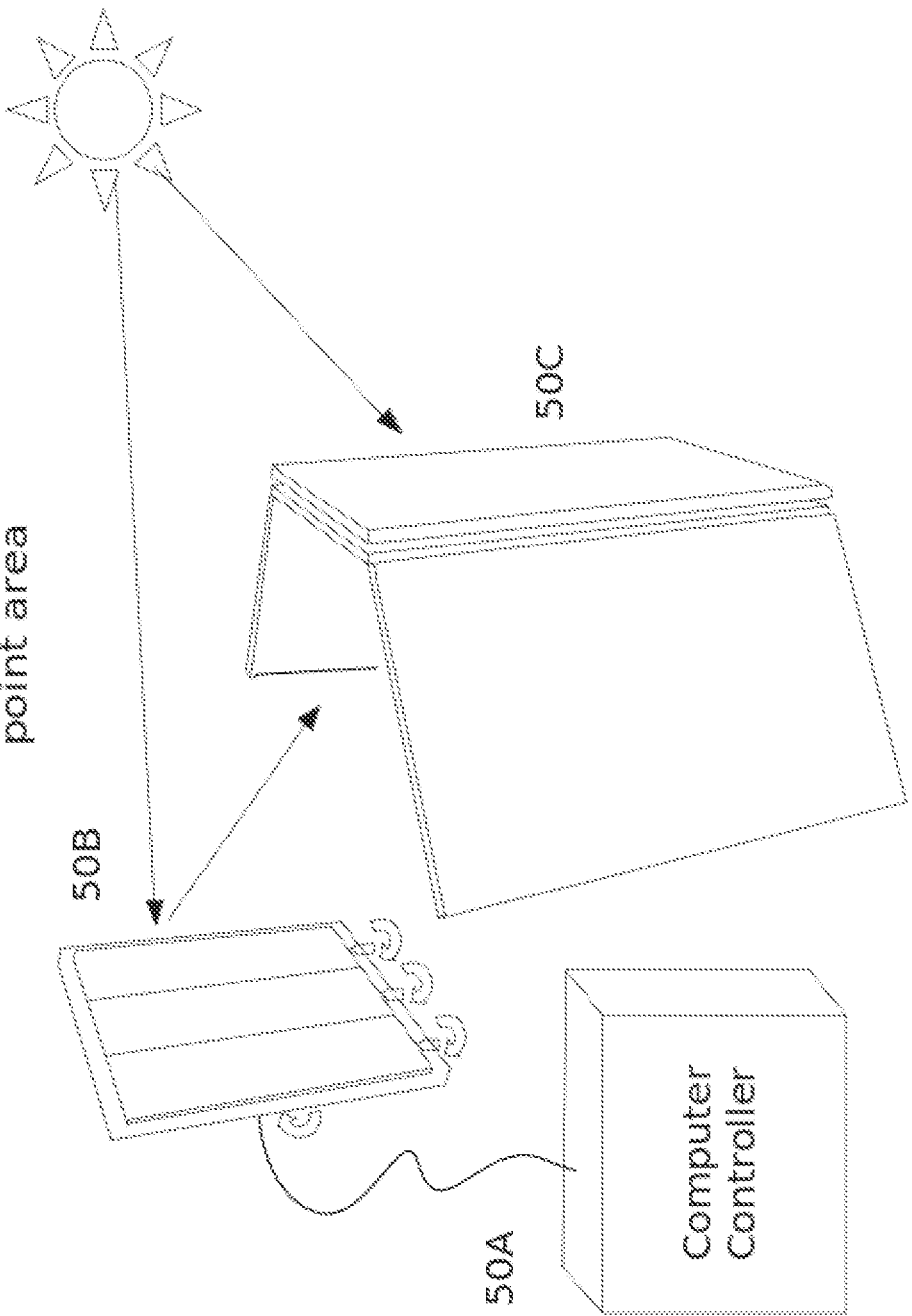

FIG. 50 shows the apparatus for generating electricity from a plurality of solar photo voltaic panels in a rack mounting structure utilizing mirror tracking apparatus for increasing electricity generation in a specific spatial point area utilizing a plurality of solar panels and a plurality of mirrors that can move up and down and can move side to side.

FIG. 51 shows the apparatus for generating electricity from a plurality of solar photo voltaic panels in a rack mounting structure utilizing a mirror tracking apparatus for increasing electricity generation in a specific spatial point area.

FIG. 52 shows Apparatus for Multiple Cell Electricity Generation.

FIG. 53 shows Apparatus for Multiple Cell Electricity Generation.

FIG. 54 shows the apparatus for a Hugelkultur growing bed below plurality of solar panels with square foot agricultural drip irrigation growing cells.

FIG. 55 shows Apparatus for a Hugelkultur growing bed, below plurality of Solar panels with square foot agricultural, drip irrigation growing cells.

FIG. 56 shows the apparatus for a Hugelkultur growing bed below plurality of solar panels with square foot agricultural, and drip irrigation growing cells.

FIG. 57 shows Apparatus for a Hugelkultur growing bed, below a plurality of Solar panels with square foot agricultural, drip irrigation growing cells FIG. 58 shows Apparatus for Air Heating and Cooling with Electricity Generation between a plurality of Solar PV Modules in an above ground and below ground System.

FIG. 59 shows the presented invention apparatus for air heating and cooling with electricity generation between a plurality of solar photo voltaic modules in an above ground and below ground system.

FIG. 60 shows Apparatus for Air Heating and Cooling with Electricity Generation between a plurality of Solar PV Modules in an above ground and below ground System.

FIG. 61 shows Apparatus for Air Heating and Cooling with Electricity Generation between a plurality of Solar PV Modules in an above ground and below ground System.

DETAILED DESCRIPTION OF THE INVENTION

What we are disclosing and presenting here is a Hydro electric generator structured water apparatus with graphene water filtration system which is managed by a plurality of autonomous or manual computer controllers that are programmable with a plurality of magnetic motor generator apparatus in a plurality of computer controlled and accessed thermal and pressure sensors. There is a water vortex creating and water structuring apparatus combined with graphene filtration apparatus and system in the presented apparatus. A graphene water movement electricity generator apparatus and system in a water refill apparatus and system is included also. There's a plurality of air and water pressure valves moving material in a plurality of multiple directions and one way directions. Another aspect is a plurality of computer controller deflector apparatus for controller material flow which is here defined as water, chemical or gaseous materials with a plurality of output irrigation ports out of the apparatus presented here. A plurality of output irrigation ports and input ports are connected to pipes with computer controlled pressure temperature and filtration apparatus. Another aspect is that there is a plurality of output ground water and water tank ports out of the apparatus presented here that are connected to pipes with computer controlled pressure temperature and filtration apparatus all leading into an organic graphene battery storage apparatus and system. In another aspect of the apparatus and invention FIG. 1 shows a pump generator energy storage apparatus and system managed by a plurality of autonomous or met or manual computer controllers that can be programmed for energy creation and water conservation. FIG. 1 also shows egg shaped Hydroelectric generator for structuring water with graphene water filtration system, and electricity generation through fluid turbine piping system. FIG. 1B shows a brush less water electricity generation device apparatus that is another component that has a fluid water Hydro turbine with the rotor turning inside the pipe with an outside stater mounted over the magnetic Hydro water turbine with the positive and negative wire coming out of the AC generator that is a brush less AC generator that is going into the bridge rectifier for conversion to DC electricity which is part of the presented apparatus here. Water flows upward in the system and downward in the system and apparatus presented here. FIG. 1D shows where the water flow is moving upward from the egg shaped lower water tank and is pumped with pressure into FIG. 1B brush less water electricity generation devices that turbine to turn when water flows through them utilizing gravity before each electricity generation to the water turbine generators. 1B also shows where providing the added gravity force from the pump to push the water upward to the next pump the apparatus produces exponentially more electricity as it goes up the tubing system and through the water turbine generators until it reaches the top of the upper tank. All of this makes this small hydroelectric power plant very unique and very powerful in generating electricity especially in the developed world's. It is also very useful in climate change areas all over the world and in the developed world's where droughts are becoming very common lately. We can see in FIG. 1 F2 a schematic utilizing the bridge rectifier in FIG. 1F adding a transformer to be able to increase to higher voltage as part of the apparatus presented here. And on off fluid water valve for redirecting water to drinking water watering plants inside living structures, Swimming pools, saunas, bathing, showers and other useful freshwater uses her defined as agriculture farming and bathing are shown in FIG. 1G. FIG. 1H shows that we have an on-off fluid water valve device for redirecting water to the graphene filtration system tank for water filtration thus reducing minerals and salt promotion water and then used for either freshwater source or irrigation of agricultural fields and growing areas. One thing is important that is included in the present apparatus invention is the ability to pump water back in aquifers after generating electricity FIG. 1K shows fluid or water being pumped for use in agricultural fields and then back to the aquifers for growing plants for pumping through piping in the ground to create cooling systems in the ground temperature which always stays between 40Â° F. and 50Â° F. all year round depending on how close you are to geothermal heat sources. The system needs to have a one-way air pump at the top of the egg shaped fluid storage tank of the hydroelectric structured water electricity generator water storage tank apparatus shown in FIG. 2. This one way or pump keeps the pressure in the egg shaped tank at an optimal level for keeping the system going as shown in FIG. 2B we see the pump system for pumping water from an aquifer River Stream Lake or other water source utilizing a water well, or piping system. Also FIG. 2 a also shows where the water is pumped into the egg shaped water tank of the present invention. All turbines in this presented apparatus invention have stators which are the stationary or rotating part of a rotary system, found in an electric generator where energy flows through a stator to or from the rotating component of the system, outside of the piping system to keep them away from the water in the rotors have built-in water protection on the inside of the pipes we see this in FIG. 2-D shows the egg shaped water storage tank with the orange stators which are the stationary or rotating part of a rotary system, found in an electric generator where energy flows through a stator to or from the rotating component of the system, and the rotor Hydro turbine's aspect of the three turbine generators that turn when water flows through the center of the egg storage tank rotating the water structuring the water as it goes through the oneway valve outback into the tank. In FIG. 2B we see that the water flow inside the egg shaped water tank heads to FIG. 2F water deflectors which is a plate or other attachment for deflecting a flow water to optimal points of the Rotor Hydro turbine for maximum currents creation to get maximum RPM of the Rotor Hydro turbine's in the presented apparatus and system. The outward movement of water for agricultural irrigation utilizing structured water which is in scientific test of shown to grow much but better stronger and healthier plants and have been proven to be very healthy for humans and consumption of water as we see in FIG. 2G in FIG. 2H shows three Hydro turbine generators. Structuring water is a very important aspect of the presented apparatus invention FIG. 2 shows where structured water is formed in a vortex. The water can store memory. Water is been shown to get proper structuring through using a vortex. The air created by the Vortex puts energy back to the water. In structured water grows stronger better plants. We also see that in FIG. 2J is a one-way valve the bills pressure in the egg shaped water storage tank aspect of the presented apparatus invention here. So that all water entering the bottom of the egg shaped tank was strongly to the top of the egg shaped tank. These egg shaped tanks can be above the ground-level or below the ground level for cooling. Another aspect of the invention and apparatus there is included a piping system component which is a another energy electricity generation apparatus that involves graphene coated pipe with a separator top the magnesium metal or when water flows over the two electrodes the anode and cathode then electricity is created and harvested by the graphene coated pipe electrical flow generator. A programmable controller mechanisms included in the presented invention apparatus manage charging the batteries, and distribution of electricity to systems. In another aspect of the invention apparatus there is a component included as shown in FIG. 3 where the pump energy generator storage apparatus with the programmable computer controllers, water storage tanks, water pumps, brush less water turbine electricity generators and it also shows the flow of water through the system. In FIG. 3K is shown where the flow from the egg shaped lower water tank goes to the top of the egg shaped water tank to fill the tank utilizing steps of gravity and low-voltage electronic pumping systems for producing the amount of electricity needed to move fluids from the bottom of the egg shaped lower water tank to the top of the upper tank the egg shaped bottom water tank can be placed in the cooler underground area with temperatures of 40Â° F. to 50Â° F. in the egg shaped under water tank can be placed above ground with temperature variations of −10Â° or lower to to 100Â° F. or higher. This temperature range is very useful in generating electricity, heating, cooling and controlling the flow rates throughout the apparatus presented here. In the apparatus and invention presented here the flow of water or fluid hitting the turbine blade rotor with the magnetic band on the outside of the blades causing the turbine blade rotor to turn inside the pipe as the water or fluid flows to the pipe as seen in FIG. 4F. The revolutions per minute of the turbine blade rotor is determined by the pressure, resistance and flow of water through the piping system. In the apparatus invention presented here FIG. 4B shows the pump generator energy storage Hydro turbine apparatus where all the electronics or outside of the pipe and not affected by water or fluids and the stator which is a stationary or rotating part of a rotary system, found in an electric generator where energy flows through a stator to or from the rotating component of the system, positioned right over the turbine blade rotor with the magnetic circular band that takes the magnetic energy of the rotor in Stater to generate electricity that flows through the FIG. 3B wires to batteries or directly for outside use. FIG. 4E shows positive and negative wires the transport the AC or DC electricity to a battery, an electrical device, or directly into the utility grid. The Alternative Energy Booster Apparatus disclosed has cells built in that have the ability to generate electricity, store electricity, and deliver electricity to inverters, batteries, capacitors, users, the grid and directly or indirectly to useful appliances. A preferred embodiment of the invention is that the Alternative Energy Booster Apparatus is made of organic materials, that are inexpensive to apply, with 3D printing, and the apparatus has a very light weight for it's energy density. Electronic and Mechanical Switching apparatus are included for the purpose of increasing efficiency of the apparatus in creating, transferring and storing electricity. A wall plate that is a core component of the invention works with the Alternative Energy Booster Apparatus providing a 12 volt DC electricity to appliances, and devices inside living or working space. Another aspect of the Alternative Energy Booster Apparatus invention consists of cells in which are a pair of electrodes, one of which is magnesium, covered with layers of graphene and polymers and an electrolyte composed of H2O in a gel electrolyte combined with graphene electrode protected by layers of material which protects it to a great degree from the action of the electrolyte solution. In still another detail of the invention is where an electric cell or battery is electrically combined with a capacitor in each cell, so the capacitor can serve as a buffer for the cell or battery. One object of this invention, therefore, is to provide an electric cell, or battery, with a closely coupled capacitor, to serve as a buffer for the cell or battery, and to provide the energy of the cell, or the battery. This invention relates to a combination solid state battery and capacitor device to serve as a direct current external utilization circuit, with a reduced or eliminated outside energy source. In still a further detail of the invention is related to the Alternative Energy Boost apparatus was to create an inexpensive, easily manufactured energy cell apparatus, from abundant readily available organic materials for the purpose of energy creation for the 1.2 billion people that have never had electricity. A proprietary apparatus, for utilizing additive printing methods to easily manufacture cells, and for creating Multi-Wall carbon nano tubes suspended over multiple graphitic ground electrodes in a gel polymer. The cell apparatus involves combining graphene and other materials in a Van der Waals heterostructure (vdWh) to generate an electric gate control of the spin current and spin lifetime at room temperature, as well as extreme hot and cold temperatures. In the alternative energy boost cells, We are using our proprietary additive manufacturing methods for the purpose of creating electron flow in materials by regulating the spin-polarized electron injection with proprietary spin logic devices for spin injection to graphene to create electron flow, with the least amount of degradation of the metallic electrodes in the apparatus. An extremely important class of oxidation and reduction reactions are used to provide useful potential electrical energy in energy production and storage. A simple organic electrochemical cell combined with unique switching components is utilized from 2 complex layered materials components A & B. In the process of the reaction, electrons are transferred from the Anode to Cathode through an electrically conducting path as a useful electric current. An electrochemical cell is created by placing proprietary special multi-layered material electrodes into an organic gel electrolyte where a chemical reaction generates an electric current. Modules made up of these Voltaic cells generate a consistent electric current that regenerates itself, and the voltage and current dependent upon switching motive apparatus. The Alternative Energy Boost Voltaic Cells are an electrochemical cell which causes external electric current flow using a plurality of specific layered different metals combined with organic materials that differ in their tendency to lose electrons. One material A more readily loses electrons than the other material B, so by placing material component A and material component B in gel electrolyte solutions electrons begin to flow through an external high conductance material which leads from the material A to the material B. As a material A atom provides the electrons, it becomes a positive ion and goes into organic gel electrolyte solution, decreasing the mass of the material A electrode. The Alternative Energy Boost cell technology has special apparatus that dramatically decrease the amount of mass oxidized for the longevity of the cell. On the material B side, the two electrons received allow it to convert a material B ion from solution into an uncharged material B atom which has the unique function of having absolutely no deposits over time on the material B electrode, increasing its mass. Alternative Energy Boost cell technology has a special layering apparatus and manufacturing apparatus technique that dramatically decrease the reduction causing build up of material B electrode for longevity of the cell. Included in each Alternative Energy Boost cell also are energy storage organic plant based multi layered, components from the electrostatic energy domain, sealed in aerobic condition, that raise and stabilize the voltage and current dramatically. There are additional electrons added to the Alternative Energy Boost cell system from these dry materials, dependent on the layering array. Clearly, to get energy from the Alternative Energy Boost cell, you must get more energy released from the oxidation of the material A than it takes to reduce the material B. The cell can yield a finite amount of energy from this process, regulated by the proprietary manufacturing apparatus, and plurality of cells combined can yield a high amount of energy from this process, only limited by the amount of organic material available regenerated, or replaced, combined with the configuration of the spin transistor, and the spin logic applied to the system, in the combined organic material A & B electrodes. In another aspect of the presented apparatus a magnesium layered cathode protects a graphene layered anode, and multiple magnesium cathodes are sacrificed and switched on or off utilizing electronic, mechanical and special coating materials to extend the lifespan. The presented Apparatus has a Virtual Currency payment component, combined with Battery Storage, Electricity Generation, Solar Panel Boost mechanism, Heating and Cooling Apparatus, Water Flow Electricity Generation, Power Switching Generator, Electromagnetic Pulse Protection Mechanism device.

FIG. 1 shows a pump generator energy storage apparatus and system presented here managed by a plurality of autonomous or manual computer controllers that can be programmed for energy creation and water conservation, and also shows egg shape Hydro electric generator for structuring water with graphene water filtration system, and electricity generation through fluid turbine piping system with these key components and functions:

FIG. 1A shows a lower egg shaped tank electricity generation apparatus component for the means of storing water that can be filled from a well or any other water source and can continually create electricity as it structures the fluid or water with the following steps;

FIG. 1A shows where water goes out to a lower area utilizing gravity to create additional force in a combined stepping, and pumping system and apparatus;

FIG. 1B shows a brush less water electricity generation device with fluid water Hydro turbine with the rotor turning inside of the pipe with an outside stater mounted over the magnetic Hydro water turbine with the positive and negative wire coming out of the AC generator going into the bridge rectifier for conversion to DC electricity which is part of the presented apparatus here;

FIG. 1C shows a booster pump that can pump water at any pressure controlled by the programmable computer controller in the presented apparatus here;

FIG. 1C shows the four fluid water turbines that the water has to pass through;

FIG. 1D shows where the water flow is moving upward from the egg shaped lower water tank and is pumped with pressure into for;

FIG. 1B shows brush less water electricity generation devices that have turbines that turn when water flows through them utilizing gravity before each electricity generation through the water turbine generators plus providing the added gravity force from the pump to push the water upward to the next pump, the apparatus produces exponentially more electricity as it goes up the tubing system and through the water turbine generators until it reaches the top of the upper tank;

FIG. 1E shows the upper egg shaped fluid water structuring and electricity generation tank with its input and output port at the top;

FIG. 1F shows where AC electricity generated by the power pump generator energy storage apparatus, hydro water fluid turbine generators is converted into DC electricity utilizing bridge rectifier with transformer and capacitor for smoothing the waveform; The presented apparatus can distribute AC electricity and also DC electricity; The bridge rectifier electronics located inside the programmable computer controller box with battery storage access; The programmable computer controller box has three separate functions; liquid tank programmable computer controller and battery storage; a liquid pump programmable computer controller and battery storage; and a liquid turbine programmable computer controller battery storage plurality of apparatus apparatus, components, devices that work in the apparatus presented here in this invention;

FIG. 1F2 shows a schematic utilizing the bridge rectifier in;

FIG. 1F adding a transformer to be able to increase to higher voltages as part of the apparatus presented here;

FIG. 1G shows an on-off fluid water valve for redirecting water to drinking water, watering plants inside living structures, swimming pools, saunas, bathing, showers, and other useful freshwater uses;

FIG. 1H shows an on-off fluid water valve for redirecting water to the graphene filtration system tank for water filtration, reducing minerals, and then used for either freshwater source, or irrigation of agricultural fields and growing areas;

FIG. 1I shows multiple graphene filtration area inside storage tank;

FIG. 1J shows fluid or water being pumped for use inside facilities, homes, factory, business, private structure;

FIG. 1K shows fluid or water being pumped for use and agricultural fields, back to the aquifers, for growing plants, for pumping through piping in the ground to create cooling systems with the ground temperature between 40Â° F. and 50Â° F. all year round;

FIG. 2 shows Hydro Electric Structured Water Apparatus with these key components and functions;

FIG. 2A shows the one-way air pump at the top of the egg shaped fluid storage tank of the hydroelectric structured water electricity generator and water storage tank apparatus;

FIG. 2B shows the pump's system for pumping water from an aquifer, River, stream, Lake or other water source utilizing a water well, or piping system;

FIG. 2B also shows where the water is pumped into the egg shaped water tank of the presented invention;

FIG. 2C shows where groundwater from well can be pumped and redirected into the egg shaped water tank for storage or running the Hydro water turbine electrical generators while structuring the water the same time;

FIG. 2D shows the egg shaped water storage tank with the orange stators which are the stationary or rotating part of a rotary system, found in an electric generator where energy flows through a stator to or from the rotating component of the system, and the rotor Hydro turbine"s aspect of the three turbine generators that turn when water flows through the center of the egg storage tank rotating the water and structuring the water as it goes through the one-way valve out back into the tank;

FIG. 2E shows water flow inside the egg shaped water tank;

FIG. 2F shows water deflectors, a plate or other attachment for deflecting a flow of water to optimal points of the Rotor Hydro turbine for maximum currents creation to get maximum RPM of the Rotor Hydro turbine's;

FIG. 2G shows the outward movement of water for agricultural irrigation utilizing structured water which in scientific tests have shown to grow better stronger and healthier plants;

FIG. 2H shows the three Hydro turbine generators;

FIG. 2I shows where structured water is formed in a vortex where the water can store magnetic memory, water has been shown to get proper structuring through using a vortex, the air created by the vortex puts energy back into the water, and structured water grows stronger and better plants;

FIG. 2J shows a one-way valve that builds pressure in the egg shaped water storage tank aspect of the presented apparatus invention here, so that all water entering the bottom of the egg shaped tank moves strongly to the top of the egg shaped tank;

FIG. 2K shows a marked line showing the ground-level.

FIG. 2L shows that piping systems included in the presented apparatus invention have an other energy electricity generation apparatus involving graphene coated pipe with a separator on top of magnesium metal where when water flows over the two electrodes the anode and the cathode electricity is created and harvested by the graphene coated pipe electrical flow generator;

FIG. 2M shows another pipe that utilizes the graphene flow electrical generation piping system as a component in the presented apparatus invention here;

FIG. 2N shows also where the output piping systems utilize the graphene flow electrical generation piping system as a component in the presented apparatus and invention here;

FIG. 3 shows the pump generator energy storage apparatus with the programmable computer controllers, water storage tanks, water pumps, brush less water turbine electricity generators, and the flow of water with these key components, steps and functions;

FIG. 3A shows a liquid tank programmable computer controller with battery storage that controls the egg shaped lower water tank and receives electricity generated from the graphene anode and cathode liquid fluid flowing over the materials on the inside or outside of the pipes;

FIG. 3A also shows where the positive and negative wires going from the electricity generation piping system that are positive and negative DC wires;

FIG. 3B shows a brush less water turbine a liquid turbine generator apparatus that is a core component of the apparatus and system presented here, that fits in the piping system that goes from the egg shaped lower water tank to the egg shaped upper water tank and then from the egg shaped upper water tank to the egg shaped lower water tank along the way generating electricity with multiple water turbine electricity generation. The liquid turbine generator apparatus component comprises where the positive and negative electricity wiring and Stator is located outside of the wet water area of the pipe component for protection from water damage and the Rotor is made up of a fan blade connected to a magnetic rotor structure inside the water area of the pipe;

FIG. 3C shows the flow of the water from the bottom of the egg shaped upper water tank to the top of the lower tank;

FIG. 3D shows the liquid pump programmable computer controller with battery storage that controls the pressures of water flow through the liquid turbine generator apparatus, and that controls the egg shaped upper water tank and receives electricity generated from the graphene anode and cathode liquid fluid flowing over the materials on the inside or outside of the pipes;

FIG. 3E shows the egg shaped upper water tank used in the pump generator energy storage apparatus;

FIG. 3F shows the piping system that has a plurality of liquid turbine generator apparatus that water flows through and plurality of liquid pump apparatus for keeping the pressure of the water through the liquid turbine generator apparatus at an optimal level for electricity generation in the presented pump generator energy storage apparatus, the pipes where the liquid fluid actually flows through are made up of plain liquid fluid piping components, PVC, plastic, metal or graphene coated in a layered anode and cathode with separator electricity generation apparatus component in the apparatus presented through flowing liquid fluid in the pipes; FIG. 3F also shows positive and negative DC wires going to the liquid pump programmable computer controller battery storage device;

FIG. 3G shows the brush less electric motor liquid pumping apparatus that uses low amounts of electricity 12 V DC to pump liquid water through all the piping systems of the presented apparatus invention that comprise the positive and negative electricity wiring outside of the wet water area of the component for protection from water damage;

FIG. 3H shows the liquid turbine generator apparatus which Is a core component of the pump generator energy storage apparatus that has a plurality of brush less motor liquid water turbine generators built into a pipe module that can be easily connected to pipes here defined as PVC pipes and non-toxic water drinking pipes that comprise the positive and negative electricity wiring outside of the wet water area of the component for protection from water damage;

FIG. 3I shows where the apparatus presented here is a liquid turbine for fluids programmable computer controller and battery storage device for managing electricity generated from the fluid liquid turbine generator apparatus is in the system and apparatus;

FIG. 3I also shows the battery systems inside the controller box for storing electricity from both the graphene anode cathode layered piping system, and liquid fluid turbine generator apparatus;

FIG. 3I also shows where the plurality of liquid turbine generator apparatus and devices have positive and negative DC current and voltage going into charging the batteries managed by a charge controlling system built into the liquid turbine computer controller battery storage device that is programmable;

FIG. 3J shows where the apparatus presented as a liquid tank programmable computer controller and battery storage apparatus and device with batteries as seen in the diagram and plus and minus wiring DC voltage coming from the graphene layered anode and cathode electricity generation piping system, the liquid tank programmable computer controllers use sensors to determine tank levels, pressures, temperatures, flow rates, weight and control functions for maintaining gravity fed functions in the apparatus presented here;

FIG. 3K shows where the flow from the egg shaped lower water tank goes to the top of the egg shaped upper water tank to fill the tank utilizing steps of gravity and low-voltage electronic pumping systems for producing the amount of electricity needed to move fluids from the bottom of the egg shaped lower water tank to the top of the upper tank, the egg shaped bottom water tank can be placed in the cooler underground area with temperatures of 40Â° F. to 50Â° F. in the egg shaped upper water tank can be placed above ground with temperature variations of −10Â° or lower to 100Â° F. or higher, this temperature range is very useful in generating electricity, heating, cooling, and controlling the flow rates throughout the apparatus presented here;

FIG. 3L shows the egg shaped bottom water tank is part of the pump generator energy storage apparatus that is pumping water utilizing gravity into the piping system first going downward then going upward due to gravity into the liquid pump apparatus device which didn't pumps the water downward again into a plurality of liquid turbine generator apparatus devices and then the water flows back into another pumping device at a higher level until it reaches the top of the egg shaped upper water tank, FIG. 3M for beginning the process utilizing gravity going back down into the lower pump;

FIG. 3L also shows plus and minus DC wiring for current and DC voltage that is generated in the graphene piping system with anodes and cathodes for electricity generation caused by the flowing of fluids over the surface of the anode and cathode to be stored and managed in the liquid turbine computer controller and battery storage unit FIG. 3I; FIG. 3M shows the egg shaped upper water tank that receives the water from the egg shaped lower water tank and also receives electricity from the graphene piping system device and apparatus that has anodes and electrodes and cathodes with separator that generates electricity as the fluids flow over the anodes and cathodes in the presented system and apparatus;

FIG. 3M also shows wires from the graphene piping system device presented in this invention going to the FIG. 2J liquid tank computer controller battery storage unit to transfer electricity for charging batteries and use outside of the system;

FIG. 3N shows the liquid turbine generator apparatus in the vertical position is demonstrated in the flow FIG. 3K of the fluids upward from the egg shaped lower water tank to the egg shaped upper water tank showing where the water or fluid is forced by gravity downward for forcing the fluid into the pumping system to force the water downward combined with gravity and every step to reduce the amount of electricity needed to pump water or fluid from a lower level to a higher level for the best economy in the apparatus presented here;

FIG. 4 shows the Pump Generator Energy Storage Hydro Turbine Apparatus with these key components and functions;

FIG. 4A shows the pump generator energy storage Hydro turbine apparatus that has a turbine blade rotor as part of the electricity generator inside the piping structure that is turned by water or fluid flowing through the pipe, the turbine blade rotor has an outside magnetic circular area so when water passes through the pipe the turbine turns and the magnetic circular area projects magnetism through the plastic piping system are PVC;

FIG. 4B shows the pump generator energy storage hydro turbine apparatus where all the electronics or outside the pipe not affected by water or fluids and a stator is positioned right over the turbine blade rotor with the magnetic circular band that takes the magnetic energy of the rotor in Stator to generate electricity that flows through the FIG. 3E wires to batteries or directly for outside use;

FIG. 4C shows the stator mounted on the outside of the pipe over the turbine blade rotor with the magnetic circular band that is inside the pipe in the water or fluid that is flowing to the pipe;

FIG. 4D shows the turbine blade rotor with the magnetic band on the outside of the blades inside the PVC, plastic, or other material piping system;

FIG. 4E shows positive and negative wires the transport the AC or DC electricity to a battery, an electrical device, or directly into the utility grid;

FIG. 4F shows the flow of water or fluid hitting the turbine blade rotor with the magnetic band on the outside of the blades causing the turbine blade rotor to turn inside the pipe as the water or fluid flows through the pipe, the revolutions per minute of the turbine blade rotor is determined by the pressure, resistance and flow of water through the piping system;

FIG. 5 shows a pump generator energy storage apparatus and system presented here managed by a plurality of autonomous or manual computer controllers that can be programmed for energy creation and water conservation with these key components, steps and functions;

FIG. 5A shows a lower tank for storing water that can be filled from a well or any other water source, further shows where water can go out to a lower area utilizing gravity to create additional force;

FIG. 5B shows a brush less water electricity generation device which is part of the apparatus;

FIG. 5C shows a booster pump that can pump water at any pressure controlled by the programmable computer controller in the presented apparatus here;

FIG. 5D shows where the water flow is moving upward from the lower tank and is pumped with pressure into for FIG. 5B brush less water electricity generation devices that have turbines that turn when water flows through them utilizing gravity before each electricity generation through the water turbine generators plus providing the added gravity force from the pump to push the water upward to the, next pump, the apparatus produces exponentially more electricity as it goes up the tubing system and through the water turbine generators until it reaches the top of the upper tank;

FIG. 5E shows the upper tank with its input port at the top;

FIG. 5F shows where AC electricity generated by the power pump generator energy storage apparatus, Hydro water fluid turbine generators is converted into DC electricity utilizing bridge rectifier with transformer and capacitor for smoothing the waveform, the presented apparatus can distribute AC electricity and also DC electricity. The bridge rectifier electronics located inside the programmable computer controller box with battery storage access;

FIG. 5F2 shows a schematic utilizing the bridge rectifier in FIG. 5F adding a transformer to be able to increase to higher voltages as part of the apparatus presented here, it also shows the pump generator energy storage apparatus with the programmable computer controllers, water storage tanks, water pumps, brush less water turbine electricity generators, and the flow of water, and further shows a liquid tank programmable computer controller with battery storage that controls the lower tank and receives electricity generated from the graphene anode and cathode liquid fluid flowing over the materials on the inside or outside of the pipes.

In FIG. 5F2 also shows the positive and negative wires going from the electricity generation piping system that are positive and negative DC wires, and shows a brush less water turbine a liquid turbine generator apparatus that is a core component of the apparatus and system presented here, that fits in the piping system that goes from the lower tank to the upper tank and then from the upper tank to the lower tank along the way generating electricity with multiple water turbine electricity generation, the liquid turbine generator apparatus component comprises where the positive and negative electricity wiring and stator is located outside of the wet water area of the pipe component for protection from water damage and the rotor is made up of a fan blade connected to a magnetic rotor structure inside the water area of the pipe;

FIG. 5C shows the flow of the water from the bottom of the upper tank to the top of the lower tank.

FIG. 5F shows the liquid pump programmable computer controller with battery storage that controls the pressures of water flow through the liquid turbine generator apparatus, and that controls the upper tank and receives electricity generated from the graphene anode and cathode liquid fluid flowing over the materials on the inside or outside of the pipes.

FIG. 5E shows the upper water tank used in the pump generator energy storage apparatus;

FIG. 5D shows the piping system that has a plurality of liquid turbine generator apparatus that water flows through and plurality of liquid pump apparatus for keeping the pressure of the water through the liquid turbine generator apparatus at an optimal level for electricity generation in the presented pump generator energy storage apparatus, the pipes where the liquid fluid actually flows through are made up of plain liquid fluid piping components, PVC, plastic, metal or graphene coated in a layered anode and cathode with separator electricity generation apparatus component in the apparatus presented through flowing liquid fluid in the pipes. FIG. 5F also shows positive and negative DC wires going to the liquid pump programmable computer controller battery storage device;

FIG. 5G shows the brush less electric motor liquid pumping apparatus that uses low amounts of electricity 12 V DC to pump liquid water through all the piping systems of the presented apparatus invention that comprise the positive and negative electricity wiring outside of the wet water area of the component for protection from water damage;

FIG. 6 Describes structural aspects functions and processes of the Alternative Energy Booster Apparatus Switching System for the individual Shutoff of Cells, the Modifying Polarity and the Switching of Circuits from Parallel to Series Connection with these key components and functions;

FIG. 6A The function of a plurality of computer controlled switching devices in each cell that can Switch Between a plurality of Rechargeable Storage Devices Super capacitors, Ultra capacitors or batteries;

FIG. 6B The function of a plurality of computer controlled switching devices in each cell that can Switch to Series or Parallel connections of Cells;

FIG. 6C The function where each Switch has the apparatus wiring and logic of a computer controller that can change the Polarity+−Connection of Cell and Storage devices such as batteries to Series or Parallel connections;

FIG. 6D The function where each Switch can Switch Off or Override each cell in Connection and Storage devices such as batteries;

FIG. 6E The function where a programmable controller can utilize the DC Mechanical Switch, Electrode Dipper, and Electrolyte Pump in the apparatus;

FIG. 7 Describes component aspects functions and processes of the Alternative Energy Booster Apparatus Electricity Generation and Energy Storage Capacitor Area with these key components and functions;

FIG. 7A A a component of a Plurality of + or − computer programmable polarity Cell Busbar Connection Circuits with wiring on each side of the cells controlled, and connected to switches;

FIG. 7B The function structural aspect of computer programmable and controlled Switchable Electricity Storage In each individual cell;

FIG. 7C The function where a programmable controller can utilize the DC Mechanical Switch, Electrode Dipper, and Electrolyte Pump in the apparatus;

FIG. 8 Describes structural and component aspects, functions and processes of the Alternative Energy Booster Apparatus Switching System for Shutoff of Cells and Modifying Polarity with these key components, steps and functions;

FIG. 8A Switching System for the individual Shutoff of Cells, the Modifying Polarity and the Switching of Circuits from Parallel to Series Connection with these key functions; The Function of Electricity Generation in each cell, where the bottom area of the cell generates electricity, and transfers, the energy to the capacitor where it is sent for use; The Function where the generation apparatus recovers the capacitors provide energy to smooth out the circuit; The Function available where any time a DC voltage tries to change (big current surge in a chip bringing the levels down momentarily, etc), the capacitor will help oppose that change; A stabilizing function provided so if any cell fails/ malfunctions, or drops below a certain voltage, the capacitors will discharge and maintain the voltage, allowing some time for the Generator to recover;

FIG. 8B The function where a programmable controller can utilize the DC Mechanical Switch, Electrode Dipper, and Electrolyte Pump in the apparatus;

FIG. 9 Describes structural, material and component aspects, functions and processes of the Alternative Energy Booster Apparatus Switching System for the individual Shutoff of Cells, the Modifying Polarity and the Switching of Circuits from Parallel to Series Connection with these key functions and components;

FIG. 9A A plurality of Software Controlled Switching apparatus;

FIG. 9B An Anode, or plurality of Anodes;

FIG. 9C An Electrolyte material consisting of one or more Wet/Dry/Gel electrolytes, /Dry polymer electrolyte, /Solid ceramic electrolyte, /Organic ionic plastic crystals, or H20;

FIG. 9D A plurality of Electrical Storage devices;

FIG. 9E A Cathode or plurality of Cathodes;

FIG. 9F The function where a programmable controller can utilize the DC Mechanical Switch, Electrode Dipper, and Electrolyte Pump in the apparatus;

FIG. 10 Describes flow, functions and processes of the Alternative Energy Booster Apparatus Switching System Flow for Shutoff of Cells Rerouting and/or Switching to bring additional Voltage and current into the Circuit with these key functions and components;

FIG. 10A-10B Describes flow, functions and processes of the Alternative Energy Booster Apparatus Switching System for the individual Shutoff of Cells, the Modifying Polarity and the Switching of Circuits from Parallel to Series Connection and Voltage drop in Booster Apparatus where the rerouting of electricity can be done, and/or additional energy can be added into the circuit to bring additional Voltage and Current into the Circuit;

FIG. 10C The function where a programmable controller can utilize the DC Mechanical Switch, Electrode Dipper, and Electrolyte Pump in the apparatus;

FIG. 11 Shows diagrams of the Alternative Energy Booster Apparatus Switching System for the individual Shutoff of Cells, the Modifying Polarity and the Switching of Circuits from Parallel to Series Connection and Voltage drop in Booster Apparatus where the rerouting of electricity can be done, and/or additional energy can be added into the circuit to bring additional Voltage and Current into the Circuit with these key components and functions;

FIG. 11A-11D shows the process of how a bad cell gets switched off and overridden so as to not create resistance in the circuit. And where a group of cells can be switched from parallel to a series connection when necessary.

FIG. 11E shows the function where a programmable controller can utilize the DC Mechanical Switch, Electrode Dipper, and Electrolyte Pump in the apparatus;

FIG. 12 Shows diagrams of the Alternative Energy Booster Apparatus Case Apparatus Assembly with Cathode and Anode Built into 3D Additive Printed and Manufactured Structure of the Booster Apparatus with these key components, steps and functions;

FIG. 12A Describes where an outer coating on outside of case is a patterned Graphene grid creating a Faraday cage built into the case for protection from (EMP) Electromagnetic Pulse damage;

FIG. 12B Shows how the top part of the case has a series of Cathodes built in;

FIG. 12C Shows how the bottom part of the case has a series of Anodes built in;

FIG. 12D Shows location and size of the Generator Cells in the case of the apparatus;

FIG. 13 Shows diagrams of the Alternative Energy Booster Apparatus 3D Printed Case with Layers of Materials to Create Anode and Cathode of the Booster Apparatus with these key components and functions;

FIG. 13A-13B And further describes the Anode and Cathode apparatus case, where the surfaces of the apparatus are created utilizing additive 3D printing processes, to create conductive surfaces. The purpose of manufacturing in this way, with this method reduces the assembly, and cost of manufacturing the Booster Apparatus;

FIG. 13C And still further describes where a separator goes between the Cathode and Anode, and screws are used to attach Anode to Cathode;

FIG. 14 Shows diagrams of the Alternative Energy Booster Apparatus Switching System for Shutoff and Programmable Software Controlled Management of Electricity Storage Apparatus and Modifying Polarity with these key components, steps and functions;

FIG. 14A-14D further describes how switching In Electricity Storage batteries, super capacitor, or ultra capacitor can Switch Polarity to Parallel Connection of Electricity Storage, and Switch Polarity to Series Connection of Electricity Storage;

FIG. 14E shows the function where a programmable controller can utilize the DC Mechanical Switch, Electrode Dipper, and Electrolyte Pump in the apparatus;

FIG. 15 Shows diagrams of the Alternative Energy Booster Apparatus Switching System for Shutoff and Programmable Software Controlled Management of Electricity Generation, Use and Storage Apparatus with these key components, steps and functions;

FIG. 15B On Off Switching System for Shutoff and Programmable Software Controlled Management of Electricity Generation, Use and Storage Apparatus;

FIG. 15C programmable controller controls a plurality of these components in;

FIG. 15A-15F Programmable Controller; Direct DC Appliance Use; Direct AC Appliance Use;

FIG. 15E DC Electricity Storage Batteries, Super Capacitors, Ultra Capacitors; DC Electricity Generation Apparatus, Solar Panel, AC Grid Input/Output; Inverter;

FIG. 15G-15I where the Alternative Energy Booster Apparatus Controller is programmed to continuously check voltages and currents and directs, switches on and off for the purpose of adding electricity to any device that has a low voltage or current, for the best efficiency and use, additionally the controller also has a programmable function to change polarity, switch between electricity storage devices, and manage appliance apparatus FIG. 15H the Controller has programmable function for adding electricity from generator to the inverter when the grid, solar panels, or generators stop working due to clouds, night time or grid generation failure;

FIG. 15G the Controller also has a programmable function to be able to reroute appliances to available plurality of electricity generation apparatus and devices, and furthermore has programmable functions to recharge batteries, and redirect available electricity generation to and from the battery or other storage devices, and still further these conversion and switching functions; DC to AC conversion; AC to DC conversion; On/Off Switching Programmable Controller; USB-C PDAware Wall Plate and appliance connectors; Direct DC Appliance Use;

FIG. 16 Shows diagrams of the Alternative Energy Booster Apparatus DC Electricity Generation Apparatus Booster Cell with these components and functions; DC Electricity Generation Apparatus; Layered and Surface Graphene Coated Electrodes;

FIG. 16A Anode Layered Graphene Coated Surface;

FIG. 16B Cathode Layered one or a combination of all including; Mg, Aluminum, Copper, or Zinc Coated Surface;

FIG. 16C Electrolyte, utilizing one or a combination of all including H20, Gel Polymer; Organic Seaweed, Chlorophyll, Diatomateous Earth, graphite or green plant leaves;

FIG. 17 Shows diagrams of the Alternative Energy Booster Apparatus DC Electricity USB-C PDAware Wall Adaptor apparatus with the following components and functions;

FIG. 17A Wall plate with USB-C PD Aware Plugin Sockets;

FIG. 17B A plurality of USB-C PD Aware Power Delivery wall jacks that are able to pull +12 v from a USB power source assuming the device is telling the power source that it is ready to receive the +12 v;

FIG. 18 Shows diagrams of the Alternative Energy Booster Apparatus and other DC Electricity Sources for 12 volt or higher DC Electricity transferal to USBC PDAware Wall Adaptor apparatus with following components and functions;

FIG. 18D Wall plate with USB-C PD Aware Plugin Sockets; FIG. 18E Functions for USB-C PDAware Direct DC Appliance Use;

FIG. 18B-18C A function where it can be used with DC Electricity Generation Apparatus, Solar Panel, Battery, and other Generation and Storage Devices;

FIG. 18A Alternative Energy Booster Apparatus Connected Directly or indirectly through controller to USB-C PDAware Wall Plate;

FIG. 19 Shows diagrams of the Alternative Energy Booster Apparatus and other DC Electricity Sources with the Electrolyte Pumping Apparatus for Plurality of Cells with Electrode Cell Casings, and Programmable Controller for Electrolyte Delivery with these key components and functions;

FIG. 19A shows where the Electrolyte output tubes used for when old electrolyte is removed from the system;

FIG. 19B shows where the Electrolyte input tubes used for when new electrolyte is injected into the system;

FIG. 19C shows +Anode cell casings which are separate cells bottom view;

FIG. 19D shows the function where a programmable controller can utilize the DC Mechanical Switch, Electrode Dipper, and Electrolyte Pump in the apparatus;

FIG. 20 Shows diagrams of the Alternative Energy Booster Apparatus and other DC Electricity Sources with the Top View of Multiple Cells in Apparatus Showing Electrodes with these key components and functions;

FIG. 20A shows top view of the electrolyte cell container showing the plurality of −Cathodes;

FIG. 20B shows top view of the electrolyte cell container showing the +Anode graphene casing;

FIG. 20C shows top view of the electrolyte cell container showing the injection tubes inside the +Anode graphene casing;

FIG. 21 Shows diagrams of the Alternative Energy Booster Apparatus and other DC Electricity Sources with the Expanded View of Cell Array of the Apparatus and Functions with these key functions;

FIG. 21A Expanded viewpoint of the Alternative Energy Boost cell array input for electrolyte tubing;

FIG. 21B Showing an array of 16 cells For a potential 32 or more volts, potential energy generation, the cells demonstrate where each cell has 3 cathodes, with one single anode casing for the purpose of extending the useful life of the cell array;

FIG. 22 Shows diagrams of the Alternative Energy Booster Apparatus and other DC Electricity Sources with the Placement of Input and Output Electrolyte Delivery Apparatus Describing Disbursal and Refurbishment with Pump in System with these key components and functions;

FIG. 22A. Shows electrolyte output tube from top view;

FIG. 22B Shows electrolyte input tube from top view; And describes The placement of the input tubes at the top of the cell, provides New Electrolyte disbursal And refurbishment of the electronic cells from the top to the bottom so that the pump can Create suction at the bottom, and pressurized Flow of gel or liquid electrolyte through the top tubes, And also further describes the purpose of the electrolyte injection apparatus is to keep the electrolyte fresh and at the right density, and in a solid state of gel polymer for maximum energy Creation, Transferal of electrons, and protection of the electrode materials in the presented apparatus, and still further describes where all of these functions with the ability to manage the Pumping and refurbishment of the apparatus cell Remotely utilizing a programmable controller for Electronic management of the mechanism in the Apparatus;

FIG. 22C describes the New Electrolyte storage and pumping apparatus;

FIG. 22D describes the Used Electrolyte storage and pumping apparatus;

FIG. 23 Shows diagrams of the Alternative Energy Booster Apparatus and other DC Electricity Sources with the Sacrificial Electrode Stack with Timer Acrylic Polymer Coating Apparatus with these key components, steps and functions;

FIG. 23A Shows Non Conductive case cover for all the −cathode Electrodes embedded in Acrylic conductive polymer;

FIG. 23B Shows Multiple Plurality Of −cathode electrode connector as one is sacrificed The next one continues to create electrons;

FIG. 23C Shows Plurality of cathode Electrodes spaced apart And embedded in acrylic Polymer that is conductive As a protective barrier to corrosion;

FIG. 23D Shows Acrylic polymer timer Barrier between embedded-Cathodes to extend the Life of the cell;

FIG. 23E Shows Graphene+Anode;

FIG. 23F Shows Timer acrylic conductive polymer coatings are applied where one coating makes the electrode last for 2 months, and there by applying Multiple coatings Multiplies and extends The life span of the cell in the apparatus here presented, having a plurality of electrodes provides the benefit to the Alternative Energy Boost Apparatus by utilizing multiple Sacrificial Electrodes, there by providing a longer useful life of the cell, before any regeneration takes place, in the presented Apparatus and System Sacrificial Anodes and Cathodes are used to reduce corrosion of key important electrodes, to extend the life and efficiency of the presented Apparatus;

FIG. 24 Shows diagrams of the Alternative Energy Booster Apparatus and other DC Electricity Sources with the Top View of Cathode Assembly in the Apparatus with Plurality of Cathodes with these key components, steps and functions;

FIG. 24A Shows the Cathode Electrode connector;

FIG. 24B Shows Non Conductive Case can be submerged into dry, gel or liquid electrolyte;

FIG. 24C Shows A plurality of cathodes embedded in protective coating that dissolves over a period of time, Programmed by the Thickness of the coating;

FIG. 24D Shows Acrylic polymer coating that Dissolves over a period of time Delaying the corrosion of the cathodes;

FIG. 24E Shows Layered Graphene Anode Creating a larger surface area for storage and transferal of more electrons;

FIG. 25 Shows diagrams of the Alternative Energy Booster Apparatus and other DC Electricity Sources with the Dual Cell Configuration of Low Density and High Density Electrolyte with these key components, steps and functions;

FIG. 25A Shows Dual Cell With Low density Light Electrolyte for Faster voltage transferal;

FIG. 25B Shows Dual Cell With Low density Light Electrolyte for Faster voltage transferal;

FIG. 25C Shows Dual Cell With High density Graphene Dark Electrolyte for Greater current Storage and transferal;

FIG. 25D Shows 2 Dual Cells With High density Graphene Dark Electrolyte for Greater current Storage and transferal When the light gel electrolyte and dark gel separate cells are connected in parallel configuration, and then connected in series for use, there is greater voltage and current provided to the apparatus in this presented invention;

FIG. 26 Shows diagrams of the Alternative Energy Booster Apparatus and other DC Electricity Sources with the Plurality Layers Alternate Utility Grade Cell in Apparatus with these key components, steps and functions;

FIG. 26A Shows Cell Case Cover;

FIG. 26B Shows Graphene Layered Anode Electrode Connected to Anode Connector;

FIG. 26C Shows Anode Connector;

FIG. 26D Shows Graphene Layer Connected to Anode Connector;

FIG. 26E Shows Leaf Chlorophyll Cellulose Separator;

FIG. 26F Shows Graphene Layer Connected to Anode Connector;

FIG. 26G Shows Leaf Chlorophyll Cellulose Separator;

FIG. 26H Shows Graphene Layer Connected to Anode Connector;

FIG. 26I Shows Multiple Cathode Connector;

FIG. 26J Shows Multiple Cathodes Embedded and encased in timer acrylic polymer Coatings that work with or with out the Switching Dipping Apparatus which increases the voltage, current and the life of The cell in the apparatus;

FIG. 26K Shows Multiple cathodes Continually Dipped in and out of the Electrolyte For increased And current Output Up and Down path in and out of the electrolyte;

FIG. 26L Shows Electrolyte inside+Anode case where all of the components are submerged partly in electrolyte;

FIG. 27 Shows diagrams of the Alternative Energy Booster Apparatus and other DC Electricity Sources with the Mechanical Generators Alternative Energy Apparatus Boost, Backup, Storage Components with these key components, steps and functions;

FIG. 27A Shows DC Battery;

FIG. 27B Shows Plurality of DC Motors;

FIG. 27C Shows DC Motor;

FIG. 27D Shows All motors connected together on same shaft So that single DC Motor Can turn all other motors Generating Electricity DC Motor;

FIG. 27E Shows DC Motor;

FIG. 27F Shows DC Battery to power the main driving motor;

FIG. 27G Shows Induction motor, brush less AC motor generating AC Current or synchronized plurality of AC Induction brush less motors;

FIG. 27H Shows AC Storage Synchronized with grid, or direct to AC Appliances;

FIG. 27I Shows Immediate Use in Boost To Solar Panels at night or Plurality of batteries or Super capacitor storage;

FIG. 27J Shows Induction Motor brush less AC motor generating AC current or synchronized plurality of AC induction brush less motors;

FIG. 28 Shows diagrams of the Alternative Energy Booster Apparatus and other DC Electricity Sources with the Electro Mechanical Dipper Switching System for Switching Off and On Electrodes Within Cells in Presented Apparatus with these key components, steps and functions;

FIG. 28A Shows Electrode–Cathode Electromechanically dipped in and out of the electrolyte connector;

FIG. 28B Shows Plurality of Electrodes–Cathodes Electromechanically dipped in and out of the electrolyte connector;

FIG. 28C Shows Apparatus Casing Battery Super Capacitor;

FIG. 28D Shows Low energy DC Motor Speed Managed By programmable controller;

FIG. 28E Shows Gel polymer Electrolyte;

FIG. 28F Shows the function where a programmable controller can utilize the DC Mechanical Switch, Electrode Dipper, and Electrolyte Pump in the apparatus;

FIG. 28G Shows Cell Casing+Anode Electrode;

FIG. 29 Shows diagrams of the Alternative Energy Booster Apparatus and other DC Electricity Sources with the Sacrificial Anode Cathode Layered Timer Electrodes with these key components, steps and functions;

FIG. 29A Shows End of cell with Plurality of sacrificial cathodes and single outside of cell connector;

FIG. 29B Shows Cell top connector Plurality of sacrificial Cathodes for Connecting Multiple cells in parallel or series configurations;

FIG. 29C Shows Multiple cathodes Embedded in timer Coatings, sacrificial One at a time For extended life Of the cell apparatus;

FIG. 30 Shows diagrams of the Alternative Energy Booster Apparatus and other DC Electricity Sources with the Electro Mechanical Dipper Switching System for Switching Off and On Cells in Apparatus with these key components, steps and functions;

FIG. 30A Shows Connector Rods to Plurality of –Cathodes In Apparatus cells;

FIG. 30B Shows Low voltage DC Motors Controlled by programmable;

FIG. 30C Shows Line shows that a plurality of cells can be Linked together in Parallel and series;

FIG. 30D Shows Low voltage DC Motor;

FIG. 30E Shows Motor shaft that Stays in center;

FIG. 30F Shows Casing has rechargeable Batteries, and super capacitors for backup, storage and night time use;

FIG. 30G Shows Wheel lifters Mechanically Adjusted for proper Dipping and lifting;

FIG. 30H Shows Wheel lifters have adjustable off center shaft holes;

FIG. 30I Shows the function where a programmable controller can utilize the DC Mechanical Switch, Electrode Dipper, and Electrolyte Pump in the apparatus;

FIG. 31 Shows diagrams of the Alternative Energy Booster Apparatus and other DC Electricity Sources with the Electro Mechanical Dipping Switching System for Switching Off and On Cells in Apparatus with these key functions;

FIG. 31A Shows Base of Apparatus Cell area is used For battery storage, Super capacitor storage, And gel polymer used Or new for refurbishing The electrolyte in the presented apparatus;

FIG. 31B Shows the function where a programmable controller can utilize the DC Mechanical Switch, Electrode Dipper, and Electrolyte Pump in the apparatus;

FIG. 32 Shows diagrams of the Alternative Energy Booster Apparatus and other DC Electricity Sources with the Wireless Electrical Transferal Component of the Apparatus with these key components, steps and functions;

FIG. 32A Shows Programmable Electronic controller;

FIG. 32B Shows Electricity source to be transmitted;

FIG. 32C Shows Multiple low Energy lasers;

FIG. 32D Shows Photo Voltaic Cell receiver;

FIG. 32E Shows programmable electronic Controller;

FIG. 32F Shows Wall Panel Jack for use in appliances;

FIG. 32G Shows Battery or Super Capacitors for storage;

FIG. 32H Shows Appliances for use;

FIG. 32I Shows mechanical generator for creating more electricity;

FIG. 33 Shows diagrams of the Alternative Energy Booster Apparatus and other DC Electricity Sources with the Mobile Phone Payment System Connected to mechanically and electronically Shutting off of Cells, Modifying Polarity and reducing energy output of the Solar Panel Boost Apparatus with these key components, steps and functions;

FIG. 33A Shows Mobile Phone Connected to the Internet;

FIG. 33B Shows Solar Panel (Alternative Energy) Boost Apparatus;

FIG. 33C Shows Mechanical Electrode Switching;

FIG. 33D Shows Electronic Electrode Switching;

FIG. 33E Shows Electronic controller;

FIG. 33F Shows Solar panel Electricity Generation;

FIG. 33G Shows Magnetic motor electricity generation;

FIG. 33H Shows Wireless Laser Electricity transferal;

FIG. 33I Shows Super Capacitor storage;

FIG. 33J Shows battery storage;

FIG. 33K Shows Mechanical Generators alternative energy apparatus components;

FIG. 33L Shows Wireless Electrical transferal apparatus;

FIG. 33M Shows switching apparatus used for payments;

FIG. 33N Shows dipping switching apparatus used in payments and the function where a programmable controller can utilize the DC Mechanical Switch, Electrode Dipper, and Electrolyte Pump in the apparatus to control payments;

FIG. 34 Shows diagrams of the Alternative Energy Booster Apparatus and other DC Electricity Sources with the Switching System for Shutoff of Cells and Modifying Polarity and Backing up Electricity, Storage of Electricity and Night Time Use Of Electricity with these key components, steps and functions;

FIG. 34A Shows Programmable Controller manages the LTC3350 Backup And storage apparatus Component in the Apparatus presented;

FIG. 34B Shows the function where a programmable controller can utilize the DC Mechanical Switch, Electrode Dipper, and Electrolyte Pump in the apparatus;

FIG. 34C shows where Super Capacitors can be connected at this component area to a Programmable Blockchain as an additional Security or Payment Apparatus in the apparatus presented;

FIG. 35 Shows diagrams of the Alternative Energy Booster Apparatus and other DC Electricity Sources with the Switching System for Shutoff of Cells and Modifying Polarity and Backing up Electricity, Storage of Electricity and Night Time Use Of Electricity with these key components, steps and functions;

FIG. 35A Shows Programmable Controller manages the LTC3350 Backup And storage apparatus Component in the Apparatus presented;

FIG. 35B Shows the function where a programmable controller can utilize the DC Mechanical Switch, Electrode Dipper, and Electrolyte Pump in the apparatus;

FIG. 35C shows where Super Capacitors can be connected at this component area to a Programmable Blockchain as an additional Security or Payment Apparatus in the apparatus presented;

FIG. 36 Shows diagrams of the Alternative Energy Booster Apparatus and other DC Electricity Sources with the Low Cost 4 Cell Switching System 6 to 8 volts with Autonomous Layered Cathode Apparatus with these key components, steps and functions;

FIG. 36A Shows Spring Loaded Layered Cathode Applying pressure into the electrolyte gel polymer;

FIG. 36B Shows Multiple Electrodes Coated in timer polymer When degraded new electrode material is pushed down into the Electrolyte For continuous electricity generation;

FIG. 36C Shows Cover for the 4 cell array And the cathodes under spring pressure;

FIG. 36D Shows Electrolyte+anode Casing with insulated step to apply pressure to cathode;

FIG. 36E Shows Insulated bottom casing;

FIG. 36F Shows Measurement of ¾ inch Square cell size with 10,000 cell capacity In 24 inches by 48 inch by 1 inch high space;

FIG. 37 Shows diagrams of the Alternative Energy Booster Apparatus and other DC Electricity Sources with the Potential Energy Switching System for the Capture of Maximum Energy in Apparatus with these key components, steps and functions;

FIG. 37A Shows Graph showing the initial 3 to 5 second pulse of energy created by The apparatus cell structure;

FIG. 37B Shows Graph showing the settle down Energy equilibrium in the apparatus Cell structure;

FIG. 37C Shows The dipping switching apparatus Which is a core component of the presented apparatus captures The first 2 to 5 seconds of energy And stores it in Super capacitors, Storage devices, utilizes it Continually 24 hours a day, and increases the lifespan, and energy In the presented apparatus; and further shows where the Voltage meter readings of the presented alternative energy apparatus cells showing where the cell in the first 3 to 5 seconds has a higher energy potential;

FIG. 38 Shows infrared electricity generation apparatus, utilizing Anode cathode and graphene chlorophyll solution where the temperature increases generation with these key components, steps and functions; In FIG. 39 of the apparatus for splitting virtual currency mining payoff rewards with nonprofit, profit and poverty individuals through donations we show with these key components, steps and functions; In FIG. 39A an ASIC mining apparatus processing shot 256 hashing problems to mine new Bitcoin's; FIG. 39B we see where the ASIC minor discovers a valid block added to block chain and gets a payoff of a coin amount (X) which is the amount of the block chain reward programmed into the crypto coin Genesis block for reward to minors when they discover a block of crypto virtual currency coins;

In FIG. 39C we show where the (X) amount of awarded reward and pay off for discovering a block of the crypto coin is split into the (Y) amount of crypto virtual currency coins and the (Z) amount of crypto virtual currency coins;

FIG. 39C shows that the split amount of one direction is the miner digital virtual currency coin storage wallet for block reward and; Then FIG. 39D shows that the split amount of the other direction is the nonprofit donation pool fund digital virtual currency coin storage wallet for block reward, then as the process continues in the invention and apparatus presented here we see where; In FIG. 39E we have five split offs of the crypto coin from the nonprofit donation pool fund digital virtual currency coin storage wallet for block reward, each of these five different split offs proceed to go to four different donation wallets; As seen in FIG. 39F, and one poverty individual donation digital virtual currency coin storage wallet E, the last wallet the E wallet is used for donations to actual poverty individuals for their contribution of proof of work utilizing a mobile app by the invention apparatus and processes presented here this invention;

FIG. 39G shows the programmable logic controller PLC that continuously monitors the state of input devices and makes decisions based upon a custom program to continue to state of output devices, the biggest benefit in using a PLC apparatus is the ability to change and replicate the operation or process while collecting and communicating vital information, this programmable logic controller handles the distribution of divided and split crypto currencies and coin to different wallet addresses; In FIG. 39H we see where the programmable logic controller and processes has delivered coins to wallets of individuals who are mining crypto currency coins, and; In FIG. 39I we see where a large group of poverty recipients are having their coins delivered from the poverty individual donation digital virtual currency coin storage wallet E;

FIG. 39J and FIG. 39K shows the movement of crypto coin currency being moved into the appropriate wallets, and state where the more minors a virtual digital currency coins mine coins the more people in poverty and nonprofit foundations benefit from donations because of the invention, apparatus and process presented herein disclosed;

FIG. 40 shows Apparatus for Splitting Virtual Currency Mining Payoff Rewards with Non Profit, For Profit and Poverty Individuals Through Donations with these key components, steps and functions;

FIG. 40A of the presented invention, apparatus and process shows a different splitting of the block reward during the block peer-to-peer acceptance aspect of block chain virtual crypto currencies;

FIG. 40B shows where the minor discovers a valid block and gets the block added to the block chain after peer-to-peer approval and gets payoff of a certain amount of crypto virtual currency coins, it also shows where the apparatus and process utilizing the PLC apparatus divides the original block reward into two or a plurality amount of crypto coins and then in;

FIG. 40C and FIG. 40D deposits them into is to totally separate and totally separately owned crypto currency coin wallets one deposited in FIG. 40C which is the minors actual digital virtual currency coin storage wallet for block reward;

FIG. 40D an actual deposit into a venture investment pool fund digital virtual currency coin storage wallet for block reward. The venture investment pool fund digital virtual currency coin storage wallet for block reward can be used for investments into small businesses, businesses corporations, venture-capital funds, venture-capital purposes;

FIG. 40E we show five different additional wallets that take the FIG. 40D venture investment pool fund digital virtual currency coin storage wallet for block reward and divide the funds in that account electronic digital crypto coin wallet into a venture fund wallet, investment fund wallet, a small business investment fund wallet, an education and school fund wallet as well at the same time depositing a portion of the venture investment pool fund digital virtual Currency coin storage wallet for block reward into the poverty individual donation digital virtual currency coin storage wallet for actual donations and payoffs for proof of work from poverty individuals around the world, as of the disclosure of this invention the amount of people living in poverty on the planet Earth was 3.5 billion people, again we show where the more minors of virtual digital currency coins mine the crypto currency the more people in poverty and businesses benefit from donations or investment;

FIG. 41 shows Apparatus for Splitting Virtual Currency Mining Payoff Rewards with Non Profit and Poverty Individuals Through Donations with these key components, steps and functions;

FIG. 41B show the same processes splitting the main block reward earned by miners into separate useful wallets for the purpose of creating funding sources for goodwill and to fund businesses and nonprofits;

FIG. 41A we see where teachers receive crypto coin currency that is useful in their wallets;

FIG. 41G we see where poverty individuals or any individuals in the world receive crypto virtual Currency coins in their wallets for proof of work in taking pictures and submitting them to the system;

FIG. 41H we see people in poverty, people with mobile phones, or the general population being able to earn additional crypto currency coins from the fund wallet for making videos and uploading them to the system as proof of work;

FIG. 42 shows Apparatus for Splitting Virtual Currency Mining Payoff Rewards with Non Profit and Poverty Individuals Through Donations with these key components, steps and functions;

FIG. 42B we show the same apparatuses and processes as FIG. 39B and we have shown:

FIG. 42A where an artist can have a wallet connected to the system or a series of artists can be funded by payouts from the investment pool fund digital virtual currency coin storage wallet for block reward in the splitting of payments in the system between different wallets;

FIG. 42G we see where a woman from an un-privileged area, in poverty can use her computer, mobile phone to submit stories as proof of work to receive crypto virtual currency coins as payment for the proof of work. These crypto virtual currency coins can be traded on different exchanges for the needs to expand her health and prosperity in her life;

FIG. 42H we see a construction worker in undeveloped country having the ability to build things as a show of proof of work, and he can receive crypto virtual currency coins from the block rewards of minors in a split payment system where he can continue working and being paid from the pool fund digital virtual currency coin storage wallet for block reward wallet directly to his wallet after proof of work is demonstrated;

FIG. 43 shows Apparatus for Splitting Virtual Currency Mining Payoff Rewards with Non Profit and Poverty Individuals Through Donations with these key components, steps and functions;

FIG. 43B shows the same apparatuses and processes as FIG. 39B we have shown where FIG. 43A represents doctors and clinics in undeveloped countries who can provide stories, images, videos, and services that will warrant proof of work for having crypto virtual currency coins delivered instantly to the doctor or the clinics digital currency crypto wallet for use in their systems, business, and goodwill work they do that can be traded on the exchanges for different currencies for the uses, medicines, food, water, and FIG. 43G shows where money can be divided from the block rewards and mining crypto currency coins for use with educators, inventors, and innovators that need funding to keep going sent to their digital wallets for storage of crypto currency coins that they can use from exchanges at a later date, and additionally;

FIG. 43H shows where people to cook food for people in the Third World, undeveloped countries, and poverty areas can get benefits from digital currencies coins for their proof of work in cooking food and feeding people in need and in poverty around the world;

FIG. 44 shows Apparatus for Splitting Virtual Currency Mining Payoff Rewards with Non Profit Environment and Poverty Individuals Through Donations with these key components, steps and functions;

FIG. 43B shows the same apparatuses and processes as FIG. 39B where we have shown where;

FIG. 44A can have benefits from another split wallet split off from the venture investment pool fund digital virtual currency coin storage wallet for block reward or nonprofit digital wallet, or the water benefit wallet;

FIG. 44A, or the FIG. 44G environmental world wallet, or;

FIG. 44H the recycled solar energy fund wallet, or; FIG. 44I showing the wallet where the crypto currency coins are being split off and sent to to be distributed among undeveloped countries peoples who are doing work in things like;

FIG. 44J building houses that are energy-efficient and inexpensive, and as well as; FIG. 44K having wallets of crypto currencies coins being delivered into:

FIG. 44K wallet for use helping wildlife and environmental needs;

FIG. 45 shows the process in the apparatus related to a programmed ASIC chip with registration to banking in transactions with these key components, steps and functions;

FIG. 46 shows the apparatus presented here for generating electricity from a plurality of solar photo voltaic panels in a rack mounting structure utilizing a mirror tracking apparatus for increasing electricity generation in a specific spatial point area. This drawing also shows non-flat concave mirror concentrates the light on the back solar panel. The drawing also describes the sun reflecting on the front solar panel while at the same time reflecting from the mirror into the back solar panel. In our test most of the time the front solar panel amount of energy was equal to or 10% less, it also shows the top of the apparatus looking down and seeing the casing that surrounds the growing area at the bottom, and further also shows the spacing in between the to solar panels for cooling and heating. And it also further shows the sun in a different position and where the rounded mirror can direct the sun to the back service of the back solar panel with these key components, steps and functions;

FIG. 47 shows a side view with the racking system where the solar panel back to back array is placed in a non static movable case or container and the mirror is mounted at a higher level than the back to back solar photo voltaic panels are mounted. It also shows the sun in a different position, reflecting light off the mirror the back while at the same time providing light to generate electricity on the surface of the front panel. And shows where the mirror in the back and solar panel can oscillate tilt up and down for illumination at different angles of the sun in comparison with the mounted solar photo voltaic module with the back to back mounting in the rack with these key components, steps and functions;

FIG. 48 shows the growing area cold box or a hot box that can be mounted and is mounted below the solar panels and the solar reflector mirror. This area can be used to grow large amounts of food rather than not being used. And shows a solar reflector concentrator mirror that not only reflects light into the back solar panel but adds light to the growing area for better growing of crops in this agricultural apparatus. And shows the apparatus presented with the 600 W dual concentrated solar panel agriculture growing cell with the sunlight being absorbed in the front solar panel and then reflected by the mirror reflector into the back solar panel which provides reflected concentrated sunlight and heat in the winter for growing plants below the solar panel modules. And also shows where reflected sunlight and heat are applied to the plant-based area for growing and cold or hot environments. A cooling system is utilized when the weather is hot, and the actual solar panels shield plants from extreme heat also. And still further shows a front view of the 600 W dual concentrated solar panel agriculture growing cell with the front solar photo voltaic panel and the air space between the two panels mounted in an airtight case. It further shows Hardy tomatoes growing in the base area with the racking system and the movable flat mirror in the back with these key components, steps and functions;

FIG. 49 shows the apparatus for generating electricity from a plurality of solar photo voltaic panels in a rack mounting structure utilizing a mirror tracking apparatus for increased electricity generation in a specific spatial point area.

FIG. 49A shows the apparatus with two mirrors or solar panels in a container that can move oscillate side to side and a racking system for the mirrors to be mounted higher than the solar panels in the front that are mounted back-to-back in a case, with these key components, steps and functions; and further describes component;

FIG. 49B a batch of tomatoes growing in the lower area with the square racking system where covers can be put all sides and on top for a greenhouse growing area at the base of the solar panel array this generating electricity. We also see the sun reflecting into the two mirrors or plurality mirrors and reflecting into the back solar panel for 100% equal amount of electricity generated in the same space as a single mounted solar panel. Even in certain times of the day when the sun Is at a lower angle the back solar panel only loses about 10% of the energy created compared to the front solar panel that directs a line of sight to the sun;

FIG. 50 shows the apparatus for generating electricity from a plurality of solar photo voltaic panels in a rack mounting structure utilizing mirror tracking apparatus for increasing electricity generation in a specific spatial point area utilizing a plurality of solar panels and a plurality of mirrors that can oscillate move up and down and can move side to side with these key components, steps and functions;

FIG. 50A shows the programmable computer controller this connected to the servos that move and oscillate the mirrors in the back left and right up and down and reflect light into the three back solar panels for multiple additional electricity and wattage created;

FIG. 50B shows the sun reflecting on the three mirrors and then reflecting from the three mirrors light and heat to the three solar panels mounted in accepting unblocked pattern. Because four solar panels are being used that are 300 W each then this particular layout of the presented apparatus can approach 1200 W in almost the same space as 300 W solar panels mounted; FIG. 50C shows the apparatus front solar panel getting direct sunlight from the sun while at the same time the sun is projecting sun light to the three mirrors in the back that can tilt up and down left and right for maximum amount of light transferal to the three back solar panels for additional electricity generation not using at least 75% of the space usually used for mounting one single solar panel;

FIG. 51 shows the apparatus for generating electricity from a plurality of solar photo voltaic panels in a rack mounting structure utilizing a mirror tracking apparatus for increasing electricity generation in a specific spatial point area with these key components, steps and functions;

FIG. 51A shows the programmable computer controller that is part of the apparatus and the backside of the mirror array of three mirrors that can move up and down left and right;

FIG. 51B shows the three mirrors that are part of the apparatus that move left to right and up and down reflecting sunlight in the optimum level to the three solar panels below them;

FIG. 51C shows to three solar photo voltaic panels accepting sunlight the three mirrors that can move up and down and can move left and right and are controlled by the programmable computer controller;

FIG. 51D shows the sun hitting the front solar panel the morning the afternoon in the evening and shows where the three mirrors left and right up and down and are able to put maximum sunlight in the morning lunchtime and late afternoon onto the three solar panels as well as the front solar panel. And shows the backside of the mirrors with the rotating shafts and for servo motors that are controlled by the computer controller that is programmable reflecting sun light or light into the three solar panels in the back for four time the electricity generation of a single solar panel. It also shows the three solar panels being energized by the light from the sun reflecting off the three mirrors that can rotate oscillating up and down and side to side in the back area of the presented apparatus invention;

FIG. 52 shows Apparatus for Multiple Cell Electricity Generation with these key components, steps and functions;

FIG. 52A shows a graphene anode electrode inserted into a chlorophyll gel electrolytic cell is one component of the presented apparatus invention the apparatus for multiple cell electricity generation which is the connector point in a series connection between all three cell units that produces a positive DC current. Shows 3 cell amperage booster of the apparatus for multiple cell electricity generation shows all the cells connected in the series connection with the anode positive electrode and the magnesium negative electrode as part of the presented apparatus invention here. Shows 3 different types of current and voltage cells of the apparatus for multiple cell electricity generation and shows a side view of the parallel configuration of all three different energy storage and transferal cells the graphene gel cell, the blue gel polymer cell, and the chlorophyll gel cell of the Presented apparatus and invention here;

FIG. 52B shows a magnesium cathode electrode inserted into a graphene gel electrolytic cell which is another component of the presented apparatus invention the apparatus for multiple cell electricity generation which is the connector point in a series connection between all three cell units that produces a negative DC current;

FIG. 52C shows the series connection between the gel chlorophyll cell and the blue gel polymer; the magnesium cathode of the gel chlorophyll cell is connected with a conductive connector to the graphene anode electrode of the blue gel polymer cell;

FIG. 52D shows the complete gel chlorophyll cell with anode and cathode;

FIG. 52E shows the complete blue gel polymer cell with anode and cathode; FIG. 52F shows the complete graphene gel cell with anode and cathode;

FIG. 53 shows Apparatus for Multiple Cell Electricity Generation with these key components, steps and functions;

FIG. 53A shows the negative cathode in a graphene gel electrolytic connected in a parallel configuration;

FIG. 53B shows the positive anode in a graphene gel electrolytic connected in a parallel configuration;

FIG. 53C shows the positive anode connected to the positive anode of the blue gel polymer cell connecting the graphene gel cell in parallel to the blue gel cell;

FIG. 53D shows the graphene gel cell connected in parallel to the blue gel polymer cell and finally connected to the chlorophyll gel cell;

FIG. 53E shows the blue gel polymer cell connected to the graphene gel cell and also connected to the chlorophyll gel cell in parallel configuration;

FIG. 53F shows the chlorophyll gel cell connected to the blue gel polymer cell and also connected to the graphene gel cell in a parallel connection as a component in the apparatus for multiple cell electricity generation apparatus invention presented here;

FIG. 54 shows the apparatus for a Hugelkultur growing bed below plurality of solar panels with square foot agricultural drip irrigation growing cells;

FIG. 54A shows the top view of the square foot planning area with Hydro drip lines built into growing apparatus;

FIG. 54B shows that because each growing cell is separate and isolated from each other growing cell without any conductive the between the two cells except to the bottom in the invention by simply adding electrodes additional electricity can be generated from agriculture in the apparatus. Plants utilize photosynthesis to generate their food from light the process creates electrons that flow to the roots of the plants these electrons when electrodes are added to each growing cell can be removed are transferred to batteries, creating electricity for use. This is an additional source for electricity generation that is totally organic and does not harm the plants or affect any other aspect of the present Invention. It also shows a close-up view of the growing cells with a hole at the bottom size of the growing cells is 12 inches and has a single pipe or plurality of pipes of irrigation drip lines going to the bottom of each of the growing cells. And also shows the apparatus for a Hugelkultur growing bed below a plurality of solar panels with square foot agricultural drip irrigation growing cells bottom view we can see the open holes so that the water does not pull-up in each of the growing areas each of the cells is 12"×12" or can be bigger or smaller. Each growing cell separates itself from the other growing cells which is used in the presented invention to create additional electricity by placing electrodes in each of the growing cells and utilizing photosynthesis for generating electrons. The figure also shows the growing cells on the side with the ports for the irrigation going in and coming out. The ports have a flow of water that goes through drip lines that passes through the whole system and comes out the other side. There holes of the bottom of each of the cells so the root structure can grow through the holes into the Hugelkultur planning area below the growing cells. The Hugelkultur layered areas below these growing cells are layers of wood twigs green compost brown compost and organic compost layers. And it shows where it has its own irrigation drip line built into the growing area. Square foot growing areas can produce many crops to feed undeveloped countries;

FIG. 55 shows Apparatus for a Hugelkultur growing bed, below plurality of Solar panels with square foot agricultural, drip irrigation growing cells with these key components, steps and functions;

FIG. 55A shows the solar position shining light on the front solar panel;

FIG. 55D and shining light on the mirror FIG. 7B that can move up and down and left and right.

FIG. 55B shows the mirror that reflects light onto the backside solar panel for energy generation, and reflects light for growing in the apparatus for a Hugelkultur growing bed below a plurality of solar panels with square foot agricultural drip irrigation growing cells invention presented here;

FIG. 55C shows the apparatus for a Hugelkultur growing bed with square foot cells that can be mounted in the ground flush with the surface of the ground or above ground;

FIG. 55D shows the plurality of solar panels in this configuration it's showing solar panels mounted back-to-back and being able to accept sunlight directly from the sun and at the same time from the reflected light of the mirror. The mirror can be concave or convex or flat for the best concentrated solar generation.

FIG. 55E shows the rack mounting system of the apparatus for a Hugelkultur growing bed below a plurality of solar panels with square foot agricultural drip irrigation growing cells. This rack has the ability to mount a plurality of solar cells, with the ability and function to be covered on all sides for a greenhouse growing effect from the Hugelkultur growing bed below and tilting apparatus and left to right apparatus to move the mirror up and down left and right powered by a computer controller that uses sensors on the back solar panel to determine the angle of the mirror for the best wattage generated in the system. And shows the growing area that can be a cold box or a hot box depending on the covering on the sides in the ventilation system in the presented invention. And shows a large crop that can be grown in the 36 12"×12" square foot gardening growing cells at the base of the solar panel modules in the mirror assembly. The Apparatus component also provides a Hugelkultur square foot farming subsurface ground level hydration, sensing and management for continuous, organic composting mechanism;

FIG. 56 shows the apparatus for a Hugelkultur growing bed below plurality of solar panels with square foot agricultural, and drip irrigation growing cells;

FIG. 56A shows where the sun reflects off the mirror to another mirror that reflects the sunlight directly onto the front and back, specifically the back solar photo voltaic panel to produce additional electricity in the presented invention and apparatus system;

FIG. 56B shows the 45Å° angle of the dual solar panels on top of the racking system that can be adjusted for maximum light, heat, and cooling by programmable computer controllers; FIG. 56C shows the front part of the racking apparatus that is approximately 2131 mm;

FIG. 56D shows the distance from the front part of the racking system to the front part of the next racking system in a row behind the first racking system. This distance allows for a plurality of square foot growing cells in a Hugelkultur below the racking system and mounting areas of the solar panel mounting system;

FIG. 57 shows Apparatus for a Hugelkultur growing bed, below a plurality of Solar panels with square foot agricultural, drip irrigation growing cells with these key components, steps and functions;

FIG. 57. The purpose of the upper mirrors is to reflect light onto the plants as solar panel farms have issues with light not reaching the ground underneath the solar panels. Reflected light from the upper minors apparatus can also be reflected back into the backside solar panels in a dual back to back solar panel apparatus configuration. These upper mirrors systems can be track-able and movable mechanisms to always reflect the greatest amount of light for use in the apparatus and invention presented here;

FIG. 57A shows the upper minors apparatus that are mounted on the side of the solar panel mounting system so as not to block the racking system aligned behind the racking system and apparatus shown in;

FIG. 57B shows the lower mirrors apparatus that are mounted on the side of the solar panel mounting system so as not to block the racking system aligned behind the racking system and apparatus shown in FIG. 57. The purpose of the lower mirrors is to reflect light into the solar panels that have the back to back solar panels mounted in a dual apparatus configuration lower minors systems can be track-able and movable mechanisms to always reflect the greatest amount of light for use in the apparatus and invention presented here;

FIG. 57C shows apparatus for a Hugelkultur growing bed below a plurality of solar panels with square foot agricultural drip irrigation growing cells FIG. 57C shows the open racking system where agricultural workers can work under the solar panels. The racking system supports a plurality of solar panels and can be covered all sides in the winter for all year around growing;

FIG. 57D shows the abundance of growing plants in the large surface, and ground space below the solar panels.

FIG. 57D also shows the figure of a man to show the perspective of the height of the racking system for easy access to the growing areas by agricultural workers;

FIG. 57E shows the lower mirrors apparatus that are mounted on the side of the solar panel mounting system so as not to block the racking system aligned behind the racking system and apparatus shown in this FIG. 57. The purpose of the lower mirrors is to reflect light into the solar panels that have the back to back solar panels mounted in a apparatus configuration lower mirrors systems can be track-able and movable mechanisms to always reflect the greatest amount of light for use in the apparatus and invention presented here;

FIG. 57F shows the upper mirrors apparatus that are mounted on the side of the solar panel mounting system so as not to block the racking system aligned behind the racking system and apparatus shown in this FIG. 57. The purpose of the upper mirrors is to reflect light onto the plants as solar panel farms have issues with light not reaching the ground underneath the solar panels. Reflected light from the upper mirrors apparatus can also be reflected back into the backside solar panels in a dual back to back solar panel apparatus configuration. These upper mirrors systems can be track-able and movable mechanisms to always reflect the greatest amount of light for use in the apparatus and invention presented here;

FIG. 58 shows Apparatus for Air Heating and Cooling with Electricity Generation between a plurality of Solar PV Modules in an above ground and below ground System with these key components, steps and functions;

FIG. 58A shows a programmable computer controller for controlling pumps, switches, sensors, pump flow rate, electricity storage, electricity generation, temperature, of all components in the present invention;

FIG. 58B shows a solar panel mirror system and apparatus that reflects the solar light to the surface of the tubing above ground along with so light directly hitting the piping system above ground in the presented apparatus;

FIG. 58C shows the sun and position in the sky as related to use in the presented invention.

FIG. 58D shows temperature sensors that are connected to the programmable computer controller above ground;

FIG. 58E shows above ground lines of pipes for heating cooling from the sun reflected objects and at nighttime cooling in the presented invention;

FIG. 58F shows where all pipes in the system can have a graphene coating inside or outside or in both inside and outside of the piping systems for electricity generation in the present invention. The diagram also shows where the sun and above ground temperatures heat the pipes above ground in the red tone pipe and where the underground pipes are cooled to 40Å° F. to 50Å° F. in the blue diagram of the underground pipe. The diagram also shows the graphene inside the pipe that is applied as an insert or as a thin layer coating of graphene anode since it's painted on to separator that is painted onto the cathode material inside the pipe;

FIG. 58G shows two pumps in the presented apparatus that can bring water from the cool ground for use above ground and at the same time bring water from the above ground surface warm area to other areas underground for use in heating and cooling of water for irrigation and agricultural purposes;

FIG. 58H shows the piping system stacked in a way in the presented apparatus where less space is needed for heating and cooling through the pipes;

FIG. 58I shows infrared Peltier effect plus Seebeck effect thermoelectric electricity generation components placed between the hot and the cold below ground piping systems in the presented apparatus invention, in the apparatus presented here materials being used in the Thermoelectricity generation system are graphene and magnesium;

FIG. 58J shows the underground stacked piping system in the presented apparatus.

FIG. 58K shows two pumps in the presented apparatus that can bring water from the cool ground for use above ground and at the same time bring water from the above ground surface water warm area to other areas underground for use in heating and cooling of water for irrigation and agricultural purposes;

FIG. 58L shows the ground-level line to demonstrate above ground and below ground.

FIG. 58M shows an enlarged area of the electricity generating water flowing pipe with anode and cathode added in graphene;

FIG. 58N shows the anode in the apparatus system and invention presented here.

FIG. 58O shows the cathode in the apparatus system and invention presented here;

FIG. 58P shows where the water flows over the anode and cathode that is painted on the surface creating electrons that flow through the anode and cathode material for harvesting for use in the apparatus, or stored in batteries, or use outside of the apparatus;

FIG. 59 shows the presented invention apparatus for air heating and cooling with electricity generation between a plurality of solar photo voltaic modules in an above ground and below ground system;

FIG. 59A describes a storage tank for hot air pumped out of the middle of solar panels mounted back-to-back for creating hot air needed for electricity generation are to warm agriculture or systems in the presented invention;

FIG. 59B shows a pumping device to pump air out of the solar panels mounted back-to-back for cooling the solar panels to get higher electricity generation and to protect the solar panels from extreme heat;

FIG. 59C shows mirrors projecting light from the sun reflecting light onto the back panel of the back to back solar panel photo voltaic modules so that the back panel can have light to generate electricity and light to grow agriculture below the back solar panel and bounding array;

FIG. 59D shows a sensing device use to measure temperatures and amount of light in specific spatial points on the back solar panel for the purpose of management by programmable computer controller;

FIG. 59E shows the front solar panel of the back to back mounted solar panels in a sealed case with the back solar panel for managing heating and cooling systems in the presented invention;

FIG. 59F shows another sensor for thermal and light sensitivity mounted in a Spatial point area for sensing measurements sent back to the programmable computer controller;

FIG. 59G shows the sun reflecting on this surface of the front solar panel and reflecting on the mirror that reflects light to the back solar panel;

FIG. 59H shows another sensor mounted a spatial point for measurements sent back to the programmable computer controller;

FIG. 59I shows a mounting rack bar that controls the tilt of the back to back solar panel in a case system aspect of the presented invention;

FIG. 59J shows another sensor ascends thermal and light information and light sensitivity data to a programmable computer controller for positioning of the mirrors for the best optimum light and thermal management along with the programmable computer controller that controls pumps in storage of water in the system;

FIG. 59K shows input port for air from the outside that goes between the two back to back solar panels heating the air that is removed by FIG. 2B pump into container FIG. 59A for processing and use in the system controlled by a programmable computer controller;

FIG. 59L shows a storage tank for filtered water from groundwater aquifers that can be piped into a holding tank for being heated or cooled to be delivered through FIG. 59S irrigation system to crops and plants and agricultural aspect of the presented invention;

FIG. 59M shows the programmable computer controller that controls data coming from sensors related to thermal lighting temperatures and the identification of materials. The programmable computer controller also measures pump flow rates of all pumps, tank measurements of capacity and of air and water, and lasers angles on graphene pipes and sheets for cooling in heating at specific points in the presented invention. The computer controller also is programmed to control the tilts of back to back solar panels, and mirrors up and down left and right and skewed. The purpose for these movements is to produce more electricity, depending upon the angle of the sun and for cooling in heating the below ground agricultural systems;

FIG. 59N shows the pipe attached to the tank storing the filtered water for use and agricultural irrigation drinking water and heating cooling in the system;

FIG. 59O shows the output pipe for filtered water to be used in the system and outside the system;

FIG. 59P shows the bottom of the tank were groundwater from aquifers is stored with graphene filtration system built-in for filtered groundwater for use in humanitarian needs and by the system;

FIG. 59Q shows a pipe coming from a well being pumped from an aquifer for use in the system;

FIG. 59R shows where water from the ground in aquifers can be pumped into a series of metal pipes or other high thermal transfer piping systems for cooling water underground to 40Â° F. to 50Â° F. for cooling in the system;

FIG. 59S shows a graphene sheet for cooling and electricity generation converting light to energy and converting light to temperatures utilizing angles of laser input to the surface of the graphene;

FIG. 59T shows a plurality of low energy lasers controlled by the programmable computer controller for temperature adjustments and electricity generation in the presented invention;

FIG. 59U shows a storage tank for water that receives water from the ground filtered and unfiltered and that also sends water to agriculture in an irrigation system and that also heats and cools water from air transported to it from the back to back solar panels air heating and cooling apparatus in the presented invention;

FIG. 59V shows coils and stacks piping for water flow below the ground surface for the purpose of cooling water for use in air-conditioning and heating systems in refrigeration systems for agriculture or just general cooling in the system in the present invention;

FIG. 60 shows Apparatus for Air Heating and Cooling with Electricity Generation between a plurality of Solar PV Modules in an above ground and below ground System with these key components, steps and functions;

FIG. 60A shows the upper input output port of the apparatus for heating with air and cooling with electricity generation between a plurality of solar photo voltaic modules in an above ground and below ground system;

FIG. 60B shows where the solar panels that are mounted back-to-back in the presented invention have an airtight casing around the edges of the to solar panels that have an air gap between them. This air gap generates heat from the sun and can generate cooling in the winter from the cold air in temperatures. The airtight casing gives this component of the system the ability to provide hot and cold air to places that need that hot and cold air. A programmable computer controller is used to manage this hot and cold air for applications to growing plants below and agricultural purposes and for heating and cooling components in the system, and for producing additional electricity using Peltier differences temperatures on hot and cold materials;

FIG. 60C shows where to 300 W solar panels in the same spatial area with hot and cold air between the two back to back solar panel modules that can be utilized for heating cooling atmospheric water generation in electricity generation;

FIG. 60D shows where more than two or a plurality of solar panels can be used in an array in the presented invention;

FIG. 60E shows an input output port at the bottom of the solar panel array mounted in an airtight casing for input or output of air for the purpose of heating and cooling applications throughout the system in the presented invention;

FIG. 61 shows Apparatus for Air Heating and Cooling with Electricity Generation between plurality of Solar PV Modules in an above ground and below ground System with these key components, steps and functions;

FIG. 61A of the apparatus for air heating and cooling with electricity generation between a plurality of solar photo voltaic modules and panels in an above ground and below ground system shows an enlarged view of an infrared receiver array components for turning infrared radiation into electricity in the presented apparatus and invention. The LED infrared receiver circuitry used to generate electricity involves the component to be connected to a programmable micro controller and has two pins connected to a micro controller with a combination of series connections in parallel connections for generating DC electricity whenever the IR receiver detects infrared radiation and light in the presented invention here;

FIG. 61B shows the LED infrared receiver components that make up the infrared component in the presented invention managed by a programmable computer controller;

FIG. 61C shows where a plurality of infrared electricity generating panels can be stacked inside between two back to back standard solar panels that are photo voltaic for additional electricity generation from infrared radiation in the presented apparatus invention here. In another aspect of the invention and apparatus presented here we have layers of graphene on a glass substrate that lay on top of the infrared receiver LED components that increase the amount of infrared radiation being absorbed into the infrared receiver LED's as a sort of infrared antenna and collector. The graphene applied very thinly on the surface of a plastic substratum or glass surface create the antenna collector of infrared radiation effect for the purpose of increasing the amount of electricity generated in the system and apparatus. Other layers added as shown in FIG. 61C are organic materials of cardboard, paper, cotton and materials with high infrared radiation attraction properties. A plurality of graphene layers serves to be a storage area for infrared radiation electrons that are transported to the infrared receiver LED components to be converted to electricity in the presented apparatus and invention here;

FIG. 61D shows the backside solar photo voltaic panel and where the plurality of infrared electricity generating panels can be stacked inside between two back to back standard solar panels that are photo voltaic components for additional electricity generation from infrared radiation in the presented apparatus invention here. Another aspect of this infrared receiver LED component configuration we have a diagram in FIG. 61D that shows 12 LEDs set up in series in parallel to generate 6 V DC and doubling the milliamp current measurement as part of how the array works in the presented invention here. The layers of graphene, organic materials that attract infrared radiation, and the absorption of infrared light and radiation into the warmed up areas between the to solar panels creates a perfect environment in the apparatus and invention presented here for generating large amounts of electricity in the presented apparatus invention here. Because there are multiple layers of a plurality of infrared layered materials and components each layer creates a doubling effect of the electricity that is generated in the very warm thermal area between the to solar panels. Electricity is generated is DC electricity and is piped through a programmable computer controller to be added to the flow of the solar panels output with protective diodes to keep electricity going in the opposite direction in the presented apparatus invention here. By having airflow from a port or a plurality of ports over all of the materials inside the layers of the graphene and infrared absorbing materials additional electricity is created. So the invention and apparatus presented here also has input and output ports in between the backs of the solar panels to be able to introduce ionized and infrared enhanced air over the infrared receiver LED component for additional electricity generation from the materials that attract and store infrared radiation from the atmosphere, the system, and the sun.

The invention claimed is:

1. A hydro electric water generator apparatus and system managed by
    a plurality of autonomous or manual computer controllers comprising;
    a plurality of magnetic motor generator apparatus as a means for electricity generation;
    a plurality of computer controlled and accessed thermal and pressure sensors as a means for measurement of temperature and pressure to increase electricity generation;
    a water vortex creating and water structuring apparatus as means for generating healthier water and for increasing electricity generation;
    a graphene filtration apparatus and system as a means for purifying of water;
    a graphene water movement electricity generation apparatus and system;
    a water refill apparatus and system as a means for filling water tanks;
    a plurality of air and water pressure valves, moving material in a plurality of multiple directions and one way directions as a means for structuring water and for additional electricity generation;
    a plurality of computer controlled deflector apparatus for controller material flow which is here defined as liquid water, chemical or gaseous materials as means of directing materials to electricity generating surfaces and tanks;
    a plurality of output irrigation ports out of the apparatus presented here connected to pipes with computer controlled pressure, temperature, and filtration apparatus as a means for electricity generation, heating, cooling and agricultural irrigation; a plurality of input irrigation ports into the apparatus presented here connected to pipes with computer controlled pressure, temperature, and filtration apparatus as a means for electricity generation, heating, cooling and agricultural irrigation;
    a plurality of input ground water and water tank ports into the apparatus presented here connected to pipes with computer controlled pressure, temperature, and filtration apparatus as a means for electricity generation, heating, cooling and agricultural irrigation;
    a plurality of output ground water and water tank ports out of the apparatus presented here connected to pipes with computer controlled pressure, temperature, and filtration apparatus as a means for electricity generation, heating, cooling and agricultural irrigation;
    an organic graphene battery storage apparatus and system providing means for additional electricity storage and generation.

2. The apparatus of claim 1, further comprising;
    a plurality of Graphene anodes inside a piping system providing means for electricity generation;

a plurality of Magnesium cathodes inside a piping system providing means for electricity generation;
a programmable computer charging controller providing means for management of steps in electricity generation;
a plurality of infrared receiver diodes on a mounting material providing means for electricity generation from light shining on receiver diodes;
a plurality of infrared absorbing materials between layers of infrared receiver diodes on a mounting material providing means for electricity generation from infrared light of infrared receiver diodes on a mounting material;
a plurality of programmable computer controlled temperature, voltage, current and watt sensors providing means for electricity generation switching management.

3. The apparatus of claim 1, and further comprising;
a plurality of block chain security and pay apparatus providing the means for online payments;
a plurality of electricity measuring sensors providing means for calculating electricity usage, generation and optimum transferal;
a plurality of video cameras providing means of security, and maintenance; connected to a plurality of programmable computer controllers a a means to management.

4. The apparatus of claim 1, further comprising;
a plurality of egg shaped water storage apparatus providing the means for structuring of water, and electricity generation;
a plurality of water structuring apparatus for the means of human health growing better crops;
a plurality of programmable computer controllers utilizing sensors for the means of managing water flow, pressure, electricity generation and testing of structured water produced.

5. The apparatus of claim 1, further comprising;
An Alternative Energy Booster Apparatus that comprises the following components, materials and layered assemblies;
A plurality of electricity generation cells as a means to generate and store electricity A plurality of switching controllers as a means to increase electricity generation and current;
A plurality of electricity storage capacitors, and/or batteries as a means for electricity storage, generation, and transferal;
A plurality of aqueous delivery points to cells as a means of increasing and maintaining electricity generated;
A plurality of layered Anode components as a means to extending the life of the electrode;
A plurality of layered Cathode components as a means to extending the life of the electrode;
A plurality of DC Electricity Generation Apparatus as a means to increase electricity generation;
A plurality of Layered and Surface Graphene Coated Electrodes as a means to extending the life of the electrode and as a mechanical switch of polarity;
A plurality of Anode Layered Graphene Coated Surface as a means to extending the life of the electrode and as a mechanical switch of polarity;
A plurality of Cathode Layered one or a combination of all materials including, Mg, Aluminum, Copper, or Zinc Coated Surface as a means to extending the life of the electrode and increasing electricity generated;
A plurality of Electrolyte, utilizing a combination of H20, Gel Polymer, Organic Seaweed, Chlorophyll, Diatomateous Earth, graphite and green plant leaves as a means to extending the life of an electricity storage cell, and electricity generated; Programmable Computer controlled Individual sensing and management of cells as a means to extending the life of the electric storage and generation cell;
A plurality of programmable electronic mechanical electrode dipping switches as a means to extending the life of the electrode and generating more electricity;
A plurality of super and ultra capacitors as a means to generating more electricity;
A plurality of USB Power User connectors as a means to connecting devices for safe and easy transferal of electricity and data;
A layered protection graphene grid encased in a polymer base as a means to extending the life of the device protecting against EMF, and EMP surges as a Faraday cage;
An electricity recovery controller with a plurality of protection systems as a means of managing, harvesting and storing excess static electricity.

6. The components of claim 5 and further comprising;
Structural aspects, functions and processes for a power cell Switching System for the individual Shutoff of Cells, the Modifying Polarity and the Switching of Circuits from Parallel to Series Connection with these key functions;
The Function of a plurality of computer controlled switching devices in each cell that can Switch Between a plurality of Rechargeable Storage Devices Super capacitors, Ultra capacitors or batteries;
The function of a plurality of computer controlled switching devices in each cell that can Switch to Series or Parallel connections of Cells;
The function where each Switch has the apparatus wiring and logic of a computer controller that can change the Polarity +−Connection of Cell and Storage devices here defined as batteries, or capacitors to Series or Parallel connections;
The function where each Switch can Switch Off or Override each cell in Connection and Storage devices here defined as batteries, or capacitors;
The functions and processes of Electricity Generation and Energy Storage Capacitor Area with these key functions;
A component of a Plurality of + or − computer programmable polarity Connection Circuits with wiring on each side of the cells with Cell controlled, and connected to switches;
The function structural aspect of computer programmable and controlled Switchable Electricity Storage In each individual cell;
and further comprising a multiple cell configuration of;
Bus bar high density graphene electrolyte gel polymer cells for greater electron storage in electron flow connected to one or a plurality of low density electrolyte gel polymer cells for increasing transferal speeds (voltage, current) in the cell;
a Switching System for the individual Shutoff of Cells;
a Modifying of Polarity and the Switching of Circuits from Parallel to Series Connection with these key functions and components;
A plurality of Software Controlled Switching apparatus;
An Anode, or plurality of Anodes;

An Electrolyte material consisting of one or more Wet/ Dry/Gel electrolytes/Dry polymer electrolyte, /Solid ceramic electrolyte, /Organic ionic plastic crystals, or H2O;

A plurality of Electrical Storage devices;

A Cathode or plurality of Cathodes.

7. All aspects of claim 6 and further comprising means for case of the apparatus manufacturing and assembly which includes Cathode and Anode Built into 3D Additive Printed and Manufactured Structure of the Booster Apparatus case and electrodes;

and further comprising utilizing conductive 3D printing filament;

and further comprising utilizing non conductive 3D printing filament;

and further comprising An EMP proof multi layered graphene protective Faraday Cage enclosure added by applying layers of a plurality of conductive graphene printed grids when the outer coating is applied on outside of case utilizing over molding with injection molding and a 3D Printing additive process for a patterned Graphene grid that creates a Faraday cage built into the case for protection from (EMP) Electro Magnetic Pulse damage;

and further comprising an energy creation electronic switching circuit from case Faraday caged grid connected to super capacitors so that the electrical energy created by an EMP can be stored or dispersed to the system for use;

and further comprising utilization of energy storage with computer programmable electronic and mechanical switching between Super and Ultra Capacitors combined with Batteries for the means of providing dependable, trustworthy and reliable appliance energy use as related to utilizing inexpensive capacitors as a backup storage as core component of the apparatus;

and further comprising an additional component of the apparatus where a magnesium layered cathode protects a graphene layered anode, and multiple magnesium cathodes are sacrificed and switched on or off utilizing electronic, mechanical and different layered coating materials to extend the lifespan of the cell energy generation.

8. All aspects of claim 7 and further comprising a DC Wall Adaptor, and apparatus for appliances with the following components and functions;

A plurality of USB-C PD Aware Power Delivery as defined as wall jacks that are able to pull +12 v from a USB power source that is programmable assuming the device is telling the power source that it is ready to receive the +12 v;

An Alternative Energy Booster Apparatus and other DC Electricity Sources for 12 volt or higher DC Electricity transferal to USB-C PDAware Wall Adaptor apparatus with following components and functions;

comprising a Wall plate with USB-C PD Aware Plugin Sockets;

further comprising an Apparatus and Functions for USB-C PDAware Direct DC Appliance Use;

further comprising an Apparatus for use with DC Electricity Generation Apparatus, Solar Panel, Battery, and other Generation and Storage Devices;

further comprising an Apparatus Connected Directly or indirectly through controller to USB-C PDAware Wall Plate;

and further comprising a Wireless electricity transferal system utilizing a plurality of electronic low energy laser array transmitters;

and further comprising a Wireless electricity transferal system utilizing a plurality of electronic solar panel photo voltaic receivers.

9. All aspects of claim 7 and further comprising a plurality of layered electrode manufacturing of energy cell timer electrodes, utilizing a process and apparatus using a Non Stick Surface mold for making non stick layers of Graphene and Aqueous Gel Acrylic Polymer; for the purpose of increasing the lifespan of the Anode electrode, and Cathode electrode in the disclosed apparatus;

and still further including a Microscopic Leaf Wetness apparatus layered coating as a separation layer of the cell apparatus;

and still further comprising the including of a plurality of graphene layers added to outside surface, above aqueous layers on the metal electrodes creating distinct water adhesion attributed to the different Van der Waals attraction on the surface nano structure for protected conduction;

and still further including where a vertical graphene micro sheet surface layered coating provides the line contact with a smaller contact area resulting in the low adhesive force where tilted micro sheets created by a one direction buffing during manufacturing offers a larger contact area which dramatically increases the water adhesive force, while reducing corrosion activity, and increasing the lifespan of the electrode in the cells of the apparatus;

and still further comprising a plurality of metal cells electrodes coated to create Dipole-dipole positive to negative attraction forces for the purpose of reducing corrosion, and increasing electricity generation in the presented apparatus;

and further comprising water proof case apparatus for under water applications, drones, and for vehicles;

and further comprising an additional component of the apparatus where a magnesium layered cathode protects a graphene layered anode, and multiple magnesium cathodes are sacrificed and switched on or off on or off utilizing electronic, mechanical and special coating materials to extend the lifespan of the energy cell generation in aqueous cell conditions;

and further comprising apparatus having a plurality of energy cells inside one energy cell container;

and further comprising utilizing water flowing over a plurality of graphene and magnesium mini electrodes producing energy creation through tubing;

and further comprising utilizing water flowing over a plurality of graphene and magnesium mini electrodes producing energy creation through flat panels;

and further comprising utilizing water flowing over a plurality of graphene and magnesium mini electrodes producing energy creation through solar heated tubes;

and further comprising the cell apparatus combined with a plurality of electronically controlled Peltier devices built into the apparatus case structure creating electricity from the differential cold and hot of cool or hot water, and exterior cool or hot air.

10. All aspects of claim 9 and further comprising infrared energy creation apparatus connected to each cell;

comprising a Peltier hot cold generation of DC electricity;

and further comprising a plurality of magnetic DC motors used as generators powered by a single DC motor to create DC current;

and still further comprising a plurality of magnetic AC induction motors used as generators powered by a single DC motor to create AC current; and further comprising an apparatus built into the cell where the anode, and cathode is created by adding a plurality of 3D additive printed acrylic timer layers of conductive materials for the purpose of; assembled layered materials delaying corrosion; implementing a plurality of sacrificial anodes or cathodes; layered timer coatings apparatus increasing the lifespan of the cell dramatically; utilizing a plurality of layers resulting in the function of the apparatus to time when the cell will reduce it's potential energy and stop working;

and further utilizes coatings, thickness of coatings, and conductivity of coatings to mechanically program the timing of when a cell stops working as a switch; and further comprising an aqueous gel electrolyte included and used as a component with differing conductivity, and energy densities in a plurality of cells comprised of these materials; H20, Water; Vegetable Glycerin; Aloe Vera Extract; Carbomer; Polyacrylate Acid; Phenylcarbinol; Triethanolamine; Methylchloisothiazolinone; Methylisotiazolinone; Panthenol (from plants);

and still further the above listed materials in a plurality of different cells including and comprised of these additional materials;
Graphene;
Graphite;

and still further comprising the above listed materials in a plurality of different cells in the presented apparatus; including and comprised of these additional materials;
Diatomateous Earth blended with a 50% mixture of Graphene;

and still further comprising the above listed materials in a plurality of different cells including and comprised of these additional materials;
Chlorophyll;
Plant Cellulose;

and further comprising an apparatus where a single or plurality of cathodes can be programmed to electronically mechanically be replaced;

comprising programmable use in or outside of a payment platform as a self contained remote control component connected to mobile phone or remote wired or wireless device to manage payments, and remotely repair the presented apparatus;

further comprising the use in a refurbishment system to extend the time of use in the presented apparatus;

further comprising the use in increasing energy creation to create more power output in the presented apparatus;

and further comprising an energy creation electronic switching circuit from case Faraday caged grid connected to super capacitors so that the electrical energy created by an EMP can be stored or dispersed to the system for use;

and further comprising utilization of energy storage with computer programmable electronic and mechanical switching between Super and Ultra Capacitors combined with Batteries for the means of providing dependable, trustworthy and reliable appliance energy use as related to utilizing inexpensive capacitors as a backup storage as core component of the apparatus;

and further comprising an additional component of the apparatus where a magnesium layered cathode protects a graphene layered anode, and multiple magnesium cathodes are sacrificed and switched on or off utilizing electronic, mechanical and different layered coating materials to extend the life further comprising the use in increasing voltage or current transferal in the presented apparatus;

and further comprising an apparatus where a single or plurality of anodes can be programmed to electronically mechanically be replaced;

comprising programmable use in or outside of a payment platform as a self contained remote control component connected to mobile phone or remote wired or wireless device to manage payments, and remotely repair the presented apparatus; further comprising the use in a refurbishment system to extend the time of use in the presented apparatus;

further comprising the use in increasing energy creation to create more power output in the presented apparatus;

further comprising the use in increasing voltage or current transferal in the presented apparatus;

a plurality of spatial point corner mounting pole robotic devices that can adjust electronically up and down;

a spatial point, wireless theft detection device; an electricity deposit storage device an electricity deposit measurement device;

an electricity deposit identification of owner device;

an electricity deposit manager calculator for current KWH Hour electricity rates an electricity deposit manager banking payment transaction system a plurality of capacitor rapid charging and de-charging electricity storage unit devices;

an electricity withdrawal manager and KWH banking payment device;

an electricity withdrawal capacitor mobile battery device;

an electricity withdrawal connector for vehicles, mobile batteries, and internal energy needs;

an electricity deposit and withdrawal donation, investment, and loan device;

and an electricity KWH Bank collaboration device for transactions with groups of buyers, and sellers;

and further comprising an apparatus where a single or plurality of electrolytes can be programmed to electronically mechanically be replaced;

further comprising programmable use in or outside of a payment platform as a self contained remote control component connected to mobile phone or remote wired or wireless device to manage payments, and remotely repair the presented apparatus;

further comprising the use in a refurbishment system to extend the time of use in the presented apparatus;

further comprising the use in increasing energy creation to create more power output in the presented apparatus;

further comprising the use in increasing voltage or current transferal in the presented apparatus;

a graphene layer;
a first polymer gel electrolyte graphene layer;
a second graphene layer synchronized with the first graphene layer;
and a mirror for reflecting light back through the graphene array of layers for secondary photo electricity creation;

and further comprising an apparatus where a single or plurality of the anodes, cathodes and electrolytes can be programmed to electronically mechanically be disabled;
temporarily;
permanently;
for a date and time;
or for a programmed period of time; managed by a programmable controller as a mechanical switching system;

comprising programmable use in or outside of a payment platform as a self contained remote control component connected to mobile phone or remote wired or wireless device to manage payments, and remotely repair the presented apparatus;

further comprising the use in a refurbishment system to extend the time of use in the presented apparatus;

further comprising the use in increasing energy creation to create more power output in the presented apparatus;

further comprising the use in increasing voltage or current transferal in the presented apparatus;

a plurality of robotic mechanisms for retraction and expansion;

a plurality of generators; a magnetic revolution stabilizer; an electric motor stabilizer;

a plurality of graphene photo voltaic smart wind turbine blades that generate electricity from light;

a plurality of light sensors; and a plurality of wind speed sensors.

11. All aspects of claim 10 and further comprising an apparatus where a plurality of electrodes are dipped into and out of an electrolyte electronically timed and dipping depth managed by a programmable controller as an electronically controlled mechanical switching system for the purpose of;

lengthening the life cycle of the electrode;

increasing the electrical potential;

increasing the electrolyte life cycle;

comprising programmable use in or outside of a payment platform as a self contained remote control component connected to mobile phone or remote wired or wireless device to manage payments, and remotely repair the presented apparatus;

further comprising the use in a refurbishment system to extend the time of use in the presented apparatus;

further comprising the use in increasing energy creation to create more power output in the presented apparatus;

further comprising the use in increasing voltage or current transferal in the presented apparatus;

an infrared or visible light laser diode distance evaluator device;

an infrared or visible light laser diode energy transmitter;

and an infrared or visible light laser diode energy receiver.

12. All aspects of claim 11 and further comprising an apparatus where single or a plurality of anodes, cathodes, electrolytes, and case enclosures can be used as active programmed security and payment components;

comprising an electronic electricity recovery controller;

further comprising a plurality of tamper proof protection systems;

further comprising user programmable security attached to a block chain;

further comprising a management controller remotely wired or wireless from a mobile device, phone, drone or laser light device; and still further comprising a plurality of 3D additive printed layers of conductive materials that can be programmed as a hard wired integrated circuit by the way the layers are printed to be switched on or off electronically individually utilizing a block chain encryption in or outside a payment security system switch in the presented apparatus;

a plurality of graphene anode cathode capacitor electricity storage and transfer devices;

a plurality of data storage devices;

a plurality of light transmitting and data receiving devices;

a plurality of near field electricity transmitters and receivers;

a capacitor mobile battery pack with wireless and wired connector to provide connection to KWH bank ATM machine for deposit of electricity for instant payment transaction;

a plurality of biodegradable electricity capacitor batteries;

a plurality micro grid of mini sized batteries receiving electricity from solar wind server nodes;

a plurality of electricity over flow "full" battery router devices;

a smart solid state transformer electricity router;

a high capacity main battery bank of capacitor batteries;

a plurality of infrared battery electricity transfer devices;

a plurality of controller devices for detection, and identification of electricity owner for electricity transmitting and receiving, with security, certification, tracking and KWH Bank integration;

a plurality of devices for the purpose of determining highest intensity of energy target from the sun's position in space, and detecting wind patterns;

a plurality of infrared or visible light transmission devices for transmitting light to a receiver for the purpose of transforming electricity to light and transmitting to a receiver that transforms light back into electricity;

a plurality of infrared or visible light transmission devices for transmitting light to a receiver for the purpose of transforming data to light and transmitting to a receiver that transforms light back into data;

a KWH Kilowatt Hour Bank current energy commodity price evaluator;

a plurality of RFIDs;

a spatial point identification component;

a block chain payment apparatus programmable computer controller.

13. All aspects of claim 12 and further comprising A Programmable Computer Controller Apparatus with, the following programmed functions in the apparatus;

a series of controls in industrial production processes controlling operations and actions of a machine or device;

which also comprises a series of controls in measurement or test processes controlling the status and response of a measuring or testing device;

and also comprises a series of technical processing of information or data for exchange or management of information or data external to a computer;

and further comprises improvements to a computer system's internal performance for increased system running speed by setting or adjusting configurations and parameters;

that comprises a process where;

and comprises a communication apparatus comprising a transmitter and a receiver;

and further comprises a communication apparatus comprising a transceiver and a processor configured to cause the transceiver to perform transmitting and receiving steps;

and still further comprises a communication apparatus comprising a processor configured to perform or cause the apparatus to perform transmitting and receiving steps;

and also comprises a communication apparatus comprising a memory and a processor configured to enable transmitting and receiving steps to be performed by executing computer program codes stored in the memory; with a communication apparatus comprising means for transmitting and receiving is used for; the process where a block chain block reward is given for processing and discovering available blocks that are validated by a peer network in block chain mining by a miner; that is equal to a specified plurality of crypto currency coins awarded to the miner in block chain mining; after inclusion in the block chain and validation by the peers;

and further comprising a process where an equal amount of crypto currency coins is awarded to a specific designated crypto currency coin wallet;

and still further comprising a process where the designated crypto currency coin wallet is a pool funding wallet for use in donations, as funding for specific and specified non-profit and profit organizations;

and further comprising;
- a process programmed into the block chain in the apparatus for dividing a specified amount of awarded crypto coins for successfully mining a block that is accepted by the crypto currency coin network of computer nodes;
- depositing the specified amount of awarded crypto coins for successfully mining a block is accepted by the crypto currency coin network of computer nodes;
- depositing the specified amount of awarded crypto coins for successfully mining a block that is accepted by the crypto currency coin network of computer nodes into a designated pool fund wallet;

for the purpose of advertising, promotion, and nonprofit and profit fund raising as part of the presented apparatus and processes;

and further comprising;

a process utilizing a plurality of emails, electronic books, social network advertising bots;
- for encouraging participation in worthy online activities where;
- for every vote;
- for every submission of ideas to a contest;
- for every contest recommendation;
- for every Advertisement;
- for every placement in social networks;

where players will receive an airdrop which is defined in this case as where an airdrop is a distribution of a cryptocurrency token or coin, usually for free, to numerous crypto wallet addresses, of substantial defined in this case as of considerable importance, size, or worth, free defined as no charge for crypto coins sent as a gift;
- for their proof of work demonstrated;

and further comprising the matching of the winning prizes of a contest;

and still further comprising the doubling or plurality of doubling the prize, with an equal or larger amount of crypto coins awarded by the apparatus;
- utilizing emails;
- electronic books;
- file sharing;
- advertising;
- aggregation apparatus;

for the purpose of advertising, promotion, non profit and profit fund raising as part of the presented apparatus and processes;

and further comprising;
- a plurality of email, electronic book processes for; raising funding through nonprofits and profit businesses; for the publishing of all the entries in a contest or think tank event involving ideas submitted by participants in a contest; producing an after the contest book, for distribution in helping humanity, animals, and the environment, and education;

that further will give credit to each individual who participated in a the contest or think tank event in the book;

for the purpose of advertising, promotion, and fund raising as part of the presented apparatus and processes;

and further comprising;

a process using programmed computer processor and application for people in poverty to upload and show proof of work;
- through a single or plurality of electronic computer devices;
- a single or plurality of mobile phone devices;
- through the people's work of; telling stories;
- taking and sending pictures and videos;
- analyzing world ideas;
- giving their opinions on issues;
- creating ideas;
- creating solutions to problems;
- asking for advice;

and further comprising; asking for help; asking for funding; and further comprising reducing difficulty rate of mining related to timer consolidation events; submitting questions for others to answer; submitting helpful advice; for the purpose of earning crypto coins;

and further for the purpose of exchanging crypto coins for useful things here defined as food, water, shelter, clothing, housing, energy, and chosen assets; and still further for the purpose of exchanging crypto coins for fiat currencies; and even still further for the purpose of advertising, promotion, and fund raising as an integral part of the presented apparatus and processes;

and further comprising; providing the option for the splitting up of the mining block discovery rewards into a plurality of digital wallets; and also comprising the option of splitting up of mining block rewards transaction fees into a plurality of digital wallets; and further comprising; an electronic apparatus combined with a software timer apparatus for consolidating long hashing block chain into a shorter hashing length;

and further comprising a storage area on peer network nodes for storing old block chain;

and further comprising reducing difficulty rate of mining related to timer consolidation events;

and still further comprising where a percentage of a business where a portion of their mining block reward was invested from the split fund goes directly to the crypto miner who received the original block reward;

and further comprising; comprising a crypto currency that is created with an unknown limit for mining;

and further where the open mining community does not know how many blocks can ever be mined;

and further comprising where a virtual crypto coin can have an infinite amount of coins mined only limited by the resources available for mining; and still further comprising where the older mined virtual crypto currency coins mined have a substantially much higher value similar to artist proofs in limited edition print collecting than the newer mined coins;

and further comprising where the block chain can be used to define the dates of each created block of coins for valuation in a game or financial system for; Trading; Buying Selling; Holding; Payoffs; Bartering; Tangible Evaluations here defined as; Fair Value; Fair Deal; Fair Share; Fair Price; Fair Placement;

and still further comprising where a choice in positioning of the first block discovered in mining of virtual block chain crypto coins can be moved by the creator/founder/organization of the coin to a different position in the block chain ledger for the purpose of;
Strengthening the game play;
Changing the game play at specific intervals in time;
Enhancing the life span and quality of the payment system in game play;
Changing the Value of the payments systems infrastructure; at any time, or specified dates and times; all part of the presented apparatus and invention;
and further comprising an FPGA, ASIC and hard coded integrated circuit for applying functions; using a Computer Object De-Encryption Encryption File Algorithm (CODEFA) mechanism server for validation and proof of ownership of crypto coins;
and further comprising using a human key or here defined as a digitally proven and verified live human representation of a specific individual person for validation and proof of ownership of Virtual Currency crypto block chain ledger coins;
and further comprising; Mobile KWH Bank Battery Storage with block chain proof of ownership;
and further comprising; Low Energy Wall Panel Apparatus connected to Wireless Electricity transferal with block chain proof of ownership;
and further comprising a Wall Paneling Construction Smart Apparatus and System comprising;
a stationary electrical access wall outlet panel apparatus;
a plurality of low energy multiple color lasers; a plurality of solar photo voltaic cells;
a plurality of solar concentration apparatus; a plurality of graphene super capacitor apparatus;
a plurality of organic battery storage units; a single or a plurality of data storage devices;
a plurality of USB, and USB Power Delivery energy connector apparatus;
a plurality of USB communication ports; a main CPU controller board;
an energy and battery controller board; a plurality of electricity generator apparatus;
a plurality of thermal electricity generating layers apparatus; a plurality of aqueous delivery apparatus;
a plurality of cameras; a plurality of microphones; a plurality of speakers; a spatial point sound and light measurement controller apparatus; a wireless controller board;
an LCD touchscreen display;
a plurality of electricity converted to light transmitting apparatus;
a plurality of light converted to electricity receiving apparatus;
a plurality of graphene layered EMP protection apparatus;
a human key or here defined as a digitally proven and verified live human representation of a specific individual person USB processor port for identification of authorized users;
a human key or here defined as a digitally proven and verified live human representation of a specific individual person controller board;
a main CPU controller board;
an energy and battery controller board;
a plurality of computer processors;
a plurality of 3D Solar panel with light intensity tracking apparatus;
a plurality of multi layered graphene solar cell apparatus;
and further comprising; An apparatus and process for executing a series of instructions on a computer system, the method comprising:
registering a user and property account in a computer system;
creating and attaching human identification keys or here defined as a digitally proven and verified live human representation of a specific individual person to the registered users account;
creating and attaching object identification keys to the registered users property account;
creating and attaching bank accounts to the registered users account;
creating aggregated data, and media from stored databases, or real time life events utilizing a module;
creating a website search software application either from tables on the server, from aggregated data or by the entry of a search item utilizing a module;
creating a Fractional opportunity, utilizing a Fractional Request Module; providing taking a real or intangible property and dividing it into a plurality of pieces for the purpose of monetizing, creating liquidity, collaborating, sharing and making payments;
providing the ability to create a divisible, divided second property from a real or intangible first property, for the purpose of creating liquidity, monetizing it, or creating greater value for the piece or pieces;
providing the ability to create an assembled second property from real or intangible first property, or a plurality of first properties for the purpose of creating liquidity, monetizing it, or creating greater value for a piece or pieces;
creating Publicity for created or re-purposed properties utilizing a Self Publishing Publicity module;
sharing a Fractional opportunity with users in a network;
creating a Fair Value utilizing a module;
that calculates the amount of money that something is worth, the price or cost of something, in a fair way to all users;
creating a Fair Share opportunity utilizing a module, that calculates a portion belonging to, due to, or contributed by an individual or group;
creating a Fair Deal utilizing a module, that calculates how to give (something or an amount of something) to someone, to buy and sell as a business, and additionally to reach or try to reach a state of acceptance or reconciled agreement from users in a network about real tangible or intangible object transactions; creating a Fair Price utilizing a module, that calculates the amount of money that you pay for something or that something costs, and calculates the thing that is lost, damaged, or given up in order to get or do something, and additionally calculates the amount of money needed to persuade users in a network to do something, and additionally calculates the quantity of one thing that is exchanged or demanded in barter or sale for another thing, and additionally calculates the amount of money given or set as consideration for the sale of a specified thing all in a fair way to the users in the network;
creating a Fair Placement utilizing a module, that calculates putting something in a particular place, and finding an appropriate place for someone to live, work, or learn, or placing an object, advertisement, or website in a strategic location for best possible results, in a fair way to users in a network;

creating a Micro Share Request utilizing a module, that calculates small shares of things, objects, real or intangible properties and makes an offer for a user in a network, for a fraction of the original item; creating a Fractional Request utilizing a module, that calculates separating components of a transaction, real or intangible property, or object through differences, determined by using modules in the system to create potential and actual deals, suggestions, motivations, or incentive to play, and potential and actual transactions;

creating requests utilizing a module asking for collaborations related to the dividing of properties in a network for the benefit of the individual users in a network;

providing the ability to create a new property by transforming other properties utilizing modules;

providing the ability to take an original property and transforming it into a new property utilizing a module;

providing the ability to transform Fractional Objects divided pieces of real or intangible properties and original properties into a currency, or currencies utilizing a module; utilizing modules that work within software, a computer processor, or System on Chip integrated circuit, in a virtual world network, and/or non virtual network;

and further comprising; providing a distributed block chain to independently verify the chain of ownership of any shared piece created from real or intangible properties transformed into a fraction of the original property;

providing a distributed block chain live tracking to independently verify the transactions of buying, selling, trading, bartering, with fair value or market value amounts set of any shared piece created from real or intangible properties transformed into a fraction of the original property in the network system; providing a distributed block chain recording of any activities related to changing, transforming, altering valuations, or destruction of any shared piece created from real or intangible properties transformed into a fraction of the original property in a system network; providing a shared fractional payment platform;

providing a digital semantic agent for creating; color band currencies from divided pieces; a rating attached to divided pieces; the conversion of pieces into currencies at time of registration; color band requests for participation; monetary values attached to requests at the time of dividing pieces; providing a negotiation digital semantic agent for negotiations on requested newly created properties.

14. All aspects of claim 13 and further comprising an Apparatus for increasing energy created from Photo Voltaic module in spatial point area, the apparatus comprising;
   a container for a plurality of Solar PV modules;
   a base container rack assembly;
   a plurality of parallel legs, each leg being connected at one end to the container and at the other end to the base to support the container for oscillating movement with respect to the base;
   a means specifically here a forward and backward servo motor for oscillating the container on the legs to move mirrors up and down; and left and right;
and further comprising light and position sensors, and actuator controlled by integrated circuit for best, lighting transmission and receiving;
and still further comprising a rack mounting apparatus and system comprising;
   a plurality of solar PV panels; a plurality of mirror reflectors;
   a plurality of programmable computer controllers;
   a plurality of actuator tracking mechanisms;
   a plurality of infrared laser sensor apparatus;
   a utility airspace below rack;
   a removable and semi removable cover for covering the airspace below the Solar PV rack mounting apparatus;
   an agricultural growing area;
   a solar controller;
   a hybrid organic battery;
   a micro inverter;
   an air transferal apparatus for moving water though the system;
   a heating and cooling apparatus;
   an alternative electricity generation apparatus;
   a water transferal apparatus for moving water though the system;
and further comprising; a brush less motor micro inverter;
   a graphene cooling system;
   a plurality of movable mirrors controlled by a programmable computer controller;
   a plurality of water pumps controlled by a programmable computer controller;
and further comprising;
   a plurality of Solar Panel Booster layers; a plurality of magnetic AC brush less motor generators.

15. All aspects of claim 14 and further comprising a multiple cell electricity generation apparatus comprising;
   a plurality of cells with varying conductivity apparatus;
   a plurality of cells with varying current collector apparatus;
   a plurality of organic electrodes and electrolyte;
   a parallel electric circuit that can be switched to a series circuit utilizing a controller autonomously or manually;
   an apparatus managed by a computer controller for switching on and off a plurality of individual cells;
   an apparatus managed by a computer controller for switching connections between a plurality of individual cells;
   a sensor apparatus managed by computer controller, utilizing voltage and current an plurality of gel and liquid electrolyte pumping apparatus and systems managed by a programmable computer controller;
and further comprising;
   a plurality of programmable computer controllers;
   a plurality of frequency measuring oscilloscope sensors;
   a plurality of thermal sensors;
   a plurality of voltage and current sensors;
      all connected wired and wireless to programmable computer controllers.

16. All aspects of claim 15 and further comprising an agricultural apparatus and system comprising;
   a lower rack connected to a solar photo voltaic panel mounting rack;
   and further comprising an in ground growing container apparatus and system;

a plurality of multiple cell container apparatus for growing plants;

a layering apparatus and system for decomposition of materials;

a hydration piping apparatus and system connected to a micro controller for managing plant hydration;

a plurality of square foot plant growing container apparatus;

a covering apparatus and system for protecting and growing plants and inclement weather;

a manual and autonomous covering apparatus for localized and remote management applications;

a plurality of programmable computer controllers;

an in ground piping system connected to a programmable computer controller;

a plurality of hydro temperature sensors;

a plurality of water sensors;

a plurality of graphene electricity generators;

a plurality valves and pumping apparatus;

a plurality of apparatus for managing hydration; temperature; and decomposition; manually; and autonomously; and autonomously;

a plurality of mirror apparatus for concentrated and targeted to spatial point solar electricity generation;

a plurality of reporting apparatus utilizing sensors;

a plurality of programmable computer controllers for agriculture;

a plurality of programmable computer controllers for electricity management;

a plurality of programmable computer controllers for planting seed mechanisms;

a heating and cooling apparatus and electricity generation and storage system comprising;

a plurality of air pumping components;

a plurality of water pumping components;

a rack mounting covering device;

a plurality of manual and autonomous venting devices;

a plurality of heat ex-changer devices;

a plurality of Peltier air and Seebeck effect devices;

a plurality of graphene layers used for electricity generation;

a plurality of heating and cooling graphene layers being cooled by lasers or heated by lasers;

a plurality of piping systems cold and hot for generating electricity;

a plurality of piping systems cold and hot for temperature control inside and outside of the apparatus;

a plurality of above ground and below ground pumping systems;

a plurality of hot and cold piping systems with graphene coatings inside for the electricity generation;

a plurality of graphene and magnesium electrodes running on the inside of pipes;

a plurality of graphene and magnesium cathodes and anodes embedded into pipes that transport fluids here defined water, or other liquid fluids; such as water;

a plurality of sensors for monitoring temperature and electricity generation;

a plurality of mirrors for heating areas and pipes;

a programmable computer controller for control of all components;

a plurality of infrared receiving LED component layers with infrared radiation absorbing materials layered between the component in the apparatus; a plurality of infrared receiving LED component modules embedded in above ground and below ground infrared receiving areas;

a plurality of graphene filters for filtration of minerals and salt out of water in a water storage tank;

a plurality of laser components for cooling pipes by passing light through the graphene;

a plurality of airtight casing for multiple solar panels to be mounted back to back;

and further comprising;

a plurality of programmable computer controllers;

a plurality of sensors connected wired or wireless to the programmable computer controllers;

and further comprising;

a block chain payment apparatus connected to all programmable computer controllers;

a KWH measurement apparatus and controller connected to programmable computer controllers;

a wireless electricity transferal apparatus.

17. All aspects of claim 16 and further comprising; an apparatus for producing water from the atmosphere in underground, underwater and above ground and water piping system.

18. All aspects of claim 17 and further comprising; an apparatus for producing, monitoring, and maintaining organic agriculture; utilizing sensors, artificial intelligence, and mechanical drones.

19. All aspects of claim 18 and further comprising; an apparatus for producing, monitoring, and maintaining structured water for agriculture; utilizing sensors, artificial intelligence, and mechanical drones.

20. All aspects of claim 19 and further comprising; an apparatus for producing, monitoring, and building; utilizing sensors, artificial intelligence, and mechanical drones.

\* \* \* \* \*